(12) United States Patent
Sekiguchi et al.

(10) Patent No.: US 11,676,631 B2
(45) Date of Patent: Jun. 13, 2023

(54) MAGNETIC RECORDING MEDIUM AND CARTRIDGE

(71) Applicant: Sony Corporation, Tokyo (JP)

(72) Inventors: Noboru Sekiguchi, Miyagi (JP); Minoru Yamaga, Miyagi (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/651,542

(22) PCT Filed: Oct. 2, 2019

(86) PCT No.: PCT/JP2019/038990
§ 371 (c)(1),
(2) Date: Mar. 27, 2020

(87) PCT Pub. No.: WO2021/033335
PCT Pub. Date: Feb. 25, 2021

(65) Prior Publication Data
US 2022/0172742 A1    Jun. 2, 2022

(30) Foreign Application Priority Data
Aug. 21, 2019    (JP) .............................. JP2019-151589

(51) Int. Cl.
*G11B 5/714*    (2006.01)
*G11B 5/592*    (2006.01)
(Continued)

(52) U.S. Cl.
CPC ............ *G11B 5/714* (2013.01); *G11B 5/5928* (2013.01); *G11B 5/70678* (2013.01); *G11B 5/78* (2013.01)

(58) Field of Classification Search
CPC ... G11B 5/714; G11B 5/5928; G11B 5/70678; G11B 5/78; G11B 5/70642; G11B 5/71;
(Continued)

(56) References Cited

U.S. PATENT DOCUMENTS 7,910,234 B2 *    3/2011    Brodd .................... G11B 5/733
                                                                427/127
10,796,724 B1 *    10/2020    Nakashio ........... G11B 23/0312
(Continued)

FOREIGN PATENT DOCUMENTS

JP    06-243451    9/1994
JP    2006-065953    3/2006
(Continued)

OTHER PUBLICATIONS

Decision to Grant a Patent dated Oct. 10, 2019 in corresponding Japanese Application No. 2019-151589.

*Primary Examiner* — Holly Rickman
(74) *Attorney, Agent, or Firm* — K&L Gates LLP

(57) ABSTRACT

A magnetic recording medium is a tape-shaped magnetic recording medium, including: a substrate; an underlayer provided on the substrate; and a magnetic layer provided on the underlayer. The substrate contains polyester, each of the underlayer and the magnetic layer contains a lubricant, the magnetic layer has a surface on which a large number of holes is provided, the arithmetic average roughness Ra of the surface is 2.5 nm or less, a BET specific surface area of the entire magnetic recording medium measured in a state where the magnetic recording medium has been washed and dried is 3.5 $m^2/g$ or more and 7.0 $m^2/g$ or less, a squareness ratio of the magnetic layer in a vertical direction is 65% or more, an average thickness of the magnetic layer is 80 nm or less, an average thickness of the magnetic recording medium is 5.6 μm or less, and a servo pattern is recorded on the magnetic layer and a statistical value $\delta_{SW}$ indicating a non-linearity of the servo pattern is 24 nm or less.

19 Claims, 16 Drawing Sheets

(51) Int. Cl.
 *G11B 5/706* (2006.01)
 *G11B 5/78* (2006.01)
(58) Field of Classification Search
 CPC ......... G11B 5/584; G11B 5/588; G11B 5/592; G11B 5/5926
 See application file for complete search history.

(56) References Cited

U.S. PATENT DOCUMENTS

2008/0266705 A1* 10/2008 Saliba .................... G11B 5/584
2009/0046396 A1*  2/2009 Nagata .................... G11B 5/70
2021/0012800 A1*  1/2021 Yamaga ............... G11B 5/5928

FOREIGN PATENT DOCUMENTS

| JP | 2006-099919 | 4/2006 |
| JP | 2007-273036 | 10/2007 |
| JP | 2007-299513 | 11/2007 |
| JP | 2017-228328 | 12/2017 |
| WO | 2019/159466 | 8/2019 |

\* cited by examiner

A

B

MAGNETIC RECORDING MEDIUM AND CARTRIDGE

TECHNICAL FIELD

The present disclosure relates to a magnetic recording medium and a cartridge.

BACKGROUND ART

For storage of electronic data, a tape-shaped magnetic recording medium is widely used. In this magnetic recording medium, various types of improvement in characteristics have been studied.

Patent Literature 1 describes that a Root mean square surface roughness (Rq) of the surface of a magnetic layer forming surface is set to 4.0 nm or less and a skewness (Sk) in the surface profile of the magnetic layer forming surface is set to −1 or more and +1 or less in order to achieve both excellent travelling stability and excellent electromagnetic conversion characteristics.

CITATION LIST

Patent Literature

Patent Literature 1: Japanese Patent Application Laid-open No. 2006-65953

DISCLOSURE OF INVENTION

Technical Problem

A tape-shaped magnetic recording medium is usually housed in a cartridge case. In order to further increase the recording capacity of a cartridge, it is conceivable to increase the tape length of the cartridge by making the magnetic recording medium housed in the cartridge thinner (by reducing the total thickness). However, a magnetic recording medium having a small total thickness has poor travelling stability in some cases. In particular, in the case of repeatedly performing recording and/or reproduction, the surface state, particularly, the surface state relating to friction, of the magnetic recording medium having a small total thickness changes, and the travelling stability deteriorates in some cases.

It is an object of the present disclosure to provide a magnetic recording medium and a cartridge that are capable of achieving both excellent travelling stability and excellent electromagnetic conversion characteristics even in the case where the total thickness of the magnetic recording medium is small.

Solution to Problem

In order to achieved the above-mentioned object, a first disclosure is a tape-shaped magnetic recording medium, including: a substrate; an underlayer provided on the substrate; and a magnetic layer provided on the underlayer, in which the substrate contains polyester, each of the underlayer and the magnetic layer contains a lubricant, the magnetic layer has a surface on which a large number of holes is provided, the arithmetic average roughness Ra of the surface is 2.5 nm or less, a BET specific surface area of the entire magnetic recording medium measured in a state where the magnetic recording medium has been washed and dried is 3.5 m²/g or more and 7.0 m²/g or less, a squareness ratio of the magnetic layer in a vertical direction is 65% or more, an average thickness of the magnetic layer is 80 nm or less, an average thickness of the magnetic recording medium is 5.6 μm or less, and a servo pattern is recorded on the magnetic layer and a statistical value $\sigma_{SW}$ indicating a non-linearity of the servo pattern is 24 nm or less.

A second disclosure is a cartridge, including: the magnetic recording medium according to the first disclosure; and a storage unit that has a region to which adjustment information for adjusting tension to be applied in a longitudinal direction of the magnetic recording medium is written.

MODE(S) FOR CARRYING OUT THE INVENTION

Embodiments of the present disclosure will be described in the following order.

Note that the same or corresponding components will be denoted by the same reference symbols in all the figures of the following embodiments.

1 First Embodiment
2 Second Embodiment
3 Modified Example

1 First Embodiment

[Configuration of Recording/Reproduction System]

Figure 1:
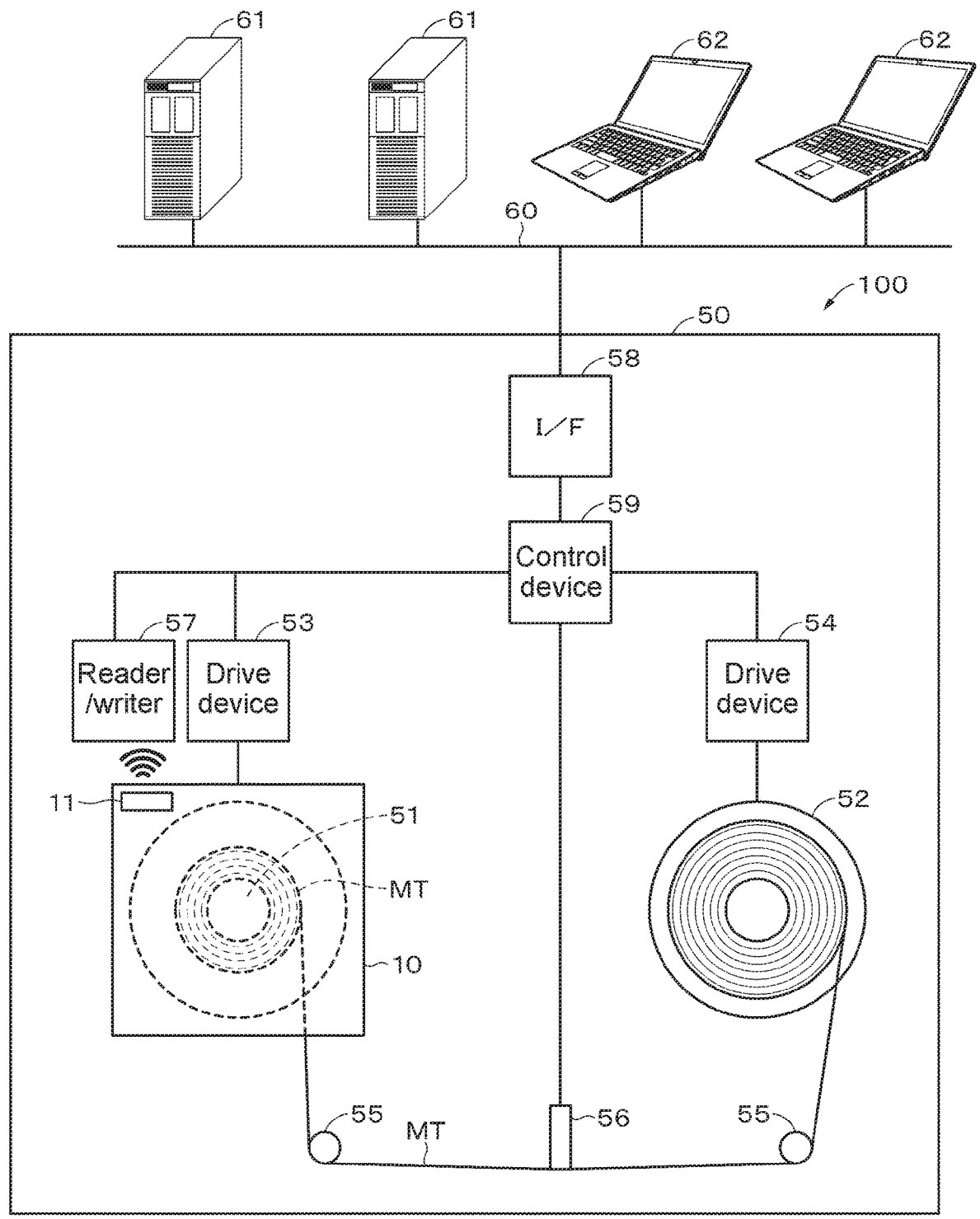
FIG. 1 is a schematic diagram showing an example of a configuration of a recording/reproduction system according to a first embodiment of the present disclosure.

FIG. 1 is a schematic diagram showing an example of a configuration of a recording/reproduction system 100 according to a first embodiment of the present disclosure. The recording/reproduction system 100 is a magnetic tape recording/reproduction system, and includes a cartridge 10, and a recording/reproduction apparatus 50 configured to be capable of loading and unloading the cartridge 10.

[Configuration of Cartridge]

Figure 2:
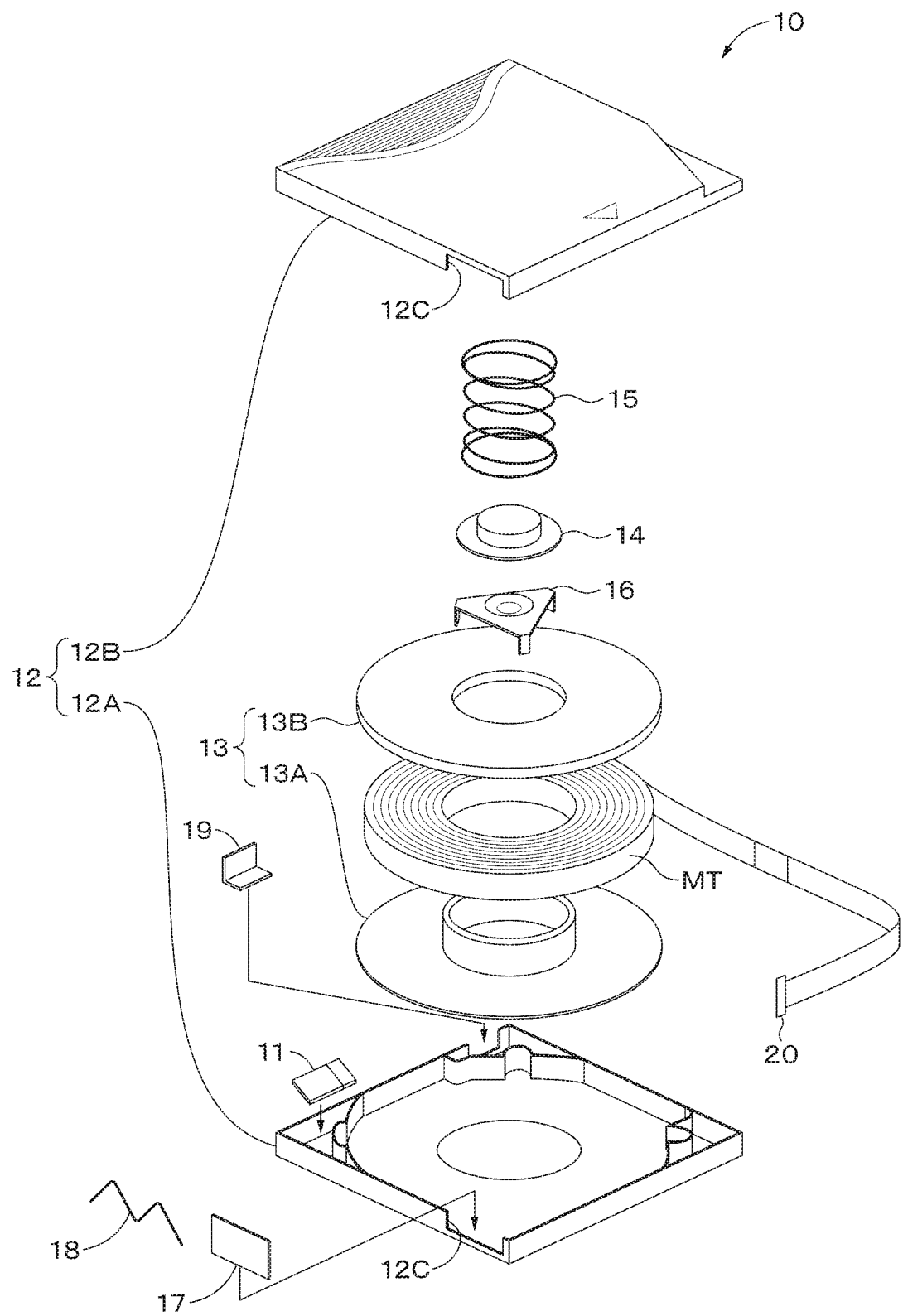
FIG. 2 is an exploded perspective view showing an example of a configuration of a cartridge.

FIG. 2 is an exploded perspective view showing an example of a configuration of the cartridge 10. The cartridge 10 is a magnetic tape cartridge conforming to the LTO (Linear Tape-Open) standard, and includes, inside a cartridge case 12 including a lower shell 12A and an upper shell 12B, a reel 13 in which a magnetic tape (tape-shaped magnetic recording medium) MT is wound, a reel lock 14 and a reel spring 15 for locking rotation of the reel 13, a spider 16 for releasing the lock state of the reel 13, a sliding door 17 that opens and closes a tape outlet 12C provided across the lower shell 12A and the upper shell 12B in the cartridge case 12, a door spring 18 that urges the sliding door 17 to the closed position of the tape outlet 12C, a write protect 19 for preventing accidental erasure, and a cartridge memory 11. The reel 13 has a substantially disc shape having an opening at the center portion, and includes a reel hub 13A and a flange 13B formed of a hard material such as plastic. A leader pin 20 is provided to one end portion of the magnetic tape MT.

The cartridge memory 11 is provided in the vicinity of one corner portion of the cartridge 10. In the state where the cartridge 10 is loaded on the recording/reproduction apparatus 50, the cartridge memory 11 faces a reader/writer 57 of the recording/reproduction apparatus 50. The cartridge memory 11 communicates with the recording/reproduction apparatus 50, specifically, the reader/writer 57, with a wireless communication standard conforming to the LTO standard.

[Configuration of Cartridge Memory]

Figure 3:
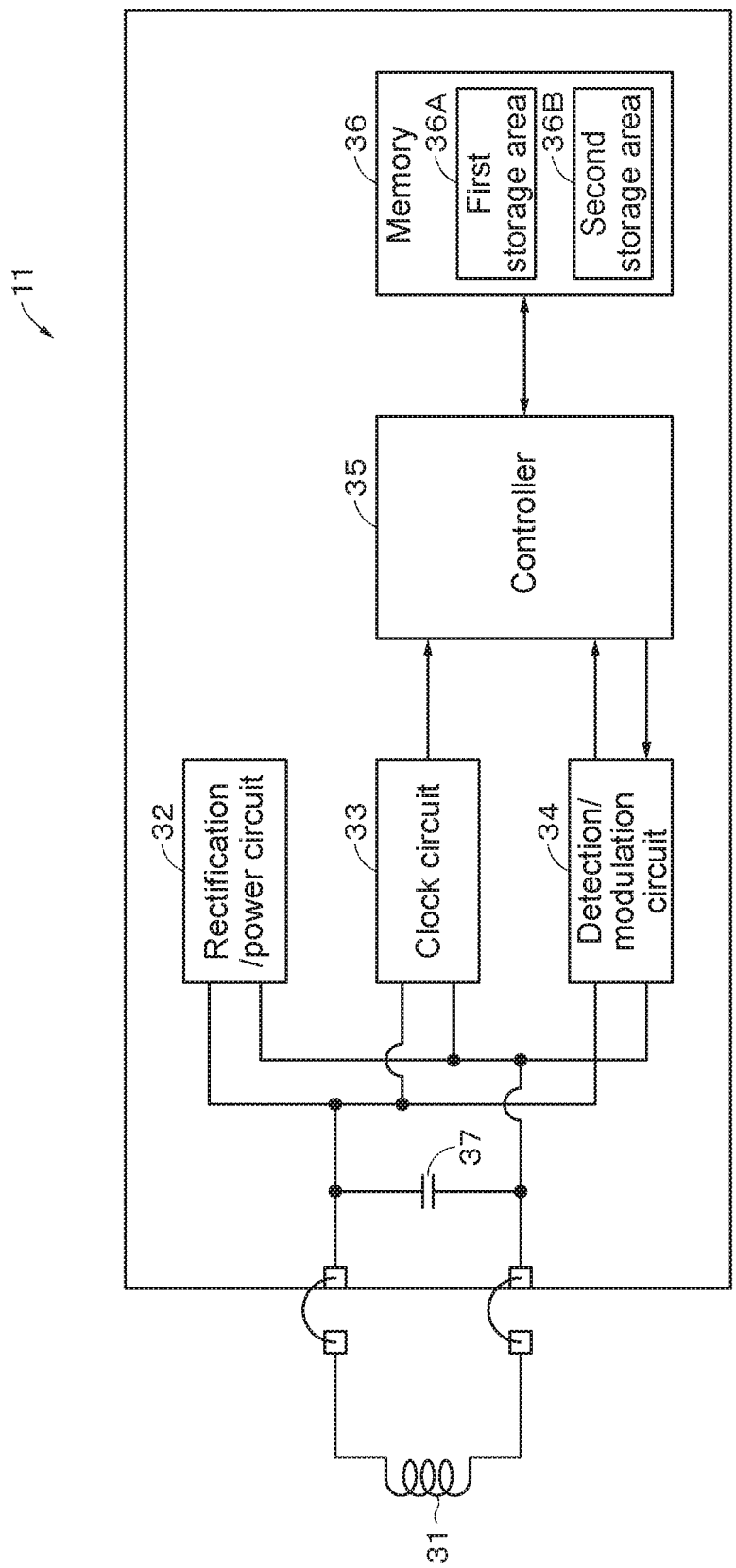
FIG. 3 is a block diagram showing an example of a configuration of a cartridge memory.

FIG. 3 is a block diagram showing an example of a configuration of the cartridge memory 11. The cartridge memory 11 includes an antenna coil (communication unit) 31, that performs communication with the reader/writer 57 with a specified communication standard, a rectification/power circuit 32 that generates power using an induce electromotive force from the radio wave received by the antenna coil 31 and rectifies the power to generate a power source, a clock circuit 33 that generates a clock from the radio wave received by the antenna coil 31 by using the an induce electromotive force similarly, a detection/modulation circuit 34 that detects the radio wave received by the antenna coil 31 and modulates a signal transmitted by the antenna coil 31, a controller (control unit) 35 that includes a logic circuit or the like for discriminating and processing commands and data from the digital signal extracted from the detection/modulation circuit 34, and a memory (storage unit) 36 that stores information. Further, the cartridge memory 11 includes a capacitor 37 connected to the antenna coil 31 in parallel, and the antenna coil 31 and the capacitor 37 constitute a resonance circuit.

The memory 36 stores information relating to the cartridge 10, and the like. The memory 36 is a non-volatile memory (NVM). The storage capacity of the memory 36 is favorably approximately 32 KB or more.

The memory 36 includes a first storage region 36A and a second storage region 36B. The first storage region 36A corresponds to the storage region of a cartridge memory (hereinafter, referred to as "existing cartridge memory") of the LTO standard before LTO8, and is a region for storing information conforming to the LTO standard before LTO8. Examples of the information conforming to the LTO standard before LTO8 include production information (e.g., a unique number for the cartridge 10) and a usage history (e.g., number of tape withdrawals (Thread Count)).

The second storage region 36B corresponds to the extended storage region for the storage region of the existing cartridge memory. The second storage region 36B is a region for storing additional information. Here, the additional information means information relating to the cartridge 10, which is not defined in the LTO standard before LTO8. Examples of the additional information include tension adjustment information, management ledger data, Index information, and thumbnail information regarding video stored in the magnetic tape MT, but the present disclosure is not limited to these types of data. The tension adjustment information is information for adjusting tension to be applied to the magnetic tape MT in the longitudinal direction. The tension adjustment information includes a distance between adjacent servo bands (distance between servo patterns recorded in adjacent servo bands) during data recording in the magnetic tape MT. The distance between adjacent servo bands is an example of width-related information relating to the width of the magnetic tape MT. Details of the distance between servo bands will be described below. In the following description, information to be stored in the first storage region 36A will be referred to as "first information" and information to be stored in the second storage region 36B will be referred to as "second information" in some cases.

The memory 36 may include a plurality of banks. In this case, a part of the plurality of banks may constitute the first storage region 36A, and the other banks may constitute the second storage region 36B.

The antenna coil 31 induces an induced voltage by electromagnetic induction. The controller 35 communicates with the recording/reproduction apparatus 50 via the antenna coil 31 with a specified communication standard. Specifically, for example, the controller 35 performs mutual authentication, command transmission/reception, or data exchange.

The controller 35 stores, in the memory 36, information received from the recording/reproduction apparatus 50 via the antenna coil 31. For example, the tension adjustment information received from the recording/reproduction apparatus 50 via the antenna coil 31 is stored in the second storage region 36B of the memory 36. In response to a request from the recording/reproduction apparatus 50, the controller 35 reads information from the memory 36 and transmits the information to the recording/reproduction apparatus 50 via the antenna coil 31. For example, in response to a request from the recording/reproduction apparatus 50, the controller 35 reads tension adjustment information from the second storage region 36B of the memory 36 and transmits the tension adjustment information to the recording/reproduction apparatus 50 via the antenna coil 31.

[Configuration of Magnetic Tape]

Figure 4:
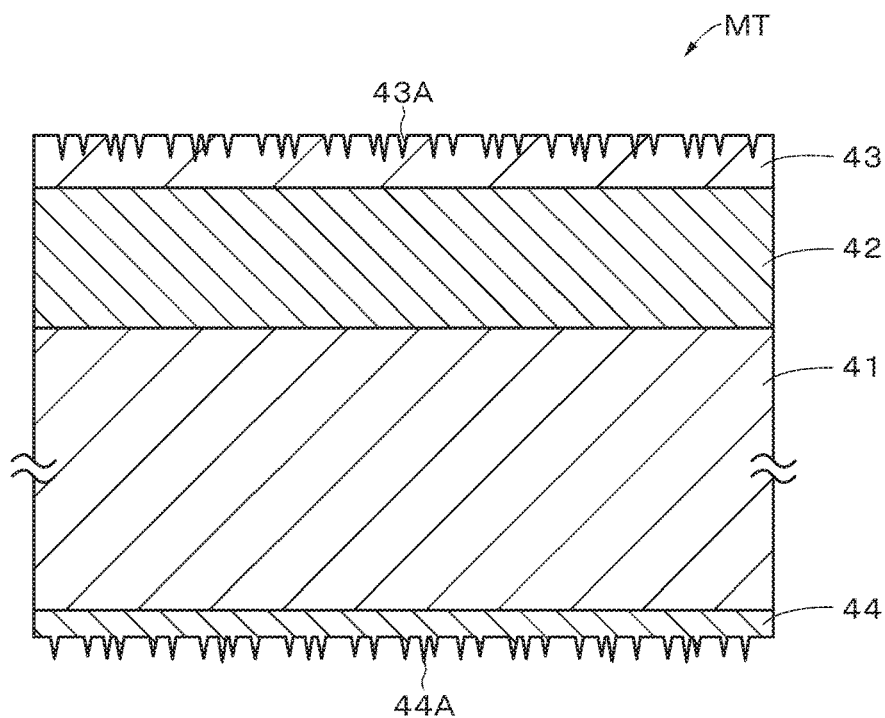
FIG. 4 is a cross-sectional view showing an example of a configuration of a magnetic tape.

FIG. 4 is a cross-sectional view showing an example of a configuration of the magnetic tape MT. The magnetic tape MT is a tape-shaped magnetic recording medium, and includes an elongated substrate 41, an underlayer 42 provided on one main surface (first main surface) of the substrate 41, a magnetic layer 43 provided on the underlayer 42, and a back layer 44 provided on the other main surface (second main surface) of the substrate 41. Note that the underlayer 42 and the back layer 44 are provided as necessary, and do not necessarily need to be provided. The magnetic tape MT may be a perpendicular recording type magnetic recording medium or a longitudinal recording type magnetic recording medium.

The magnetic tape MT has a long tape shape, and is caused to travel in the longitudinal direction at the time of recording/reproduction. Note that the surface of the magnetic layer 43 is a surface on which a magnetic head 56 of the recording/reproduction apparatus 50 is caused to travel. The magnetic tape MT is favorably used in a recording/reproduction apparatus including a ring-type head as a recording head. The magnetic tape MT is favorably used in a recording/reproduction apparatus configured to be capable of recording data with a data track width of 1500 nm or less or 1000 nm or less.

(Substrate)

The substrate 41 is a non-magnetic support that supports the underlayer 42 and the magnetic layer 43. The substrate 41 has a long film shape. The upper limit value of the average thickness of the substrate 41 is favorably 4.2 μm or less, more favorably 3.8 μm or less, and still more favorably 3.4 μm or less. In the case where the upper limit value of the average thickness of the substrate 41 is 4.2 μm or less, the recording capacity of one data cartridge can be increased as compared with that of a general magnetic tape. The lower limit value of the average thickness of the substrate 41 is favorably 3 μm or more, more favorably 3.2 μm or more. In the case where the lower limit value of the average thickness of the substrate 41 is 3 μm or more, the reduction in strength of the substrate 41 can be suppressed.

The average thickness of the substrate 41 is obtained as follows. First, the magnetic tape MT having a width of ½ inch is prepared and cut into a 250 mm length to prepare a sample. Subsequently, layers (i.e., the underlayer 42, the magnetic layer 43, and the back layer 44) of the sample other than the substrate 41 are removed with a solvent such as MEK (methyl ethyl ketone) and dilute hydrochloric acid. Next, the thickness of the sample (substrate 41) is measured at five or more points by using a laser hologauge (LGH-110C) manufactured by Mitsutoyo Corporation as a measurement apparatus, and the measured values are simply averaged (arithmetic average) to calculate the average thickness of the substrate 41. Note that the measurement positions are randomly selected from the sample.

The substrate 41 contains polyester. Since the substrate 41 includes polyester, it is possible to reduce the Young's modulus of the substrate 41 in the longitudinal direction. Therefore, it is possible to keep the width of the magnetic tape MT constant or substantially constant by adjusting, by the recording/reproduction apparatus 50, the tension of the magnetic tape MT in the longitudinal direction during travelling.

The polyester includes, for example, at least one of polyethylene terephthalate (PET), polyethylene naphthalate (PEN), polybutylene terephthalate (PBT), polybutylene naphthalate (PBN), polycyclohexylenedimethylene terephthalate (PCT), polyethylene-p-oxybenzoate (PEB), or polyethylene bisphenoxy carboxylate. In the case where the substrate 41 contains two or more types of polyesters, the two or more types of polyesters may be mixed, copolymerized, or stacked. At least one of the terminal and side chains of polyester may be modified.

It is confirmed, for example, as follows, that the substrate 41 contains polyester. First, the layers of the sample other than the substrate 41 are removed in a similar way as the method of measuring the average thickness of the substrate 41. Next, the IR spectrum of the sample (substrate 41) is obtained by infrared absorption spectrometry (IR). On the basis of this IR spectrum, it can be confirmed that the substrate 41 contains polyester.

The substrate 41 may further contain, for example, at least one type of polyamide, polyimide, and polyamideimide in addition to polyester, or may further contain at least one type of polyamide, polyimide, polyamideimide, polyolefins, cellulose derivatives, vinyl resins, and other polymer resins. Polyamide may be aromatic polyamide (aramid). Polyimide may be aromatic polyimide. Polyamideimide may be aromatic polyamideimide.

In the case where the substrate 41 contains a polymer resin other than polyesters, it is favorable that the substrate 41 contains polyester as a main component. Here, the main component means the component with the largest content (mass ratio) among polymer resins contained in the substrate 41. In the case where the substrate 41 contains a polymer resin other than polyesters, polyester and a polymer resin other than polyester may be mixed or copolymerized.

The substrate 41 may be biaxially stretched in the longitudinal direction and the width direction. It is favorable that the polymer resin contained in the substrate 41 is oriented in an oblique direction with respect to the width direction of the substrate 41.

(Magnetic Layer)

The magnetic layer 43 is a recording layer for recording a signal with a magnetization pattern. The magnetic layer 43 may be perpendicular recording type recording layer, or a longitudinal recording type recording layer. The magnetic layer 43 contains, for example, a magnetic powder, a binder, and a lubricant. The magnetic layer 43 may further contain, as necessary, at least one additive of an antistatic agent, an abrasive, a curing agent, a rust inhibitor, a non-magnetic reinforcing particle, and the like.

The magnetic layer 43 has a surface on which a large number of holes 43A is provided. These holes 43A each store a lubricant. It is favorable that the holes 43A extend in the direction perpendicular to the surface of the magnetic layer 43. This is because supply of the lubricant to the surface of the magnetic layer 43 can be improved. Note that a part of the holes 43A may extend in the perpendicular direction.

An arithmetic average roughness Ra of the surface of the magnetic layer 43 is 2.5 nm or less, favorably 2.2 nm or less, and more favorably 1.9 nm or less. In the case where the arithmetic average roughness Ra is 2.5 nm or less, output reduction due to spacing loss can be suppressed, and thus, excellent electromagnetic conversion characteristics can be achieved. The lower limit value of the arithmetic average roughness Ra of the surface of the magnetic layer 43 is favorably 1.0 nm or more, more favorably 1.2 nm or more, and still more favorably 1.4 nm or more. In the case where the lower limit value of the arithmetic average roughness Ra of the surface of the magnetic layer 43 is 1.0 nm or more, it is possible to suppress reduction in traveling due to an increase in friction.

The arithmetic average roughness Ra is obtained as follows. First, the surface of the magnetic layer 43 is observed with an AFM (Atomic Force Microscope) to obtain an AFM image of 40 μm×40 μm. Nano Scope IIIa D3100 manufactured by Digital Instruments is used as an AFM, a cantilever formed of silicon single crystal is used (Note 1), and measurement is performed with 200 to 400 Hz tuning as tapping frequency. Next, the AFM image is divided into 512×512 (=262,144) measurement points, heights $Z(i)$ (i:

measurement point number, i=1 to 262,144) are measured at the measurement points, and the measured heights Z(i) at the measurement points are simply averaged (arithmetic average) to obtain an average height (average surface) Zave (=Z(1)+Z(2)+ . . . +Z(262,144))/262,144). Subsequently, deviations Z"(i)(=Z(i)−Zave) from the average center line at the measurement points are obtained, and the arithmetic average roughness Ra[nm](=(Z"(1)+Z"(2)+ . . . +Z"(262,144))/262,144) is calculated. At this time, one on which filtering processing has been performed by Flatten order 2 and planefit order 3 XY as image processing is used as data.

(Note 1) SPM probe NCH normal type PointProbe L (cantilever length)=125 manufactured by Nano World The lower limit value of the BET specific surface area of the entire magnetic tape MT measured in the state where the magnetic tape MT has been washed and dried is 3.5 m$^2$/g or more, favorably 4 m$^2$/g or more, more favorably 4.5 m$^2$/g or more, and still more favorably 5 m$^2$/g or more. In the case where the lower limit value of the BET specific surface area is 3.5 m$^2$/g or more, it is possible to suppress the decrease in the amount of lubricant supplied between the surface of the magnetic layer 43 and the magnetic head 56 even after recording or reproduction is repeatedly performed (i.e., even after the magnetic tape MT is caused to repeatedly travel while the magnetic head 56 is in contact with the surface of the magnetic tape MT). Therefore, it is possible to suppress the increase in the dynamic friction coefficient. Therefore, excellent travelling stability can be achieved.

The upper limit value of the BET specific surface area of the entire magnetic tape MT measured in the state where the magnetic tape MT has been washed and dried is 7 m$^2$/g or less, favorably 6 m$^2$/g or less, and more favorably 5.5 m$^2$/g or less. In the case where the upper limit value of the BET specific surface area is 7 m$^2$/g or less, it is possible to sufficiently supply a lubricant without depletion even after travelling is performed many times. Therefore, it is possible to suppress the increase in the dynamic friction coefficient. Therefore, excellent travelling stability can be achieved.

The average pore diameter of the entire magnetic tape MT measured in the state where the magnetic tape MT has been washed and dried is 6 nm or more and 11 nm or less, favorably 7 nm or more and 10 nm or less, and more favorably 7.5 nm or more and 10 nm or less. In the case where the average pore diameter is 6 nm or more and 11 nm or less, it is possible to further improve the effect of suppressing the increase in the above-mentioned dynamic friction coefficient. Therefore, further excellent travelling stability can be obtained.

The BET specific surface area and the pore distribution (the pore volume and the average pore diameter (pore diameter of the maximum pore volume at the time of attachment/detachment)) of the entire magnetic tape MT measured in the state where the magnetic tape MT has been washed and dried are obtained as follows. First, the magnetic tape MT having a size approximately 10% larger than the area 0.1265 m$^2$ is soaked in hexane (with the amount that the magnetic tape MT can be sufficiently immersed, for example, 150 mL) for 24 hours, and then is naturally dried and cut out to a size of the area 0.1265 m$^2$ (for example, both ends of the dried magnetic tape MT are cut off by 50 cm to prepare a tape width×10 m) to prepare a measurement sample. Next, the BET specific surface area is obtained using a specific surface area/pore distribution measurement apparatus. Further, the pore distribution (the pore volume and the average pore diameter) is obtained by a BJH method using the specific surface area/pore distribution measurement apparatus. The measurement apparatus and measurement conditions are shown in the following. In this way, the average diameter of the pores is measured.

Measurement environment: room temperature
Measurement apparatus:3FLEX manufactured by Micromeritics Instrument Corp.
Measurement adsorbate: N$_2$ gas
Measured pressure range (P/P$_0$ (relative pressure)): 0 to 0.995

Regarding the measured pressure range, the pressure is changed as shown in the following Table 1. The pressure values in the following Table 1 are each a relative pressure P/P$_0$. For example, in Step 1 in the following Table 1, the pressure is changed from the starting pressure 0.000 to the ultimate pressure 0.010 by 0.001 per 10 seconds. When the pressure reaches the ultimate pressure, the pressure change in the next Step is performed. The same applies to Steps 2 to 10. However, in the case where the pressure does not reach equilibrium in each Step, the processing proceeds to next Step after the apparatus stands by until the pressure to equilibrate.

TABLE 1

| | Starting pressure | Pressure change step | Ultimate pressure |
|---|---|---|---|
| 1 | 0.000 | 0.001/10 sec | 0.010 |
| 2 | 0.010 | 0.02/10 sec | 0.100 |
| 3 | 0.100 | 0.05/10 sec | 0.600 |
| 4 | 0.600 | 0.05/10 sec | 0.950 |
| 5 | 0.950 | 0.05/10 sec | 0.990 |
| 6 | 0.990 | 0.05/10 sec | 0.995 |
| 7 | 0.995 | 0.01/10 sec | 0.990 |
| 8 | 0.990 | 0.01/10 sec | 0.950 |
| 9 | 0.950 | 0.05/10 sec | 0.600 |
| 10 | 0.600 | 0.05/10 sec | 0.300 |

Figure 5:
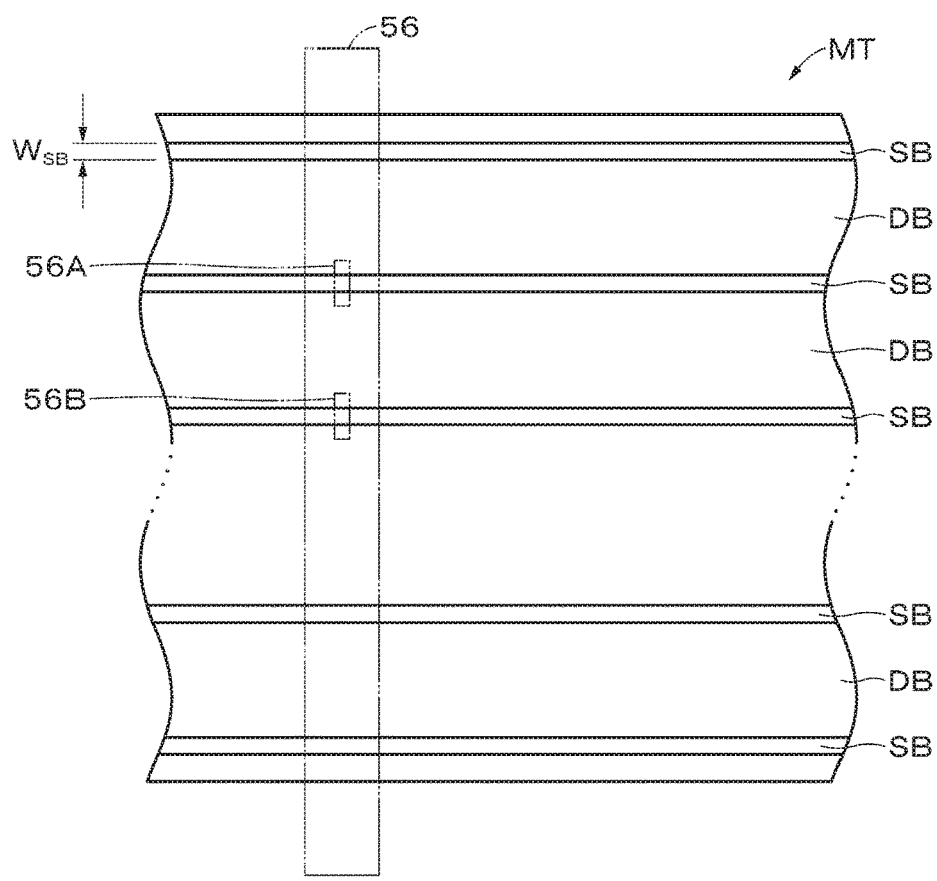
FIG. 5 is a schematic diagram showing an example of the layout of data bands and servo bands.

As shown in FIG. 5, the magnetic layer 43 includes a plurality of servo bands SB and a plurality of data bands DB in advance. The plurality of servo bands SB is provided in the width direction of the magnetic tape MT at equal intervals. Between adjacent servo bands SB, a data band DB is provided. The servo band SB is for guiding the magnetic head 56 (specifically, servo lead heads 56A and 56B) at the time of recording or reproducing data. In each of the servo bands SB, a servo pattern (servo signal) for tracking controlling of the magnetic head 56 is written in advance. In each of the data bands DB, user data is recorded.

The upper limit value of a ratio $R_S$ (=($S_{SB}$/S)×100) of a total area $S_{SB}$ of the servo bands SB to an area S of the surface of the magnetic layer 43 is favorably 4.0% or less, more favorably 3.0% or less, and still more favorably 2.0% or less from the viewpoint of securing a high recording capacity. Meanwhile, the lower limit value of the ratio $R_S$ of the total area $S_{SB}$ of the servo bands SB to the area S of the surface of the magnetic layer 43 is favorably 0.8% or more from the viewpoint of securing five or more servo bands SB.

The ratio $R_S$ of the total area $S_{SB}$ of the servo bands SB to the area S of the entire surface of the magnetic layer 43 is obtained as follows. The magnetic tape MT is developed using a ferricolloid developer (manufactured by SIGMA HI-CHEMICAL INC., SigMarker Q). After that, the developed magnetic tape MT is observed with an optical microscope, and a servo band width $W_{SB}$ and the number of servo bands SB are measured. Next, the ratio $R_S$ is obtained on the basis of the following formula.

Ratio $R_S$[%]=(((servo band width $W_{SB}$)×(number of servo bands $SB$))/(width of the magnetic tape$MT$))×100

The number of servo bands SB is favorably five or more, more favorably 5+4n (where n represents a positive number). In the case where the number of servo bands SB is five or more, the influence on the servo signal due to the dimensional change of the magnetic tape MT in the width direction is suppressed, and stable recording/reproduction characteristics with less off-track can be secured. Although the upper limit value of the number of servo bands SB is not particularly limited, it is, for example, 33 or less.

The number of servo bands SB is obtained in a similar way as the above-mentioned method of calculating the ratio $R_S$.

The upper limit value of the servo band width $W_{SB}$ is favorably 95 μm or less, more favorably 60 μm or less, and still more favorably 30 μm or less from the viewpoint of securing a high recording capacity. The lower limit value of the servo band width $W_{SB}$ is favorably 10 μm or more. It is difficult to produce the recording head 56 capable of reading a servo signal of the servo band width $W_{SB}$ of less than 10 μm.

The width of the servo band width $W_{SB}$ is obtained in a similar way as the above-mentioned method of calculating the ratio $R_S$.

Figure 6:
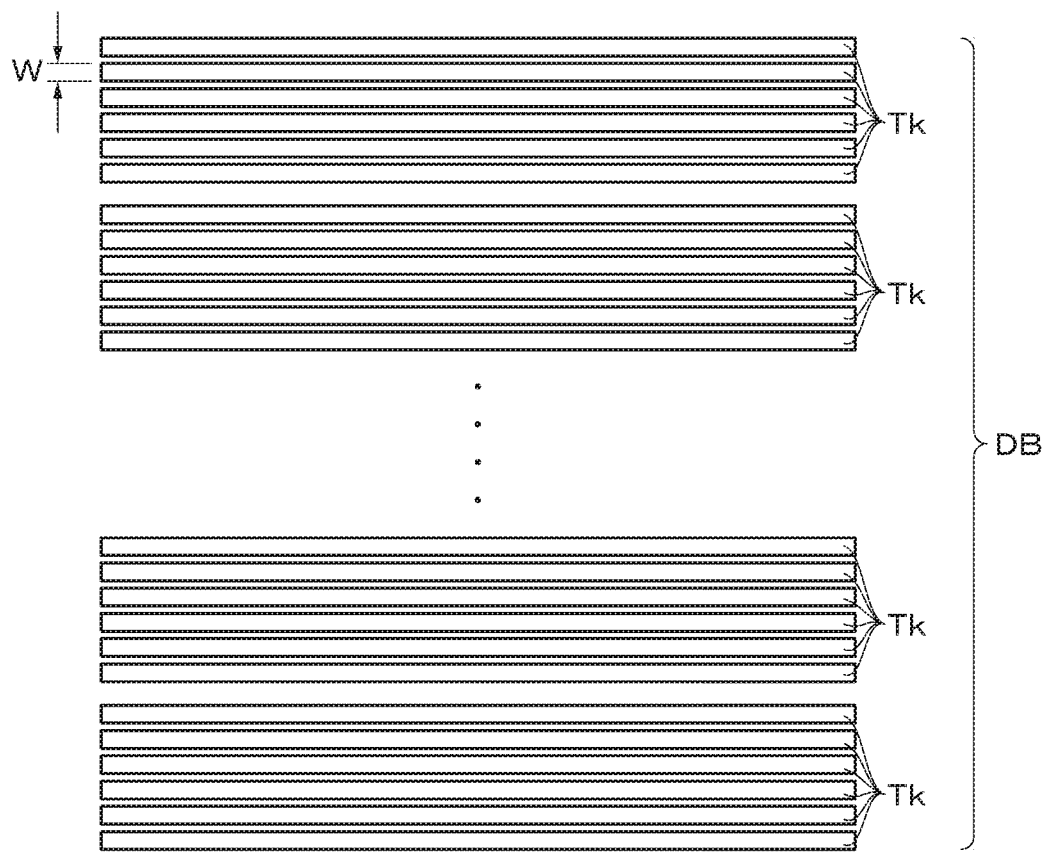
FIG. 6 is an enlarged view showing an example of a configuration of the data bands.

As shown in FIG. 6, the magnetic layer 43 is configured to be capable of forming a plurality of data tracks Tk in the data band DB. The upper limit value of a data track width W is favorably 2000 nm or less, more favorably 1500 nm or less, and still more favorably 1000 nm or less from the viewpoint of improving the track recording density and securing a high recording capacity. The lower limit value of the data track width W is favorably 20 nm or more considering the size of the magnetic particle.

The magnetic layer 43 is configured to be capable of recording data so that the minimum value L of a magnetization reversal pitch is favorably 48 nm or less, more favorably 44 nm or less, and still more favorably 40 nm or less from the viewpoint of securing a high recording capacity. The lower limit value of the minimum value L of the magnetization reversal pitch is favorably 20 nm or more considering the size of the magnetic particle.

The magnetic layer 43 is configured to be capable of recording data so that the minimum value L of the magnetization reversal pitch and the data track width W satisfy the relationship of favorably $W/L \leq 35$, more favorably $W/L \leq 30$, and still more favorably $W/L \leq 25$. If the minimum value L of the magnetization reversal pitch is a constant value and the minimum value L of the magnetization reversal pitch and the track width W satisfy the relationship of $W/L > 35$ (i.e., if the track width W is large), there is possibility that the recording capacity cannot be sufficiently secured because the track recording density does not increase. Further, if the track width W is a constant value and the minimum value L of the magnetization reversal pitch and the track width W satisfy the relationship of $W/L > 35$ (i.e., if the minimum value L of the magnetization reversal pitch is small), there is a possibility that the electromagnetic conversion characteristics (e.g., SNR (Signal-to-Noise Ratio)) deteriorate due to the influence of spacing loss although the bit length is reduced and the linear recording density increases. Therefore, in order to suppress the deterioration of the electromagnetic conversion characteristics (e.g., SNR) while securing the recording capacity, it is favorable that W/L is within the range of 35 or less ($W/L \leq 35$) as described above. The lower limit value of W/L is not particularly limited, and may be, for example, $1 \leq W/L$.

The data track width W is obtained as follows. The magnetic tape MT with data recorded on the entire surface thereof is prepared, and a data recording pattern of the data band DB part of the magnetic layer 43 is observed using a magnetic force microscope (MFM) to obtain an MFM image. As the MFM, Dimension 3100 manufactured by Digital Instruments and the analysis software thereof are used. The measurement region of the MFM image has a size of 10 μm×10 μm, and the measurement region having the size of 10 μm×10 μm is divided into 512×512 (=262,144) measurement points. Three measurement regions of 10 μm×10 μm at different locations are measured with the MFM, i.e., three MFM images are obtained. From the three obtained MFM images, track widths are measured at 10 locations using the analysis software attached to Dimension 3100, and the average value (simple average) thereof is obtained. The average value is the data track width W. Note that the measurement conditions of the above-mentioned MFM are sweep speed: 1 Hz, used chip: MFMR-20, lift height: 20 nm, and correction: Flatten order 3.

The minimum value L of the magnetization reversal pitch is obtained as follows. The magnetic tape MT with data recorded on the entire surface thereof is prepared, and a data recording pattern of the data band DB part of the magnetic layer 43 is observed using a magnetic force microscope (MFM) to obtain an MFM image. As the MFM, Dimension 3100 manufactured by Digital Instruments and the analysis software thereof are used. The measurement region of the MFM image has a size of 2 μm×2 μm, and the measurement region having the size of 2 μm×2 μm is divided into 512×512 (=262,144) measurement points. Three measurement regions of 2 μm×2 μm at different locations are measured with the MFM, i.e., three MFM images are obtained. Fifty distances between bits are measured from the two-dimensional unevenness chart of the recording pattern of the obtained MFM image. The distance between bits is measured using the analysis soft attached to Dimension 3100. The value that is substantially the greatest common divisor of the 50 measured distances between bits is taken as the minimum value of the magnetization reversal pitch L. Note that the measurement conditions of the above-mentioned MFM are sweep speed: 1 Hz, used chip: MFMR-20, lift height: 20 nm, and correction: Flatten order 3.

The servo pattern is a magnetized region, and is formed by magnetizing a specific region of the magnetic layer 43 in a specific direction with a servo write head during production of the magnetic tape. Of the servo band SB, a region in which no servo pattern is formed (hereinafter, referred to as "non-pattern region") may be a magnetized region in which the magnetic layer 43 has been magnetized or a non-magnetized region in which the magnetic layer 43 has not been magnetized. In the case where the non-pattern region is a magnetized region, the servo pattern forming region and the non-pattern region have been magnetized in different directions (e.g., opposite directions).

Figure 7:
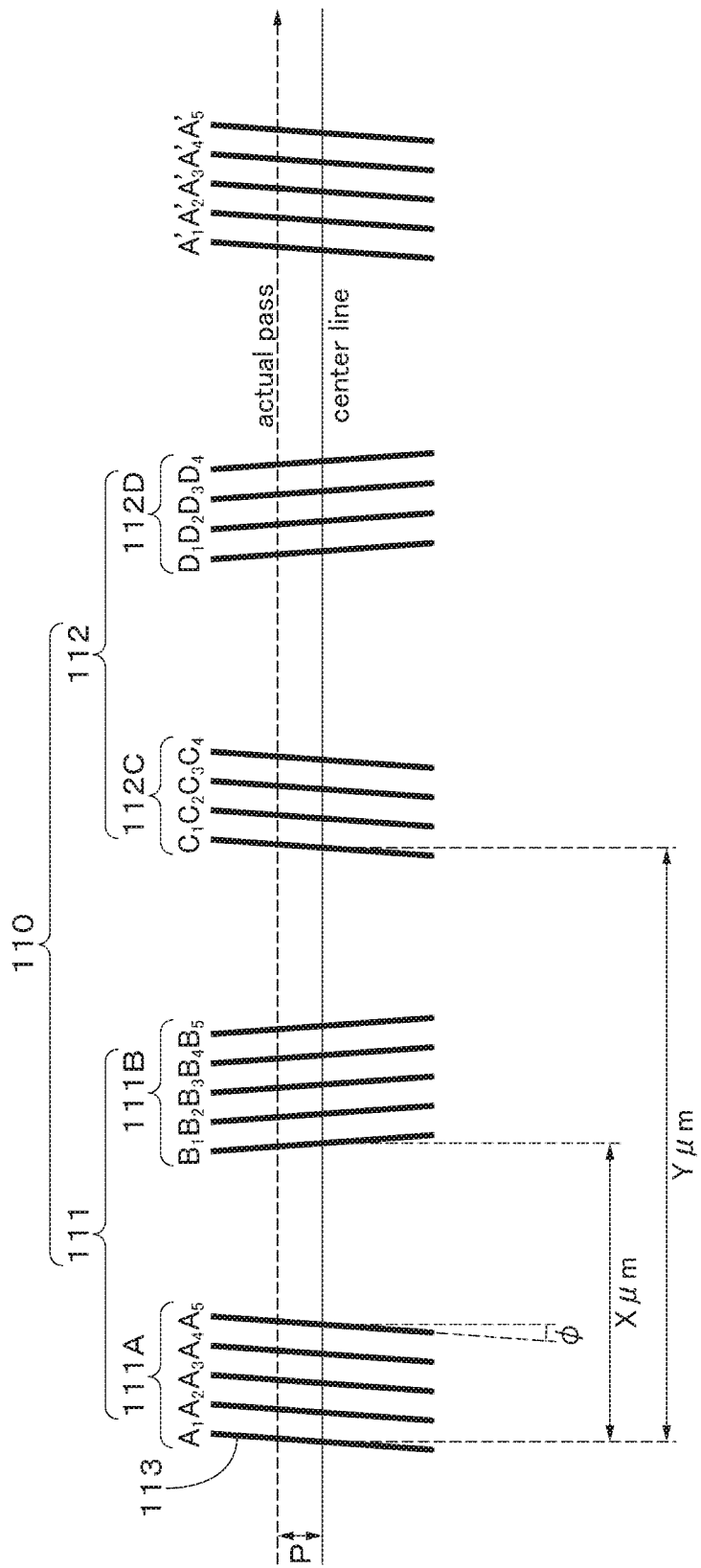
FIG. 7 is an enlarged view showing an example of the configuration of the servo bands.

In the LTO standard, as shown in FIG. 7, servo patterns including a plurality of servo stripes (linear magnetized regions) 113 inclined with respect to the width direction of the magnetic tape MT are formed in the servo band SB.

The servo band SB includes a plurality of servo frames 110. Each of the servo frames 110 includes 18 servo stripes 113. Specifically, each of the servo frames 110 includes a servo subframe 1 (111) and a servo subframe 2 (112).

The servo subframe 1 (111) includes an A burst 111A and a B burst 111B. The B burst 111B is disposed adjacent to the A burst 111A. The A burst 111A includes five servo stripes 113 that are inclined with respect to the width direction of the magnetic tape MT at a predetermined angle φ and formed apart by specified intervals. In FIG. 7, the five servo stripes 113 are denoted by reference symbols $A_1$, $A_2$, $A_3$, $A_4$, and $A_5$ from the EOT (End Of Tape) to BOT (Beginning Of Tape) of the magnetic tape MT. Similarly to the A burst 111A, the B burst 111B includes five servo stripes 113 that are inclined with respect to the width direction of the magnetic tape MT at the predetermined angle φ and formed apart by specified intervals. In FIG. 7, the five servo stripes 113 are denoted by reference symbols $B_1$, $B_2$, $B_3$, $B_4$, and $B_5$ from the EOT to BOT of the magnetic tape MT. The servo stripes 113 of the B burst 111B are inclined in the opposite direction to the servo stripes 113 of the A burst 111A. That is, the servo stripes 113 of the A burst 111A and the servo stripes 113 of the B burst 111B are arranged in the inverted V shape.

The servo subframe 2 (112) includes a C burst 112C and a D burst 112D. The D burst 112D is disposed adjacent to the C burst 112C. The C burst 112C includes four servo stripes 113 that are inclined with respect to the tape width direction at the predetermined angle φ and formed apart by specified intervals. In FIG. 7, the four servo stripes 113 are denoted by reference symbols $C_1$, $C_2$, $C_3$, and $C_4$ from the EOT to BOT of the magnetic tape MT. Similarly to the C burst 112C, the D burst 112D includes four servo stripes 113 that are inclined with respect to the tape width direction at the predetermined angle φ and formed apart by specified intervals. In FIG. 7, the four servo stripes 113 are denoted by reference symbols $D_1$, $D_2$, $D_3$, and $D_4$ from the EOT to BOT of the magnetic tape MT. The servo stripes 113 of the D burst 112D are inclined in the opposite direction to the servo stripes 113 of the C burst 112C. That is, the servo stripes 113 of the C burst 112C and the servo stripes 113 of the D burst 112D are arranged in the inverted V shape.

The above-mentioned predetermined angle φ of the servo stripes 113 in the A burst 111A, the B burst 111B, the C burst 112C, and the D burst 112D is, for example, 5° or more and 25° or less, and can be particularly 11° or more and 25° or less.

By reading the servo band SB with the magnetic head 56, information for obtaining the tape speed and the position of the magnetic head in the longitudinal direction can be acquired. The tape speed is calculated on the basis of the time between four timing signals (A1-C1, A2-C2, A3-C3, and A4-C4). The head position is calculated on the basis of the above-mentioned time between four timing signals and the time between other four timing signals (A1-B1, A2-B2, A3-B3, and A4-B4).

As shown in FIG. 7, it is favorable that the servo patterns (i.e., the plurality of servo stripes 113) are linearly arranged toward the longitudinal direction of the magnetic tape MT. That is, it is favorable that the servo band SB has a straight line shape in the longitudinal direction.

The statistical value $\sigma_{SW}$ indicating the non-linearity of arrangement of the servo patterns (non-linearity of the servo band SB) is 24 nm or less, favorably 23 nm or less, more favorably 20 nm or less, and still more favorably 15 nm or less. In the case where the statistical value $\sigma_{SW}$ is 24 nm or less, it is possible to prevent the servo patterns from swinging in the width direction of the magnetic tape MT. That is, it is possible to achieve arrangement of the servo patterns (servo band SB) having excellent linearity. For this reason, since the magnetic head 56 can be appropriately guided by the servo patterns (servo band SB) to the position on the magnetic tape MT where data is written, excellent travelling stability can be achieved. Therefore, it is possible to suppress occurrence of errors during data reading.

The statistical value $\sigma_{SW}$ indicating the non-linearity of the servo patterns (non-linearity of the servo band SB) is favorably as small as possible and is, for example, 0 or more from the viewpoint of improving the travelling stability.

The statistical value $\sigma_{SW}$ indicating the non-linearity of the servo band is measured using a tape travelling apparatus (Tape Transportation (Mountain Engineering II, Inc.)) including a magnetic head for reading the servo patterns recorded on the surface of the magnetic layer 43 of the magnetic tape MT. The magnetic head may be one that is employed in a commercially available LTO8 full height drive. The magnetic head is used in a state being fixed to the tape travelling apparatus.

Using the tape travelling apparatus, the magnetic tape MT is caused to travel at 2 m/s so that the surface on the side of the magnetic layer 43 slides on the surface of the magnetic head. Using the reading element on the surface of the magnetic head, the reproduction waveform of the servo signal is read from the servo patterns of the magnetic tape MT using a digital oscilloscope. That is, magnetic servo patterns are converted into an electrical servo signal. In order to acquire the reproduction waveform of the servo signal with sufficient accuracy, the sampling rate of the digital oscilloscope is 20,000,000 or more per second.

In order to read the servo patterns recorded in one servo band, two reading elements arranged side by side in the longitudinal direction of the magnetic tape MT are used. The two reading elements are included in the magnetic head unit adopted in an LTO8 full height drive. The two reading elements will be described below with reference to FIG. 8.

Figure 8:
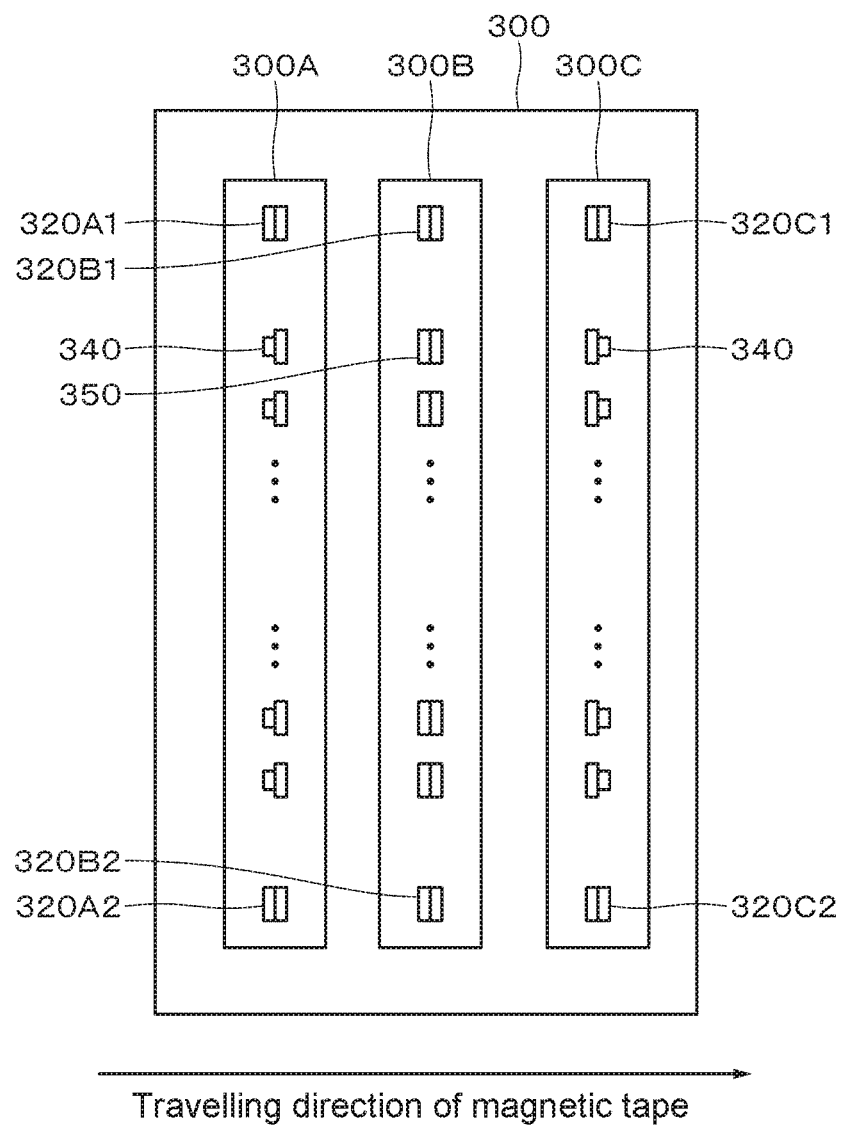
FIG. 8 is a schematic diagram of a head unit used in measuring a statistical value $\sigma_{SW}$.

FIG. 8 is a schematic diagram of the magnetic head unit. A head unit 300 shown in FIG. 8 includes three head units 300A, 300B, and 300C arranged side by side along the longitudinal direction of the magnetic tape MT. The head unit 300A includes two servo heads 320A1 and 320A2 and a plurality of recording heads 340. Ellipsis-like points in the head unit 300A means that the recording heads 340 are arranged. The head unit 300B includes two servo heads 320B1 and 320B2 and a plurality of reproduction heads 350. Ellipsis-like points in the head unit 300B means that the reproduction heads 350 are arranged. The head unit 300C includes two servo heads 320C1 and 320C2 and a plurality of recording heads 340. Ellipsis-like points in the head unit 300C means that the recording heads 340 are arranged.

The above-mentioned two reading elements used for acquiring the above-mentioned statistical value $\sigma_{SW}$ are only the servo head 320A1 included in the head unit 300A and the servo head 320B1 included in the head unit 300B. Other servo heads are not used therefor. Hereinafter, of the two reading elements, a reading element (servo head 320A1) on the unwinding side will be referred to also as the reading element a and a reading element (servo head 320B1) on the winding side will be referred to also as a reading element b.

The reproduction waveform of the servo signal acquired by each reading element is acquired by a digital oscilloscope or the like. On the basis of the acquired reproduction waveform of the servo signal, "a relative difference p between the center line of the servo pattern and the actual passing position of the reading element on the servo pattern" is calculated. Specifically, the relative difference p is calculated using the shape of the acquired reproduction waveform of the servo signal and the shape of the servo pattern itself.

The relative difference p is calculated by the following calculation formula.

$$\text{Relative difference } p \, [\mu m] = \frac{X[\mu m] - \begin{bmatrix} (B_{a1} - A_{a1}) + (B_{a2} - A_{a2}) + (B_{a3} - A_{a3}) + (B_{a4} - A_{a4}) + \\ (D_{a1} - C_{a1}) + (D_{a2} - C_{a2}) + (D_{a3} - C_{a3}) + (D_{a4} - C_{a4}) \\ \hline (C_{a1} - A_{a1}) + (C_{a2} - A_{a2}) + (C_{a3} - A_{a3}) + (C_{a4} - A_{a4}) + \\ (A'_{a1} - C_{a1}) + (A'_{a2} - C_{a2}) + (A'_{a3} - C_{a3}) + (A'_{a4} - C_{a4}) \end{bmatrix} \times Y[\mu m]}{2 \times \tan\varphi}$$

[Math. 1]

The above-mentioned calculation formula of the relative difference p will be described below with reference to FIG. 7. The above-mentioned difference ($B_{a1}$-$A_{a1}$) in the above-mentioned calculation formula is a difference [sec] between the time when the stripe $B_1$ is read by the reading element a and the time when the stripe $A_1$ is read by the reading element a, and is obtained on the basis of the intervals between the signal peak due to the stripe $A_1$ and the signal peak due to the stripe $B_1$, and the tape travelling speed (m/s). The intervals between the two signal peaks are obtained on the basis of the shape of the above-mentioned obtained reproduction waveform of the servo signal. The above-mentioned difference ($B_{a1}$-$A_{a1}$) corresponds to a difference between timings at which both the stripes are read at the actual travelling position (actual path in FIG. 7) on the servo pattern of the reading element. Similarly, other difference terms can be obtained on the basis of intervals between signal peaks due to two corresponding stripes, and the tape travelling speed. Further, the relative difference p is calculated similarly on the basis of the signal peak acquired by the reading element b.

An azimuth angle φ in the above-mentioned calculation formula is obtained on the basis of the shape of the above-mentioned servo pattern itself. The azimuth angle φ is obtained by developing the magnetic tape MT with a ferri-colloid developer (manufactured by SIGMA HI-CHEMICAL INC., SigMarker Q) and using a universal tool microscope (TOPCON TUM-220ES) and a data processing apparatus (TOPCON CA-1B). Further, the distance between the stripe $A_1$ and the strip $B_1$ (X in FIG. 7 and the above-mentioned calculation formula) in the center of the servo band (center line in FIG. 7) and the distance between the stripe $A_1$ and the strip $C_1$ (Y in FIG. 7 and the above-mentioned calculation formula) are obtained on the basis of the shape of the above-mentioned servo pattern itself. Fifty servo frames are selected at arbitrary locations in the tape length direction, X and Y are obtained in each servo frame, and those obtained by simply averaging 50 pieces of data are taken as X and Y used in the above-mentioned calculation formula.

The relative difference p is calculated for each of 1024 consecutive servo subframes along the longitudinal direction of the magnetic tape MT. That is, 1024 relative differences p are acquired. For example, in the case where the intervals between servo subframes are 76 μm, the relative difference p is acquired every 76 μm. The 1024 relative differences p calculated on the basis of the servo signal read by the reading element a will be referred to as $pa_0$, $pa_1$, . . . , and $pa_{1023}$. The 1024 relative differences p calculated on the basis of the servo signal read by the reading element b will be referred to as $pb_0$, $pb_1$, . . . , and $pb_{1023}$.

In order to eliminate the influence of the movement of the magnetic tape MT in the width direction on the magnetic head, a difference between pa and pb at each position n is calculated as Δp. That is, $\Delta p_n = pa_n - pb_n$. Here, n=0, 1, . . . , and 1023. Discrete FFT (Fourier transform) is performed on the obtained $\Delta p_n$ to obtain $\Delta p_n$ (n=0 . . . 1023), i.e., ΔP(f) (where f=wave number [cycle/m]). Here, in order to remove the DC component (i.e., n=0) of $\Delta p_n$, in other words, ΔP(∞), $\Delta P_0$ is replaced with a numerical value substantially close to 0 such as $10^{-100}$.

Further, the above-mentioned FFT is performed so that the unit of ΔP(f) is [nm²/Hz].

The process of obtain ΔP(f) is repeated in the longitudinal direction of the magnetic tape MT over 500 m or more to obtain $\Delta P(f)_1$ . . . $\Delta P(f)_m$. In order to remove measurement noise, $\Delta P(f)_1$ . . . $\Delta P(f)_m$ are averaged on the frequency axis to obtain $\Delta P(f)_{ave}$. After that, in order to estimate behavior WIP(f) of the above-mentioned displacement difference during actual drive, a general second-order closed-loop response filter CLF(f) is applied to $\Delta P(f)_{ave}$. That is, WIP(f)=|CLF(f)|²×$\Delta P(f)_{ave}$. CLF(f) will be described below.

Calculation of the following formula (1) is performed using the above-mentioned WIP(f) to obtain $\sigma_{SW}$. Also df in the following calculation will be described below. (Math. 2)

$$\sigma_{SW} = \sqrt{\Sigma WIP(f) \times df} \quad (1)$$

The general second-order closed-loop response CLF(s) can be represented by the following formula (2).

(Math. 3)

$$CLF(s) = \frac{s^2}{s^2 + 2s\zeta\omega_0 + \omega_0^2} \quad (2)$$

By using bilinear Z transformation, CLF(z) can be represented by the following formula (3).

(Math. 4)

$$CLF(z) = \frac{K_1 (z-1)^2}{z^2 + K_2 z + K_3} \quad (3)$$

From the relationship of $z = e^{j\omega Ts}$ and ω=2πf, CLF(f) can be represented by the following formula (4).

(Math. 5)

$$CLF(f) = \frac{K_1 (e^{j(2\pi f)Ts} - 1)^2}{e^{2j(2\pi f)Ts} + K_2 e^{j(2\pi f)Ts} + K_3} \quad (4)$$

The meaning of each term in the formulae described above is as follows.

$$T_s: \text{Data interval [m/cycle]} = 76 \times 10^6 \text{[m/cycle]} \quad \text{(Math. 6)}$$

$j$: Imaginary unit $$K_1 = \frac{K_s^2}{K_s^2 + 2\zeta\omega_0 K_s + \omega_0^2} \quad K_s = 2F_s$$

$$K_2 = \frac{2(\omega_0^2 - K_s^2)}{K_s^2 + 2\zeta\omega_0 K_s + \omega_0^2} \quad \omega_0 = 2\pi F_0$$

$$K_3 = \frac{K_s^2 - 2\zeta\omega_0 K_s + \omega_0^2}{K_s^2 + 2\zeta\omega_0 K_s + \omega_0^2} \quad F_0 = F_r\sqrt{1 - 2\zeta^2}$$

$$\zeta = \sqrt{\frac{1 - \sqrt{1 - \frac{1}{MP^2}}}{2}}$$

$F_S$[cycle/m] $= 1/T_s = 13157.9$ [cycle/m]

$d_f$: Wave number interval

[cycle/m] $= \frac{F_S/2}{1024/2} = 12.850$ [cycle/m]

$F_r$: Peak wave number of filter [cycle/m] $= 410$ $MP$: Filter gain [a.u.] $= 10^{(10[dB]/20)}$ The upper limit value of an average thickness $t_m$ of the magnetic layer 43 is 80 nm or less, favorably 70 nm or less, and more favorably 50 nm or less. In the case where the upper limit value of the average thickness $t_m$ of the magnetic layer 43 is 80 nm or less, since the influence of a demagnetizing field can be reduced when a ring-type head is used as a recording head, further excellent electromagnetic conversion characteristics can be achieved.

The lower limit value of the average thickness $t_m$ of the magnetic layer 43 is favorably 35 nm or more. In the case where the lower limit value of the average thickness $t_m$ of the magnetic layer 43 is 35 nm or more, since output can be secured when an MR-type head is used as a reproduction head, further excellent electromagnetic conversion characteristics can be achieved.

The average thickness $t_m$ of the magnetic layer 43 is obtained as follows. First, the magnetic tape MT to be measured is processed by an FIB method or the like to make a slice. In the case of using an FIB method, as pretreatment for observing a TEM image of a cross section described below, a carbon layer and a tungsten layer are formed as protective films. The carbon layer is formed on surfaces of the magnetic tape MT on the magnetic layer 43 side and on the back layer 44 side by a deposition method, and the tungsten layer is further formed on the surface on the magnetic layer 43 side by a deposition method or sputtering method. The slicing is performed along the length direction (longitudinal direction) of the magnetic tape MT. That is, the slicing forms a cross section parallel to both the longitudinal direction and the thickness direction of the magnetic tape MT.

The above-mentioned cross section of the obtained sliced sample is observed with a transmission electron microscope (TEM) under the following conditions to obtain a TEM image. Note that the magnification and acceleration voltage may be appropriately adjusted depending on the type of the apparatus.

Apparatus: TEM (H9000NAR manufactured by Hitachi. Ltd.)
Acceleration voltage: 300 kV
Magnification: 100,000

Next, the obtained TEM image is used for measuring the thickness of the magnetic layer 43 at at least 10 or more positions in the longitudinal direction of the magnetic tape MT. The average value obtained by simply averaging (arithmetic average) the obtained measured values is taken as the average thickness $t_m$ [nm] of the magnetic layer 43. Note that the above-mentioned measurement positions are randomly selected from the test piece.

(Magnetic Powder)

The magnetic powder includes a plurality of magnetic particles. The magnetic particles are, for example, particles containing hexagonal ferrite (hereinafter, referred to as "hexagonal ferrite particles"), particles containing epsilon-type iron oxide (ε-iron oxide) (hereinafter, referred to as "ε-iron oxide particles"), or particles containing Co-containing spinel ferrite (hereinafter, referred to as "cobalt ferrite particles"). It is favorable that the magnetic powder has crystal orientation preferentially in the thickness direction (vertical direction) of the magnetic tape MT.

(Hexagonal Ferrite Particles)

The hexagonal ferrite particles each have, for example, a plate shape such as a hexagon plate shape. In the present specification, the hexagon plate shape includes a substantially hexagon plate shape. The hexagonal ferrite contains, favorably, at least one type of Ba, Sr, Pb, and Ca, more favorably, at least one type of Ba and Sr. Specifically, the hexagonal ferrite may be, for example, barium ferrite or strontium ferrite. The barium ferrite may further contain at least one type of Sr, Pb, and Ca in addition to Ba. The strontium ferrite may further contain at least one type of Ba, Pb, and Ca in addition to Sr.

More specifically, the hexagonal ferrite has an average composition represented by the general formula $MFe_{12}O_{19}$. However, M is, for example, at least one type of metal of Ba, Sr, Pb, and Ca, favorably at least one type of meatal of Ba and Sr. M may be a combination of Ba and one or more types of metal selected from the group consisting of Sr, Pb, and Ca. Further, M may be a combination of Sr and one or more types of metal selected from the group consisting of Ba, Pb, and Ca. Some Fe in the above-mentioned general formula may be substituted with another metal element.

In the case where the magnetic powder includes hexagonal ferrite particles, the average particle size of the magnetic powder is favorably 30 nm or less, more favorably 12 nm or more and 25 nm or less, still more favorably 15 nm or more and 22 nm or less, particularly favorably 15 nm or more and 20 nm or less, and most favorably 15 nm or more and 18 nm or less. In the case where the average particle size of the magnetic powder is 30 nm or less, the further excellent electromagnetic conversion characteristics (e.g., SNR) can be achieved in the magnetic tape MT having a high recording density. Meanwhile, in the case where the average particle size of the magnetic powder is 12 nm or more, the dispersibility of the magnetic powder is enhanced, and further excellent electromagnetic conversion characteristics (e.g., SNR) can be achieved.

The average aspect ratio of the magnetic powder is favorably 1.0 or more and 2.5 or less, more favorably 1.0 or more and 2.1 or less, and still more favorably 1.0 or more and 1.8 or less. In the case where the average aspect ratio of the magnetic powder is within the range of 1.0 or more and 2.5 or less, aggregation of the magnetic powder can be suppressed. Further, the resistance applied to the magnetic powder when the magnetic powder is vertically oriented in the process of forming the magnetic layer 43 can be reduced. Therefore, the vertical orientation of the magnetic powder can be improved.

In the case where the magnetic powder includes hexagonal ferrite particles, the average particle size and the average aspect ratio of the magnetic powder are obtained as follows. First, the magnetic tape MT to be measured is processed by an FIB method or the like to make a slice. In the case of using an FIB method, as pretreatment for observing a TEM image of a cross section described below, a carbon layer and a tungsten layer are formed as protective films. The carbon layer is formed on surfaces of the magnetic tape MT on the magnetic layer 43 side and on the back layer 44 side by a deposition method, and the tungsten layer is further formed on the surface on the magnetic layer 43 side by a deposition method or sputtering method. The slicing is performed along the length direction (longitudinal direction) of the magnetic tape MT. That is, the slicing forms a cross section parallel to both the longitudinal direction and the thickness direction of the magnetic tape MT.

Figure 9:
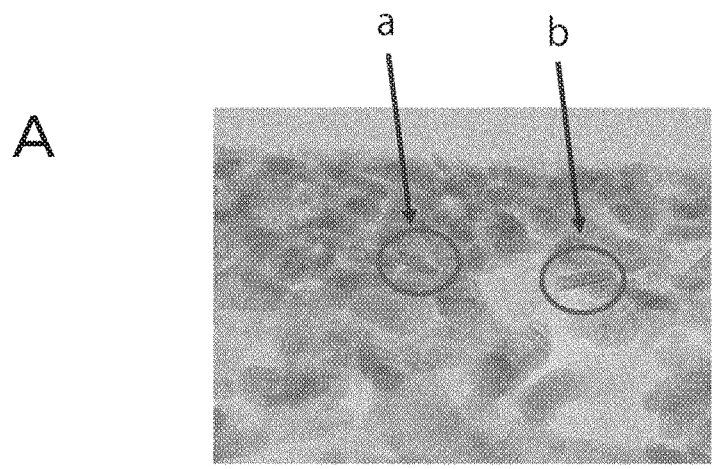
FIG. 9 Part A and Part B of FIG. 9 are each a diagram showing an example of a TEM photograph of a magnetic layer.
Figure 9:
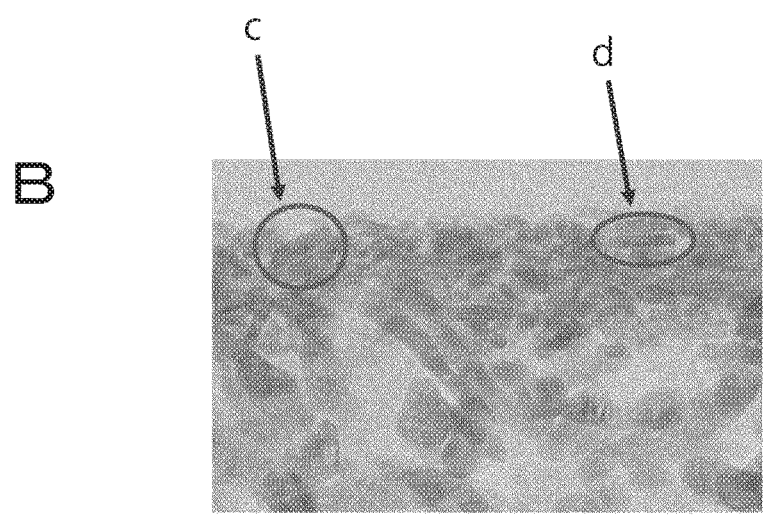

The above-mentioned cross section of the obtained slice sample is observed at an acceleration voltage: 200 kV and the total magnification of 500,000 using a transmission electron microscope (H-9500 manufactured by Hitach High-Technologies Corporation) so that the entire magnetic layer 43 is included in the thickness direction of the magnetic layer 43, and a TEM photograph is taken. Next, 50 particles with the side facing in the direction of the observation surface, whose particle thickness can be clearly observed, are selected from the taken TEM photograph. For example, Part A of FIG. 9 and Part B of FIG. 9 each show an example of the TEM photograph. In Part A of FIG. 9 and Part B of FIG. 9, for example, particles indicated by arrows a and d are selected because the thickness of each of the particles can be clearly observed. The maximum thickness DA of each of the 50 selected particles is measured. The maximum thicknesses DA thus obtained are simply averaged (arithmetic average) to obtain an average maximum thickness $DA_{ave}$. Subsequently, the plate diameter DB of each magnetic powder is measured. In order to measure the plate diameter DB of the particle, 50 particles in which the plate diameter of the particle can be clearly observed are selected from the taken TEM photograph. For example, in Part A of FIG. 9 and Part B of FIG. 9, for example, particles indicated by arrows b and c are selected because the plate diameter of the particle can be clearly observed. The plate diameter DB of each of the 50 selected particles is measured. The plate diameters DB thus obtained are simply averaged (arithmetic average) to obtain an average plate diameter $DB_{ave}$. The average plate diameter $DB_{ave}$ is an average particle size. Then, on the basis of from the average maximum thickness $DA_{ave}$ and the average plate diameter $DB_{ave}$, the average aspect ratio ($DB_{ave}/DA_{ave}$) of the particles is obtained.

In the case where the magnetic powder includes hexagonal ferrite particles, the average particle volume of the magnetic powder is favorably 5900 nm³ or less, more favorably 500 nm³ or more and 3400 nm³ or less, still more favorably 1000 nm³ or more and 2500 nm³ or less, particularly favorably 1000 nm³ or more and 1800 nm³ or less, and most favorably 1000 nm³ or more and 1500 nm³ or less. In the case where the average particle volume of the magnetic powder is 5900 nm³ or less, effects similar to those in the case where the average particle size of the magnetic powder is 30 nm or less can be achieved. Meanwhile, in the case where the average particle volume of the magnetic powder is 500 nm³ or more, effects similar to those in the case where the average particle size of the magnetic powder is 12 nm or more can be achieved.

The average particle volume of the magnetic powder is obtained as follows. First, as described in the above-mentioned method of calculating the average particle size of the magnetic powder, an average major axis length $DA_{ave}$ and the average plate diameter $DB_{ave}$ are obtained. Next, an average volume V of the magnetic powder is obtained using the following formula.

$$V = \frac{3\sqrt{3}}{8} \times DA_{ave} \times DB_{ave} \times DB_{ave} \qquad \text{(Math. 7)}$$

(ε-Iron Oxide Particle)

The ε-iron oxide particles are hard magnetic particles that can achieve a high coercive force even with fine particles. The ε-iron oxide particles each have a spherical shape or a cubic shape. In the present specification, the spherical shape includes a substantially spherical shape. Further, the cubic shape includes a substantially cubic shape. Since the ε-iron oxide particles each have the above-mentioned shape, in the case where ε-iron oxide particles are used as the magnetic particles, the contact area between particles in the thickness direction of the magnetic tape MT is reduced and aggregation of particles can be suppressed as compared with the case where barium ferrite particles each having a hexagon plate shape are used as the magnetic particles. Therefore, it is possible to enhance the dispersibility of the magnetic powder and achieved further excellent electromagnetic conversion characteristics (e.g., SNR).

The ε-iron oxide particles each have a core-shell structure. Specifically, the ε-iron oxide particle includes a core portion and a shell portion that is provided around the core portion and has a 2-layer structure. The shell portion having the 2-layer structure includes a first shell portion provided on the core portion, and a second shell portion provided on the first shell portion.

The core portion contains ε-iron oxide. The ε-iron oxide contained in the core portion favorably has an ε-Fe$_2$O$_3$ crystal as a main phase, and is more favorably formed of a single phase of ε-Fe$_2$O$_3$.

The first shell portion covers at least a part of the periphery of the core portion. Specifically, the first shell portion may partially cover the periphery of the core portion or may cover the entire periphery of the core portion. It is favorable that the entire surface of the core portion is covered from the viewpoint of making the exchange coupling between the core portion and the first shell portion sufficient and improving the magnetic properties.

The first shell portion is a so-called soft magnetic layer, and contains, for example, a soft magnetic material such as α-Fe, an Ni—Fe alloy, and an Fe—Si—Al alloy. α-Fe may be one obtained by reducing ε-iron oxide contained in the core portion.

The second shell portion is an oxide coating film as an oxidation prevention layer. The second shell portion contains α-iron oxide, aluminum oxide, or silicon oxide. The α-iron oxide contains, for example, at least one iron oxide of Fe$_3$O$_4$, Fe$_2$O$_3$, and FeO. In the case where the first shell portion contains α-Fe (soft magnetic material), the α-iron oxide may be one obtained by oxidizing α-Fe contained in the first shell portion.

Since the ε-iron oxide particle incudes the first shell portion as described above, a coercive force Hc of the entire ε-iron oxide particle (core-shell particles) can be adjusted to the coercive force Hc suitable for recording while maintaining the coercive force Hc of the core portion alone to a large value to secure thermal stability. Further, since the ε-iron oxide particle includes the second shell portion as described above, it is possible to prevent the characteristics of the ε-iron oxide particle from being reduced due to occurrence of rust or the like on the particle surface by exposure of the ε-iron oxide particle to the air during and before the process of producing the magnetic tape MT. Therefore, it is possible to suppress characteristic deterioration of the magnetic tape MT.

The ε-iron oxide particle may include a shell portion having a single-layer structure. In this case, the shell portion has a structure similar to that of the first shell portion. However, from the viewpoint of suppressing the characteristic deterioration of the ε-iron oxide particle, it is favorable that the ε-iron oxide particle includes a shell portion having a 2-layer structure as described above.

The ε-iron oxide particle may contain an additive instead of the above-mentioned core-shell structure, or may contain an additive in addition to the core-shell structure. In this case, some Fe of the ε-iron oxide is substituted with the additive. Also by causing the ε-iron oxide particle to contain an additive, the coercive force Hc of the entire ε-iron oxide particle can be adjusted to the coercive force Hc suitable for recording, and thus, the ease of recording can be improved. The additive is a metal element other than iron, favorably a trivalent metal element, more favorably at least one type of Al, Ga, and In, and still more favorably at least one type of Al and Ga.

Specifically, the ε-iron oxide containing an additive is an ε-$Fe_{2-x}M_xO_3$ crystal (in which M is a metal element other than iron, favorably a trivalent metal element, more favorably at least one type of Al, Ga, and In, and still more favorably at least one type of Al and Ga. x satisfies the relationship of, for example, 0<x<1).

The average particle size (average maximum particle size) of the magnetic powder is, for example, 22.5 nm or less. The average particle size of (average maximum particle size) of the magnetic powder is, favorably, 22 nm or less, more favorably 8 nm or more and 22 nm or less, still more favorably 12 nm or more and 22 nm or less, particularly favorably 12 nm or more and 15 nm or less, and most favorably 12 nm or more and 14 nm or less. In the magnetic tape MT, a region having a size of half the recording wavelength is an actual magnetized region. For this reason, by setting the average particle size of the magnetic powder to half or less of the shortest recording wavelength, it is possible to achieve further excellent electromagnetic conversion characteristics (e.g., SNR). Therefore, in the case where the average particle size of the magnetic powder is 22 nm or less, further excellent electromagnetic conversion characteristics (e.g., SNR) can be achieved in the magnetic tape MT having a high recording density (e.g., the magnetic tape MT configured to be capable of recording a signal with the shortest recording wavelength of 44 nm or less). Meanwhile, in the case where the average particle size of the magnetic powder is 8 nm or more, the dispersibility of the magnetic powder is further improved, and further excellent electromagnetic conversion characteristics (e.g., SNR) can be achieved.

The average aspect ratio of the magnetic powder is favorably 1.0 or more and 3.0 or less, more favorably 1.0 or more and 2.5 or less, still more favorably 1.0 or more and 2.1 or less, and particularly favorably 1.0 or more and 1.8 or less. In the case where the average aspect ratio of the magnetic powder is within the range of 1.0 or more and 3.0 or less, aggregation of the magnetic powder can be suppressed. Further, the resistance applied to the magnetic powder when the magnetic powder is vertically oriented in the process of forming the magnetic layer 43 can be reduced. Therefore, it is possible to improve the vertical orientation of the magnetic powder.

In the case where the magnetic powder contains ε-iron oxide particles, the average particle size and the average aspect ratio of the magnetic powder are obtained as follows. First, the magnetic tape MT to be measured is processed by an FIB (Focused Ion Beam) method or the like to make a slice. In the case of using an FIB method, as pretreatment for observing a TEM image of a cross section described below, a carbon layer and a tungsten layer are formed as protective films. The carbon layer is formed on surfaces of the magnetic tape MT on the magnetic layer 43 side and on the back layer 44 side by a deposition method, and the tungsten layer is further formed on the surface on the magnetic layer 43 side by a deposition method or sputtering method. The slicing is performed along the length direction (longitudinal direction) of the magnetic tape MT. That is, the slicing forms a cross section parallel to both the longitudinal direction and the thickness direction of the magnetic tape MT.

The above-mentioned cross section of the obtained slice sample is observed at an acceleration voltage: 200 kV and the total magnification of 500,000 using a transmission electron microscope (H-9500 manufactured by Hitach High-Technologies Corporation) so that the entire magnetic layer 43 is included in the thickness direction of the magnetic layer 43, and a TEM photograph is taken. Next, 50 particles in which the shape of the particle can be clearly observed are selected from the taken TEM photograph, and a major axis length DL and a minor axis length DS of each of the particles are measured. Here, the major axis length DL means the largest one (so-called maximum Feret diameter) of distances between two parallel lines drawn from all angles so as to contact the outline of each particle. Meanwhile, the minor axis length DS means the largest one of lengths of the particle in the direction perpendicular to the major axis (DL) of the particle. Subsequently, the major axis lengths DL of the 50 measured particles are simply averaged (arithmetic average) to obtain an average major axis length $DL_{ave}$. The average major axis length $DL_{ave}$ thus obtained is taken as the average particle size of the magnetic powder. Further, the minor axis lengths DS of the 50 measured particles are simply averaged (arithmetic average) to obtain an average minor axis length $DS_{ave}$. Then, on the basis of the average major axis length $DL_{ave}$ and the average minor axis length $DS_{ave}$, the average aspect ratio ($DL_{ave}/DS_{ave}$) of the particles is obtained.

The average particle volume of the magnetic powder is favorably 5600 $nm^3$ or less, more favorably 250 $nm^3$ or more and 5600 $nm^3$ or less, still more favorably 900 $nm^3$ or more and 5600 $nm^3$ or less, particularly favorably 900 $nm^3$ or more and 1800 $nm^3$ or less, most favorably 900 $nm^3$ or more and 1500 $nm^3$ or less. In general, since noise of the magnetic tape MT is inversely proportional to the square root of the number of particles (i.e., proportional to the square root of the particle volume), further excellent electromagnetic conversion characteristics (e.g., SNR) can be achieved by reducing the particle volume. Therefore, in the case where the average particle volume of the magnetic powder is 5600 $nm^3$ or less, further excellent electromagnetic conversion characteristics (e.g., SNR) can be obtained similarly in the case where the average particle size of the magnetic powder is 22 nm or less. Meanwhile, in the case where the average particle volume of the magnetic powder is 250 nm³ or more, effects similar to those in the case where the average particle size of the magnetic powder is 8 nm or more are obtained.

In the case where the ε-iron oxide particle has a spherical shape, the average particle volume of the magnetic powder is obtained as follows. First, similarly to the above-mentioned method of calculating the average particle size of the magnetic powder, the average major axis length $DL_{ave}$ is obtained. Next, the average volume V of the magnetic powder is obtained using the following formula.

$$V=(\pi/6) \times DL_{ave}^3$$

In the case where the ε-iron oxide particle has a cubic shape, the average volume of the magnetic powder is obtained as follows. The magnetic tape MT is processed by an FIB (Focused Ion Beam) method or the like to make a slice. In the case of using an FIB method, as pretreatment for observing a TEM image of a cross section described below, a carbon film and a tungsten thin film are formed as protective films. The carbon film is formed on surfaces of the magnetic tape MT on the magnetic layer 43 side and on the back layer 44 side by a deposition method, and the tungsten thin film is further formed on the surface on the magnetic layer 43 side by a deposition method or sputtering method. The slicing is performed along the length direction (longitudinal direction) of the magnetic tape MT. That is, the slicing forms a cross section parallel to both the longitudinal direction and the thickness direction of the magnetic tape MT.

The above-mentioned cross section of the obtained slice sample is observed at an acceleration voltage: 200 kV and the total magnification of 500,000 using a transmission electron microscope (H-9500 manufactured by Hitach High-Technologies Corporation) so that the entire magnetic layer 43 is included in the thickness direction of the magnetic layer 43, and a TEM photograph is taken. Note that the magnification and acceleration voltage may be appropriately adjusted depending on the type of the apparatus. Next, 50 particles in which the shape of the particle is clear are selected from the taken TEM photograph, and a side length DC of each particle is measured. Subsequently, the side lengths DC of the 50 measured particles are simply averaged (arithmetic average) to obtain an average side length $DC_{ave}$. Next, the average volume $V_{ave}$ (particle volume) of the magnetic powder is obtained on the basis of the following formula using the average side length $DC_{ave}$.

$$V_{ave}=DC_{ave}^3$$

(Cobalt Ferrite Particles)

The cobalt ferrite particles favorably have uniaxial crystal anisotropy. In the case where the cobalt ferrite particles have uniaxial crystal anisotropy, it is possible to cause the magnetic powder to have crystal orientation preferentially in the thickness direction (vertical direction) of the magnetic tape MT. The cobalt ferrite particles each have, for example, a cubic shape. In the present specification, the cubic shape includes a substantially cubic shape. The Co-containing spinel ferrite may further contain at least one type of Ni, Mn, Al, Cu, and Zn in addition to Co.

The Co-containing spinel ferrite has, for example, an average composition represented by the following formula.

$Co_xM_yFe_2O_z$ 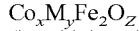

(in which M is, for example, at least one type of metal of Ni, Mn, Al, Cu, and Zn. x is a value within the range of $0.4 \leq x \leq 1.0$. y is a value within the range of $0 \leq y \leq 0.3$. However, x and y satisfy the relationship of $(x+y) \leq 1.0$. z is a value within the range of $3 \leq z \leq 4$. Some Fe may be substituted with another metal element.)

In the case where the magnetic powder contains the cobalt ferrite particles, the average particle size of the magnetic powder is favorably 25 nm or less, more favorably 8 nm or more and 23 nm or less, still more favorably 8 nm or more and 12 nm or less, and particularly favorably 8 nm or more and 11 nm or less. In the case where the average particle size of the magnetic powder is 25 nm or less, further excellent electromagnetic conversion characteristics (e.g., SNR) can be achieved in the magnetic tape MT having a high recording density. Meanwhile, in the case where the average particle size of the magnetic powder is 8 nm or more, the dispersibility of the magnetic powder is further enhanced and further excellent electromagnetic conversion characteristics (e.g., SNR) can be achieved. The method of calculating the average particle size of the magnetic powder is similar to the method of calculating the average particle size of the magnetic powder in the case where the magnetic powder contains ε-iron oxide particle powder.

The average aspect ratio of the magnetic powder is favorably 1.0 or more and 3.0 or less, more favorably 1.0 or more and 2.5 or less, still more favorably 1.0 or more and 2.1 or less, and particularly favorably 1.0 or more and 1.8 or less. In the case where the average aspect ratio of the magnetic powder is within the range of 1.0 or more and 3.0 or less, aggregation of the magnetic powder can be suppressed. Further, the resistance applied to the magnetic powder when the magnetic powder is vertically oriented in the process of forming the magnetic layer 43 can be reduced. Therefore, it is possible to improve the vertical orientation of the magnetic powder. The method of calculating the average aspect ratio of the magnetic powder is similar to the method of calculating the average aspect ratio of the magnetic powder in the case where the magnetic powder contains ε-iron oxide particle powder.

The average particle volume of the magnetic powder is favorably 15000 nm³ or less, more favorably 500 nm³ or more and 12000 nm³ or less, particularly favorably 500 nm³ or more and 1800 nm³ or less, and most favorably 500 nm³ or more and 1500 nm³ or less. In the case where the average particle volume of the magnetic powder is 15000 nm³ or less, effects similar to those in the case where the average particle size of the magnetic powder is 25 nm or less can be achieved. Meanwhile, in the case where the average particle volume of the magnetic powder is 500 nm³ or more, effects similar to those in the case where the average particle size of the magnetic powder is 8 nm or more can be achieved. The method of calculating the average particle volume of the magnetic powder is similar to the method of calculating the average particle volume in the case where the ε-iron oxide particle has a cubic shape.

(Binder)

Examples of the binder include a thermoplastic resin, a thermosetting resin, and a reactive resin. Examples of the thermoplastic resin include vinyl chloride, vinyl acetate, a vinyl chloride-vinyl acetate copolymer, a vinyl chloride-vinylidene chloride copolymer, a vinyl chloride-acrylonitrile copolymer, an acrylate ester-acrylonitrile copolymer, an acrylate ester-vinyl chloride-vinylidene chloride copolymer, an acrylate ester-acrylonitrile copolymer, an acrylate ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, nitrocellulose), a styrene butadiene copolymer, a polyurethane resin, a polyester resin, an amino resin, and synthetic rubber.

Examples of the thermosetting resin include a phenol resin, an epoxy resin, a polyurethane curable resin, a urea resin, a melamine resin, an alkyd resin, a silicone resin, a polyamine resin, and a urea formaldehyde resin.

In order to improve the dispersibility of the magnetic powder, polar functional groups such as —$SO_3M$, —$OSO_3M$, —COOM, P=O(OM)$_2$ (in which M in the formula represents a hydrogen atom or an alkali metal such as lithium, potassium, and sodium), a side-chain amine having a terminal group represented by —NR1R2 or —NR1R2R3$^+$X$^-$, a main-chain amine represented by >NR1R2$^+$X$^-$ (in which R1, R2, and R3 in the formula each represent a hydrogen atom or a hydrocarbon group, and X$^-$ represents a halogen element ion such as fluorine, chlorine, bromine, and iodine, or an inorganic or organic ion), —OH, —SH, —CN, and an epoxy group may be introduced into all the above-mentioned binders. The amount of polar functional groups introduced into the binder is favorably $10^{-1}$ to $10^{-8}$ mol/g and more favorably $10^{-2}$ to $10^{-6}$ mol/g.

(Lubricant)

The lubricant contains, for example, at least one type selected from fatty acids and fatty acid esters, favorably, both a fatty acid, and a fatty acid ester. The magnetic layer 43 contains a lubricant, particularly, the magnetic layer 43 contains both a fatty acid and a fatty acid ester, which contributes to improvement of travelling stability of the magnetic tape MT. In more particular, the magnetic layer 43 contains a lubricant and includes pores, thereby achieving favorable travelling stability. The improvement in the travelling stability is because the dynamic friction coefficient on the surface of the magnetic tape MT on the magnetic layer 43 side is adjusted with the above-mentioned lubricant to a value suitable for travelling of the magnetic tape MT.

The fatty acid may favorably be a compound represented by the following general formula (1) or (2). For example, as a fatty acid, one of a compound represented by the following formula (1) and a compound represented by the following formula (2) or both of them may be contained.

Further, the fatty acid ester may favorably be a compound represented by the following general formula (3) or (4). For example, as a fatty acid ester, one of a compound represented by the following formula (3) and a compound represented by the following formula (4) or both of them may be contained.

In the case where the lubricant contains one of the compound represented by the following formula (1) and the compound represented by the following formula (2) or both of them, and one of the compound represented by the following formula (3) and the compound represented by the following formula (4) or both of them, which makes it possible to suppress the increase in the dynamic friction coefficient due to repeated recording or reproduction of the magnetic tape MT.

$$CH_3(CH_2)_kCOOH \qquad (1)$$

(in which in the general formula (1), k is an integer selected from the range of 14 or more and 22 or less, more favorably 14 or more and 18 or less.)

$$CH_3(CH_2)_nCH=CH(CH_2)_mCOOH \qquad (2)$$

(in which in the general formula (2), the sum of n and m is an integer selected from the range of 12 or more and 20 or less, more favorably 14 or more and 18 or less.)

$$CH_3(CH_2)_pCOO(CH_2)_qCH_3 \qquad (3)$$

(in which in the general formula (3), p is an integer selected from the range of 14 or more and 22 or less, more favorably 14 or more and 18 or less, and q is an integer selected from the range of 2 or more and 5 or less, more favorably 2 or more and 4 or less.)

$$CH_3(CH_2)_rCOO—(CH_2)_sCH(CH_3)_2 \qquad (4)$$

(in which in the general formula (4), r is an integer selected from the range of 14 or more and 22 or less, and s is an integer selected from the range of 1 or more and 3 or less.)

(Antistatic Agent)

Examples of the antistatic agent include carbon black, a natural surfactant, a nonionic surfactant, and a cationic surfactant.

(Abrasive)

Examples of the abrasive include α-alumina with an alpha conversion rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, needle-like α-iron oxide obtained by dehydrating and annealing magnetic iron oxide raw material, and those obtained by performing surface treatment thereon with aluminum and/or silica as necessary.

(Curing Agent)

Examples of the curing agent include polyisocyanate. Examples of polyisocyanate include an aromatic polyisocyanate such as an adduct of tolylene diisocyanate (TDI) with an active hydrogen compound, and an aliphatic polyisocyanate such as an adduct of hexamethylene diisocyanate (HMDI) with an active hydrogen compound. The weight average molecular weight of the polyisocyanates is favorably within the range of 100 to 3000.

(Rust Inhibitor)

Examples of the rust inhibitor include phenols, naphthols, quinones, heterocyclic compounds containing a nitrogen atom, heterocyclic compounds containing an oxygen atom, and heterocyclic compounds containing a sulfur atom.

(Non-Magnetic Reinforcing Particle)

Examples of the non-magnetic reinforcing particle include aluminum oxide (α, β, or γ alumina), chromium oxide, silicon oxide, diamond, garnet, emery, boron nitride, titanium carbide, silicon carbide, titanium carbide, and titanium oxide (rutile or anatase titanium oxide).

(Underlayer)

The underlayer 42 is for alleviating the unevenness of the surface of the substrate 41 to adjust the unevenness of the surface of the magnetic layer 43. The underlayer 42 is a non-magnetic layer containing a non-magnetic powder, a binder, and a lubricant. The underlayer 42 supplies a lubricant to the surface of the magnetic layer 43. The underlayer 42 may further contain, as necessary, at least one additive of an antistatic agent, a curing agent, and a rust inhibitor.

The average thickness of the underlayer 42 is favorably 0.3 μm or more and 2.0 μm or less, more favorably 0.5 μm or more and 1.4 μm or less. Note that the average thickness of the underlayer 42 is obtained in a similar way as the average thickness of the magnetic layer 43. However, the magnification of the TEM image is appropriately adjusted in accordance with the thickness of the underlayer 42. In the case where the average thickness of the underlayer 42 is 2.0 µm or less, the expansion/contraction property of the magnetic tape MT due to an external force is further enhanced, which makes it easier to adjust the width of the magnetic tape MT by tension adjustment.

It is favorable that the underlayer 42 includes a large number of holes. By causing the holes to store a lubricant, it is possible to further suppress the decrease in the amount of lubricant supplied between the surface of the magnetic layer 43 and the magnetic head even after repeatedly performing recording or reproduction (i.e., even after the magnetic tape MT is caused to repeatedly travel while the magnetic head 56 is in contact with the surface of the magnetic tape MT). Therefore, it is possible to further suppress the increase in the dynamic friction coefficient. That is, further excellent travelling stability can be achieved.

From the viewpoint of suppressing the decrease in the dynamic friction coefficient after repeated recording or reproduction, it is favorable that the holes of the underlayer 42 and the holes 43A of the magnetic layer 43 are connected to each other. Here, "the holes of the underlayer 42 and the holes 43A of the magnetic layer 43 are connected to each other" includes the state where some of the holes of the underlayer 42 and some of the holes 43A of the magnetic layer 43 are connected to each other.

From the viewpoint of improving supply of the lubricant to the surface of the magnetic layer 43, it is favorable that the holes include those extending in the direction perpendicular to the surface of the magnetic layer 43. Further, from the viewpoint of improving supply of the lubricant to the surface of the magnetic layer 43, the holes of the underlayer 42 extending in the direction perpendicular to the surface of the magnetic layer 43 and the holes 43A of the magnetic layer 43 extending in the direction perpendicular to the surface of the magnetic layer 43 are connected to each other.

(Non-Magnetic Powder)

The non-magnetic powder contains, for example, at least one type of an inorganic particle powder or an organic particle powder. Further, the non-magnetic powder may contain a carbon powder such as carbon black. Note that one type of the non-magnetic powder may be used alone, or two or more types of the non-magnetic powder may be used in combination. The inorganic particle contains, for example, a metal, a metal oxide, a metal carbonate, a metal sulfate, a metal nitride, a metal carbide, or a metal sulfide. Examples of the shape of the non-magnetic powder include, but not limited to, various shapes such as a needle shape, a spherical shape, a cubic shape, and a plate shape.

Examples of the shape of the non-magnetic powder include, but not limited to, various shapes such as a needle shape, a spherical shape, a cubic shape, and a plate shape.

(Binder and Lubricant)

The binder and the lubricant are similar to those of the above-mentioned magnetic layer 43.

(Additive)

The antistatic agent, the curing agent, and the rust inhibitor are similar to those of the above-mentioned magnetic layer 43.

(Back Layer)

The back layer 44 contains a binder and a non-magnetic powder. The back layer 44 may further contain, as necessary, at least one additive of a lubricant, a curing agent, or an antistatic agent. The binder and the non-magnetic powder are similar to those of the above-mentioned underlayer 42.

The average particle size of the non-magnetic powder is favorably 10 nm or more and 150 nm or less, more favorably 15 nm or more and 110 nm or less. The average particle size of the non-magnetic powder is obtained in a similar way to the above-mentioned average particle size of the magnetic powder. The non-magnetic powder may contain a non-magnetic powder having two or more types of particle size distribution.

The upper limit value of the average thickness of the back layer 44 is favorably 0.6 µm or less. In the case where the upper limit value of the average thickness of the back layer 44 is 0.6 µm or less, the thickness of the underlayer 42 or the substrate 41 can be kept thick even in the case where the average thickness of the magnetic tape MT is 5.6 µm or less. Therefore, the travelling stability of the magnetic tape MT in the recording/reproduction apparatus 50 can be maintained. The lower limit value of the average thickness of the back layer 44 is not particularly limited, but is, for example, 0.2 µm or more.

An average thickness $t_b$ of the back layer 44 is obtained as follows. First, an average thickness $t_T$ of the magnetic tape MT is measured. The method of measuring the average thickness $t_T$ is as described in the following "Average Thickness of Magnetic Tape". Subsequently, the back layer 44 of the sample is removed with a solvent such as MEK (methyl ethyl ketone) and dilute hydrochloric acid. Next, the laser hologauge (LGH-110C) manufactured by Mitsutoyo Corporation is used for measuring the thickness of the sample at five or more points, and the measured values are simply averaged (arithmetic average) to calculate an average value $t_B[\mu m]$. After that, the average thickness $t_b[\mu m]$ of the back layer 44 is obtained using the following formula. Note that the measurement positions are randomly selected from the sample.

$$t_b[\mu M]=t_T[\mu M]-t_B[\mu m]$$

The back layer 44 has a surface on which a large number of protrusions 44A is provided. The protrusions 44A are for forming the holes 43A on the surface of the magnetic layer 43 in the state where the magnetic tape MT is wound up in a roll shape. The holes 43A include, for example, a large number of non-magnetic particles protruding from the surface of the back layer 44.

(Average Thickness of Magnetic Tape)

The upper limit value of the average thickness (average total thickness) $t_T$ of the magnetic tape MT is 5.6 µm or less, favorably 5.0 µm or less, more favorably 4.6 µm or less, and still more favorably 4.4 µm or less. In the case where average thickness $t_T$ of the magnetic tape MT is 5.6 µm or less, the recording capacity of one data cartridge can be increased as compared with that of a general magnetic tape. The lower limit value of the average thickness $t_T$ of the magnetic tape MT is not particularly limited, but is, for example, 3.5 µm or more.

The average thickness $t_T$ of the magnetic tape MT is obtained as follows. First, the magnetic tape MT having a width of ½ inch is prepared and cut into a 250 mm length to prepare a sample. Next, the thickness of the sample is measured at five or more points by using the laser hologauge (LGH-110C) manufactured by Mitsutoyo Corporation as a measurement apparatus, and the measured values are simply averaged (arithmetic average) to calculate the average value $t_T[\mu m]$. Note that the measurement positions are randomly selected from the sample.

(Coercive Force Hc)

The upper limit value of a coercive force Hc2 of the magnetic layer 43 in the longitudinal direction of the magnetic tape MT is favorably 2000 Oe or less, more favorably 1900 Oe or less, and still more favorably 1800 Oe or less. In the case where the coercive force Hc2 of the magnetic layer 43 in the longitudinal direction is 2000 Oe or less, sufficient electromagnetic conversion characteristics while having a high recording density can be achieved.

The lower limit value the coercive force Hc2 of the magnetic layer 43 measured in the longitudinal direction of the magnetic tape MT is favorably 1000 Oe or more. In the case where the coercive force Hc2 of the magnetic layer 43 measured in the longitudinal direction is 1000 Oe or more, it is possible to suppress demagnetization due to leakage flux from the recording head.

The above-mentioned coercive force Hc2 is obtained as follows. First, three magnetic tapes MT are overlapped with each other with double-sided tapes, and then punched out with a φ6.39 mm punch to prepare a measurement sample. At this time, marking is performed with an arbitrary ink that does not have magnetism so that the longitudinal direction (travelling direction) of the magnetic tape MT can be recognized. Then, an M-H loop of the measurement sample (entire magnetic tape MT) corresponding to the longitudinal direction (travelling direction) of the magnetic tape MT is measured using a vibrating sample magnetometer (VSM). Next, the coating films (the underlayer 42, the magnetic layer 43, the back layer 44, and the like) are wiped by using acetone, ethanol, or the like, leaving only the substrate 41. Then, the obtained three substrates 41 are overlapped with each other with double-sided tapes, and then punched out with a φ6.39 mm punch to prepare a sample for back ground correction (hereinafter, referred to simply as "correction sample"). After that, the M-H loop of the correction sample (substrate 41) corresponding to the vertical direction of the substrate 41 (vertical direction of the magnetic tape MT) is measured using the VSM.

In measuring the M-H loop of the measurement sample (entire magnetic tape MT) and the M-H loop of the correction sample (substrate 41), a high sensitivity vibrating sample magnetometer "VSM-P7-15" manufactured by TOEI INDUSTRY CO., LTD. is used. The measurement conditions are a measurement mode: full loop, the maximum magnetic field: 15 kOe, a magnetic field step: 40 bit, Time constant of Locking amp: 0.3 sec, Waiting time: 1 sec, and the average number of MH: 20.

After obtaining the M-H loop of the measurement sample (entire magnetic tape MT) and the M-H loop of the correction sample (substrate 41), background correction is performed by subtracting the M-H loop of the correction sample (substrate 41) from the M-H loop of the measurement sample (entire magnetic tape MT) to obtain the M-H loop after the back ground correction. For the calculation of the back ground correction, a measurement/analysis program attached to the "VSM-P7-15" is used. The coercive force Hc2 is obtained on the basis of the obtained M-H loop after the back ground correction. Note that for this calculation, a measurement/analysis program attached to the "VSM-P7-15" is used. Note that all of the above-mentioned M-H loops are measured at 25° C. Further, "demagnetizing field correction" when measuring the M-H loop in the longitudinal direction of the magnetic tape MT is not performed.

(Squareness Ratio)

A squareness ratio S1 of the magnetic layer 43 in the vertical direction (thickness direction) of the magnetic tape MT is favorably 65% or more, more favorably 70% or more, still more favorably 75% or more, particularly favorably 80% or more, and most favorably 85% or more. In the case where the squareness ratio S1 is 65% or more, since the vertical orientation of the magnetic powder is sufficiently high, further excellent electromagnetic conversion characteristics (e.g., SNR) can be achieved.

The squareness ratio S1 in the vertical direction is obtained as follows. First, three magnetic tapes MT are overlapped with each other with double-sided tapes, and then punched out with a φ6.39 mm punch to prepare a measurement sample. At this time, marking is performed with an arbitrary ink that does not have magnetism so that the longitudinal direction (travelling direction) of the magnetic tape MT can be recognized. Then, an M-H loop of the measurement sample (entire magnetic tape MT) corresponding to the vertical direction (thickness direction) of the magnetic tape MT is measured using the VSM. Next, the coating films (the underlayer 12, the magnetic layer 43, the back layer 44, and the like) are wiped by using acetone, ethanol, or the like, leaving only the substrate 41. Then, the obtained three substrates 41 are overlapped with each other with double-sided tapes, and then punched out with a φ6.39 mm punch to prepare a sample for back ground correction (hereinafter, referred to simply as "correction sample"). After that, the M-H loop of the correction sample (substrate 41) corresponding to the vertical direction of the substrate 41 (vertical direction of the magnetic tape MT) is measured using the VSM.

In measuring the M-H loop of the measurement sample (entire magnetic tape MT) and the M-H loop of the correction sample (substrate 41), the high sensitivity vibrating sample magnetometer "VSM-P7-15" manufactured by TOEI INDUSTRY CO., LTD. is used. The measurement conditions are a measurement mode: full loop, the maximum magnetic field: 15 kOe, a magnetic field step: 40 bit, Time constant of Locking amp: 0.3 sec, Waiting time: 1 sec, and the average number of MH: 20.

After obtaining the M-H loop of the measurement sample (entire magnetic tape MT) and the M-H loop of the correction sample (substrate 41), background correction is performed by subtracting the M-H loop of the correction sample (substrate 41) from the M-H loop of the measurement sample (entire magnetic tape MT) to obtain the M-H loop after the back ground correction. For the calculation of the back ground correction, a measurement/analysis program attached to the "VSM-P7-15" is used.

A saturation magnetization Ms (emu), and a residual magnetization Mr (emu) of the obtained M-H loop after the back ground correction is substituted into the following formula to calculate the squareness ratio S1 (%). Note that all of the above-mentioned M-H loops are measured at 25° C. Further, Further, "demagnetizing field correction" when measuring the M-H loop in the vertical direction of the magnetic tape MT is not performed. Note that for this calculation, a measurement/analysis program attached to the "VSM-P7-15" is used.

$$\text{Squareness ratio } S1(\%) = (Mr/Ms) \times 100$$

A squareness ratio S2 of the magnetic layer 43 in the longitudinal direction(travelling direction) of the magnetic tape MT is favorably 35% or less, more favorably 30% or less, still more favorably 25% or less, particularly favorably 20% or less, and most favorably 15% or less. In the case where the squareness ratio S2 is 35% or less, since the vertical orientation of the magnetic powder is sufficiently high, further excellent electromagnetic conversion characteristics (e.g., SNR) can be achieved.

The squareness ratio S2 in the longitudinal direction is obtained in a similar way to the squareness ratio S1 except that the M-H loop is measured in the longitudinal direction (travelling direction) of the magnetic tape MT and the substrate 41.

(The Ratio Hc2/Hc1)

A ratio the ratio Hc2/Hc1 of the coercive force Hc1 of the magnetic layer 43 in the vertical direction and the coercive force Hc2 of the magnetic layer 43 in the longitudinal direction satisfies the relationship of the ratio Hc2/Hc1≤0.8, favorably the ratio Hc2/Hc1≤0.75, more favorably the ratio Hc2/Hc1≤0.7, still more favorably the ratio Hc2/Hc1≤0.65, and particularly favorably the ratio Hc2/Hc1≤0.6. In the case where the coercive forces Hc1 and Hc2 satisfy the relationship of the ratio Hc2/Hc1≤0.8, it is possible to increase the degree of vertical orientation of the magnetic powder. Therefore, since the magnetization transition width can be reduced and a high output signal can be achieved at the time of signal reproduction, it is possible to achieve further excellent electromagnetic conversion characteristics (e.g., SNR). Note that since magnetization reacts sensitively by the magnetic field in the vertical direction from the recording head in the case where Hc2 is small as described above, it is possible to form a favorable recording pattern.

In the case where the ratio Hc2/Hc1 satisfies the relationship of the ratio Hc2/Hc1≤0.8, it is particularly effective that the average thickness of the magnetic layer 43 is 90 nm or less. In the case where the average thickness of the magnetic layer 43 exceeds 90 nm, there is a possibility that the lower region (region on the side of the underlayer 42) of the magnetic layer 43 is magnetized in the longitudinal direction when a ring-type head is used as a recording head, which makes it impossible to uniformly magnetize the magnetic layer 43 in the thickness direction. Therefore, there is a possibility that further excellent electromagnetic conversion characteristics (e.g., SNR) cannot be achieved even if the ratio Hc2/Hc1 satisfies the relationship of the ratio Hc2/Hc1≤0.8 (i.e., even if the degree of vertical orientation of the magnetic powder is increased).

The lower limit value of the ratio Hc2/Hc1 is not particularly limited, but is, for example, 0.5 or more (0.5≤the ratio Hc2/Hc1). Note that the ratio Hc2/Hc1 represents the degree of vertical orientation of the magnetic powder, and the degree of vertical orientation of the magnetic powder increases as the ratio Hc2/Hc1 is smaller.

The method of calculating the coercive force Hc2 of the magnetic layer 43 in the longitudinal direction is as described above. The coercive force Hc1 of the magnetic layer 43 in the vertical direction is obtained in a similar way to the coercive force Hc2 of the magnetic layer 43 in the longitudinal direction except that the M-H loop is measured in the vertical direction (thickness direction) of the magnetic tape MT and the substrate 41.

(Activation Volume $V_{act}$)

An activation volume $V_{act}$ is favorably 8000 nm³ or less, more favorably 6000 nm³ or less, still more favorably 5000 nm³ or less, particularly favorably 4000 nm³ or less, and most favorably 3000 nm³ or less. In the case where the activation volume $V_{act}$ is 8000 nm³ or less, since the dispersion state of the magnetic powder is improved, the bit inversion region can be reduced, and it is possible to prevent the magnetization signal recorded in the adjacent track from being deteriorated due to the leakage magnetic field from the recording head. Therefore, there is a possibility that further excellent electromagnetic conversion characteristics (e.g., SNR) cannot be achieved.

The above-mentioned activation volume $V_{act}$ is obtained by the following formula derived by Street&Woolley.

$$V_{act}(\mathrm{nm}^3)=k_B \times T \times X_{irr}/(\mu_0 \times M_S \times S)$$

(in which $k_B$: Boltzmann's constant (1.38×10⁻²³ J/K), T: temperature (K), $X_{irr}$: irreversible magnetic susceptibility, $\mu_0$: vacuum permeability, S: magnetic viscosity coefficient, Ms: saturation magnetization (emu/cm³))

The irreversible magnetic susceptibility $X_{irr}$, the saturation magnetization Ms, and the magnetic viscosity coefficient S substituted into the above-mentioned formula are obtained as follows by using the VSM. Note that the measurement direction by the VSM is assumed to be the thickness direction (vertical direction) of the magnetic tape MT. Further, the measurement by the VSM is performed on the measurement sample cut out from the elongated magnetic tape MT at 25° C. Further, "demagnetizing field correction" when measuring the M-H loop in the thickness direction (vertical direction) of the magnetic tape MT is not performed.

(Irreversible Magnetic Susceptibility $X_{irr}$.)

The irreversible magnetic susceptibility $X_{irr}$ is defined as the slope in the vicinity of a residual coercive force Hr in the slope of the residual magnetization curve (DCD curve). First, a magnetic field of −1193 kA/m (15 kOe) is applied to the entire magnetic tape MT, and the magnetic field is returned to zero, thereby achieving a residual magnetization state. After that, a magnetic field of approximately 15.9 kA/m (200 Oe) is applied in the opposite direction, the magnetic field is returned to zero again, and the amount of residual magnetization is measured. After that, similarly, the measurement in which a magnetic field of 15.9 kA/m larger than the previous applied magnetic field is applied and the magnetic field is returned to zero is repeated, and the amount of residual magnetization is plotted against the applied magnetic field to measure the DCD curve. A point at which the amount of magnetization is zero in the obtained DCD curve is taken as the residual coercive force Hr, and the DCD curve is differentiated to obtain the slope of the DCD curve in each magnetic field. In the slope of the DCD curve, the slope near the residual coercive force Hr is $X_{irr}$.

(Saturation Magnetization Ms)

First, in a similar way to the above-mentioned method of measuring the squareness ratio S1, the M-H loop after background correction is obtained. Next, on the basis of the value of the saturation magnetization Ms (emu) of the obtained M-H loop and the volume (cm³) of the magnetic layer 43 in the measurement sample, Ms (emu/cm³) is calculated. Note that the volume of the magnetic layer 43 is obtained by multiplying the area of the measurement sample by the average thickness of the magnetic layer 43. The method of calculating the average thickness of the magnetic layer 43 necessary for calculating the volume of the magnetic layer 43 is as described above.

(Magnetic Viscosity Coefficient S)

First, a magnetic field of −1193 kA/m (15 kOe) is applied to the entire magnetic tape MT (measurement sample), and the magnetic field is returned to zero, thereby achieving a residual magnetization state. After that, a magnetic field having a value similar to that of the residual coercive force Hr obtained from the DCD curve is applied in the opposite direction. In the state where the magnetic field is applied, the amount of magnetization is continuously measured at constant time intervals for 1000 seconds. The relationship between a time t and a magnetization amount M(t) thus obtained is compared with the following formula to calculate the magnetic viscosity coefficient S.

$$M(t)=M0+S \times \ln(t)$$

(in which M(t): a magnetization amount at the time t, M0: an initial magnetization amount, S: a magnetic viscosity coefficient, ln(t): a natural logarithm of time)

(Surface Roughness $R_b$ of Back Surface)

It is favorable that a surface roughness $R_b$ of a back surface (surface roughness of the back layer 44) satisfies the relationship of $R_b \leq 6.0$ [nm]. In the case where the surface roughness $R_b$ of the back surface is within the above-mentioned range, further excellent electromagnetic conversion characteristics can be achieved.

The surface roughness $R_b$ of the back surface is obtained as follows. First, the magnetic tape MT having width of 12.65 mm is prepared and cut into a 100 mm length to prepare a sample. Next, the sample is placed on a slide glass so that a surface of the sample to be measured (surface on the magnetic layer side) is directed upward, and an end of the sample is fixed with a mending tape. The surface shape is measured using VertScan (objective lens 50 times) as a measurement apparatus, and the surface roughness $R_b$ of the back surface is obtained from the following formula on the basis of the ISO 25178 standard.

Apparatus: Non-contact roughness meter using optical interference (manufactured by Ryoka Systems Inc., non-contact surface/layer cross-sectional shape measurement system VertScan R5500GL-M100-AC)

Objective lens: 20 times
Measurement region: 640×480 pixels (field of view: approximately 237 μm×178 μm field of view)
Measurement mode: phase
Wavelength filter: 520 nm
CCD: ⅓ lens
Noise removal filter: smoothing 3×3
Surface correction: correction on quadratic polynomial approximated surface
Measurement software: VS-Measure Version5.5.2
Analysis software: VS-viewer Version5.5.5

$$S_a = \frac{1}{A} \int_A \int |Z(x, y)| dx dy \quad \text{(Math. 8)}$$

After measuring the surface roughness at least five or more points in the longitudinal direction as described above, the average value of arithmetic average roughnesses Sa (nm) automatically calculated on the basis of the surface profile obtained at each position is taken as the surface roughness $R_b$ (nm) of the back surface.

(Young's Modulus of Magnetic Tape in Longitudinal Direction)

The Young's modulus of the magnetic tape MT in the longitudinal direction is favorably 8.0 GPa or less, more favorably 7.9 GPa or less, still more favorably 7.5 GPa or less, and particularly favorably 7.1 GPa or less. In the case where the Young's modulus of the magnetic tape MT in the longitudinal direction is 8.0 GPa or less, the expansion/contraction property of the magnetic tape MT due to an external force is further enhanced, which makes it easier to adjust the width of the magnetic tape MT by tension adjustment. Therefore, it is possible to further appropriately suppress off-track and further accurately reproduce data recorded in the magnetic tape MT.

The Young's modulus of the magnetic tape MT in the longitudinal direction is a value indicating the difficulty of expansion and contraction of the magnetic tape MT in the longitudinal direction due to an external force. The larger this value, the more difficult the magnetic tape MT is expanded and contracted in the longitudinal direction due to an external force. The smaller this value, the easier the magnetic tape MT is expanded and contracted in the longitudinal direction due to an external force.

Note that the Young's modulus of the magnetic tape MT in the longitudinal direction is a value relating to the magnetic tape MT in the longitudinal direction, and is correlated with the difficulty of expansion and contraction of the magnetic tape MT in the width direction. That is, the larger this value, the more difficult the magnetic tape MT is expanded and contracted in the width direction due to an external force. The smaller this value, the easier the magnetic tape MT is expanded and contracted in the width direction due to an external force. Therefore, from the viewpoint of tension adjustment, it is advantageous that the Young's modulus of the magnetic tape MT in the longitudinal direction is smaller.

For measurement of the Young's modulus, a tensile tester (manufactured by Shimadzu Corporation, AG-100D) is used. In the case where the Young's modulus in the tape longitudinal direction is desired to be measured, the tape is cut into a 180 mm length to prepare a measurement sample. A jig capable of fixing the tape width (½ inch) is attached to the above-mentioned tensile tester to fix the top and bottom of the tape width. The distance (length of the tape between chucks) is set to 100 mm. After chucking the data sample, stress is gradually applied in the direction of pulling the sample. The pulling speed is set to 0.1 mm/min. The Young's modulus is calculated using the following formula on the basis of the change in stress and the amount of elongation at this time.

$$E(N/m^2) = ((\Delta N/S)/(\Delta x/L)) \times 10^6$$

ΔN: change in stress (N)
S: cross-sectional area of test piece (mm$_2$)
Δx: amount of elongation (mm)
L: distance between gripping jigs (mm)

The stress range is 0.5N to 1.0N, and the change in stress (ΔN) and the amount of elongation (Δx) at this time are used for calculation.

(Young's Modulus of Substrate in Longitudinal Direction)

The Young's modulus of the substrate 41 in the longitudinal direction is favorably 7.5 GPa or less, more favorably 7.4 GPa or less, still more favorably 7.0 GPa or less, and particularly favorably 6.6 GPa or less. In the case where the Young's modulus of the substrate 41 in the longitudinal direction is 7.5 GPa or less, the expansion/contraction property of the magnetic tape MT due to an external force is further enhanced, which makes it easier to adjust the width of the magnetic tape MT by tension adjustment. Therefore, it is possible to further appropriately suppress off-track and further accurately reproduce data recorded in the magnetic tape MT.

The above-mentioned Young's modulus of the substrate 41 in the longitudinal direction is obtained as follows. First, the underlayer 42, the magnetic layer 43, and the back layer 44 are removed from the magnetic tape MT to obtain the substrate 41. Using this substrate 41, the Young's modulus of the substrate 41 in the longitudinal direction is obtained in a similar procedure to the above-mentioned Young's modulus of the magnetic tape MT in the longitudinal direction.

The thickness of the substrate 41 is more than half the thickness of the entire magnetic tape MT. Therefore, the Young's modulus of the substrate 41 in the longitudinal direction is correlated with the difficulty of expansion and contraction of the magnetic tape MT due to an external force. The larger this value, the more difficult the magnetic tape MT is expanded and contracted in the width direction due to an external force. The smaller this value, the easier the magnetic tape MT is expanded and contracted in the width direction due to an external force.

Note that the Young's modulus of the substrate 41 in the longitudinal direction is a value relating to the magnetic tape MT in the longitudinal direction, and is correlated with the difficulty of expansion and contraction of the magnetic tape MT in the width direction. That is, the larger this value, the more difficult the magnetic tape MT is expanded and contracted in the width direction due to an external force. The smaller this value, the easier the magnetic tape MT is expanded and contracted in the width direction due to an external force. Therefore, from the viewpoint of tension adjustment, it is advantageous that the Young's modulus of the substrate 41 in the longitudinal direction is smaller.

(Dynamic Friction Coefficient)

A friction coefficient ratio ($\mu_B/\mu_A$) of a dynamic friction coefficient $\mu_B$ between the surface of the magnetic layer 43 and the magnetic head 56 when the tension applied to the magnetic tape MT is 0.4 N to a dynamic friction coefficient $\mu_A$ between the surface of the magnetic layer 43 and the magnetic head 56 when the tension applied to the magnetic tape MT is 1.2 N is favorably 1.0 or more and 2.0 or less, more favorably 1.0 or more and 1.5 or less. In the case where the friction coefficient ratio ($\mu_B/\mu_A$) is 1.0 or more an 2.0 or less, the change in the dynamic friction coefficient due to tension fluctuation during travelling can be reduced, and thus, excellent travelling stability can be achieved also in the case where tension adjustment of the magnetic tape MT is performed during travelling of the magnetic tape MT.

Figure 10:
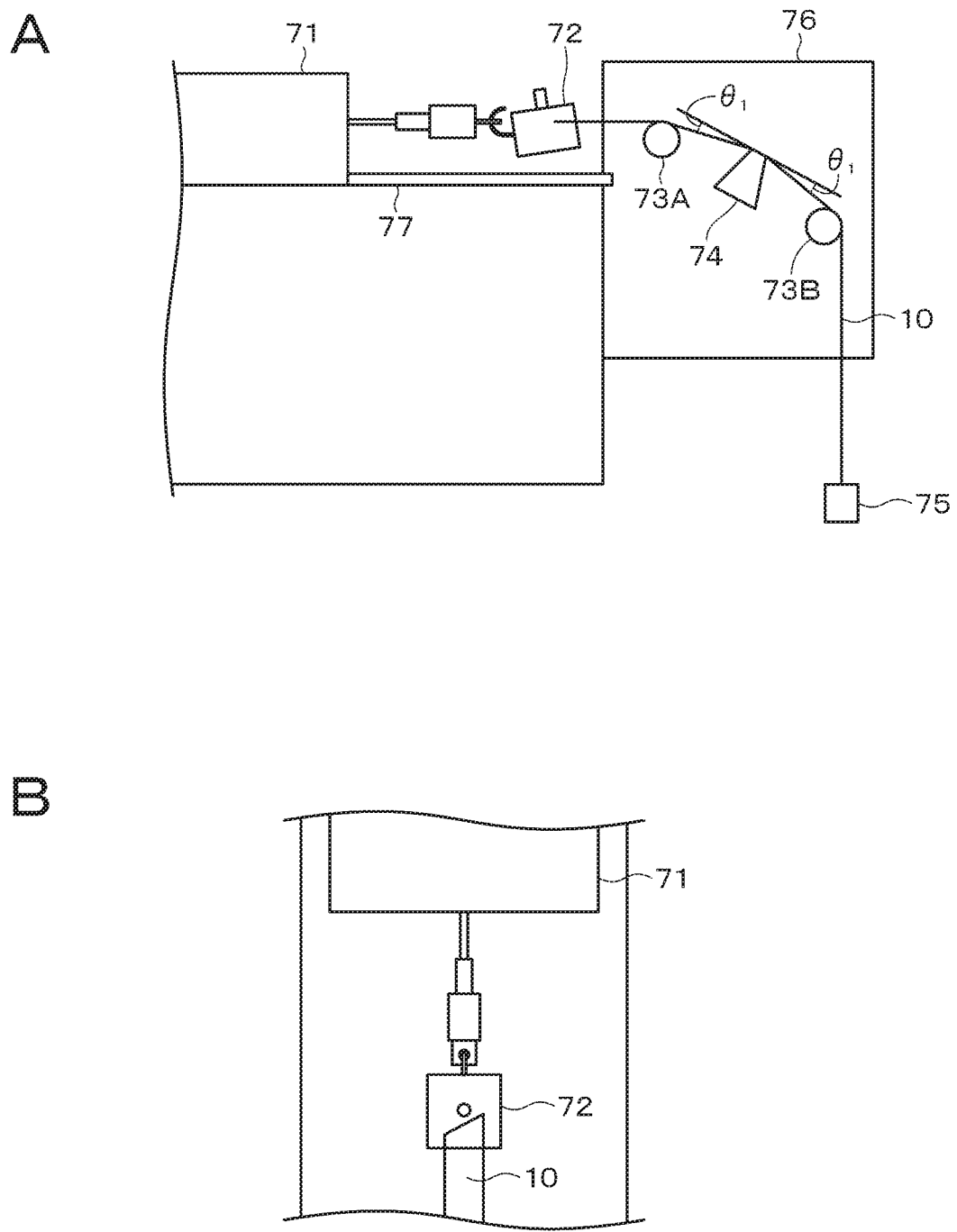
FIG. 10 Part A and Part B of FIG. 10 are each a schematic diagram describing a method of measuring a friction coefficient between a magnetic surface and the magnetic head.

The dynamic friction coefficient $\mu_A$ and the dynamic friction coefficient $\mu_B$ for calculating the friction coefficient ratio ($\mu_B/\mu_A$) are obtained as follows. First, as shown in Part A of FIG. 10, the magnetic tape MT having a width of ½ inch is placed on two guide rolls 73A and 73B each having a cylindrical shape having a diameter of one inch disposed in parallel to be apart from each other so that the magnetic surface is in contact with the guide rolls 73A and 73B. The two the guide rolls 73A and 73B are fixed to a hard plate member 76, and thus, the positional relationship between them is fixed.

Subsequently, the magnetic tape MT is caused to be in contact with a head block (for recording/reproduction) 74 mounted on the LTOS drive so that the magnetic surface is in contact with the head block 74 and a wrap angle $\theta_1$ (°)=5.6°. The head block 74 is disposed substantially at the center of the guide rolls 73A and 73B. The head block 74 is movably attached to the plate member 76 so that the wrap angel $\theta_1$ can be changed. However, in the case where the wrap angle $\theta_1$ (°) becomes 5.6°, the position is fixed to the plate member 76, thereby fixing also the positional relationship between the guide rolls 73A and 73B and the head block 74.

One end of the magnetic tape MT is connected to a movable strain gauge 71 via a jig 72. As shown in Part B of FIG. 10, the magnetic tape MT is fixed to the jig 72. A weight 75 is connected to the other end of the magnetic tape MT. The weight 75 applies tension of 0.4 N ($T_0[N]$) in the longitudinal direction of the magnetic tape MT. The movable strain gauge 71 is fixed on a base 77. Also the positional relationship between the base 77 and the plate member 76 is fixed, and thus, the positional relationship between the guide rolls 73A and 73B, the head block 74, and the movable strain gauge 71 is fixed.

The movable strain gauge 71 slides the magnetic tape MT on the head block 74 by 60 mm so that the magnetic tape MT moves to the movable strain gauge 71 at 10 mm/s. The output value (voltage) of the movable strain gauge 71 during sliding is converted into T[N] on the basis of the linear relationship (described below) between the output value and the load acquired in advance. T[N] is acquired 13 times during the period from the start to stop of the above-mentioned 60 mm sliding, and 11 T[N] excluding the first one and the last one are simply averaged, thereby obtaining $T_{ave}$ [N].

After that, the dynamic friction coefficient $\mu_A$ is obtained using the following formula.

$$\mu_A = \frac{1}{(\theta_1[°]) \times (\pi/180)} \times \ln\left(\frac{T_{ave}[N]}{T_0[N]}\right) \quad \text{(Math. 9)}$$

The above-mentioned linear relationship is obtained as follows. That is, the output values (voltage) of the movable strain gauge 71 both in the case where a load of 0.4 N is applied to the movable strain gauge 71 and in the case where a load of 1.5 N is applied to the movable strain gauge 71 are obtained. The linear relationship between the output value and the load is obtained on the basis of the two obtained output values and the above-mentioned two loads. Using the linear relationship, the output value (voltage) of the movable strain gauge 71 during sliding is converted into T[N] as described above.

The dynamic friction coefficient $\mu_B$ is measured by the same method as the method of measuring the dynamic friction coefficient $\mu_A$ except that the above-mentioned tension $T_0[N]$ to be applied to the other end is set to 1.2 N.

On the basis of the dynamic friction coefficient $\mu_A$ and the dynamic friction coefficient $\mu_B$ measured in this way, the friction coefficient ratio (μB/μA) is calculated.

When the dynamic friction coefficient between the surface of the magnetic layer 43 and the magnetic head 56 in the case where tension to be applied to the magnetic tape MT is 0.6 N is $\mu_C$, the friction coefficient ratio ($\mu_C(1000)/\mu_C(5)$) of the dynamic friction coefficient $\mu_C$ (1000) at the time of 1000th travelling to the dynamic friction coefficient $\mu_C$ (5) at the time of fifth travelling is favorably 1.0 or more and 2.0 or less, more favorably 1.0 or more and 1.5 or less. In the case where the friction coefficient ratio ($\mu_C(1000)/\mu_C(5)$) is 1.0 or more and 2.0 or less, the change in the dynamic friction coefficient after the 1000th travelling can be reduced, and thus, excellent travelling stability can be achieved even after the 1000th travelling. Here, as the magnetic head 56, one including a drive that supports the magnetic tape MT is used.

The dynamic friction coefficient $\mu_C(5)$ and the dynamic friction coefficient $\mu_C(1000)$ for calculating the friction coefficient ratio ($\mu_C(1000)/\mu_C(5)$) are obtained as follows. The magnetic tape MT is connected to the movable strain gauge 71 in the same way as the method of measuring the dynamic friction coefficient μA except that the above-mentioned tension $T_0[N]$ to be applied to the other end of the magnetic tape MT is set to 0.6 N. Then, the magnetic tape MT is slid by 60 mm toward the movable strain gauge at 10 mm/s with respect to the head block 74 (outward path), and slid by 60 mm to be away from the movable strain gauge (return path). This reciprocating operation is repeated 1000 times. The output value (voltage) of the movable strain gauge is acquired 13 times during the period from the start of the fifth 60 mm sliding through the outward path to the stop of sliding in the 1000 reciprocating operations, and is converted into T[N] on the basis of the linear relationship (described below) between the output value and the load obtained in the dynamic friction coefficient $\mu_4$. Eleven T[N] excluding the first one and the last one are simply averaged, thereby obtaining $T_{ave}$ [N]. The dynamic friction coefficient $\mu_C(5)$ is obtained using the following formula.

$$\mu_C(5) = \frac{1}{(\theta_1[°]) \times (\pi/180)} \times \ln\left(\frac{T_{ave}[N]}{T_0[N]}\right) \quad \text{(Math. 10)}$$

The above-mentioned linear relationship is obtained as follows. That is, the output values (voltage) of the movable strain gauge 71 both in the case where a load of 0.4 N is applied to the movable strain gauge 71 and in the case where a load of 1.5 N is applied to the movable strain gauge 71 are obtained. The linear relationship between the output value and the load is obtained on the basis of the two obtained output values and the above-mentioned two loads. Using the linear relationship, the output value (voltage) of the movable strain gauge 71 during sliding is converted into T[N] as described above.

Further, the dynamic friction coefficient $\mu_C(1000)$ is obtained in a similar way to the dynamic friction coefficient $\mu_C(5)$ except that measurement on the 1000th outward path is performed.

On the basis of the dynamic friction coefficient $\mu_C(5)$, and the dynamic friction coefficient $\mu_C(1000)$ measured as described above, the friction coefficient ratio $\mu_C(1000)/\mu_C(5)$ is calculated.

[Configuration of Servo Writer]

Next, an example of a configuration of a servo writer 210 to be used for writing the above-mentioned servo pattern will be described with reference to FIG. 11, Part A of FIG. 12, and Part B of FIG. 12.

The servo writer 210 has a configuration similar to that of the servo writer described in WO 2019/093469 (particularly, servo writer described with reference to FIG. 1 in the same literature) except for a servo signal writing head 219. As the servo signal writing head 219, the servo signal writing head described in Japanese Patent Application Laid-open No. 2006-127730 (particularly, the servo signal writing head described with reference to FIG. 26 in the same literature).

Figure 11:
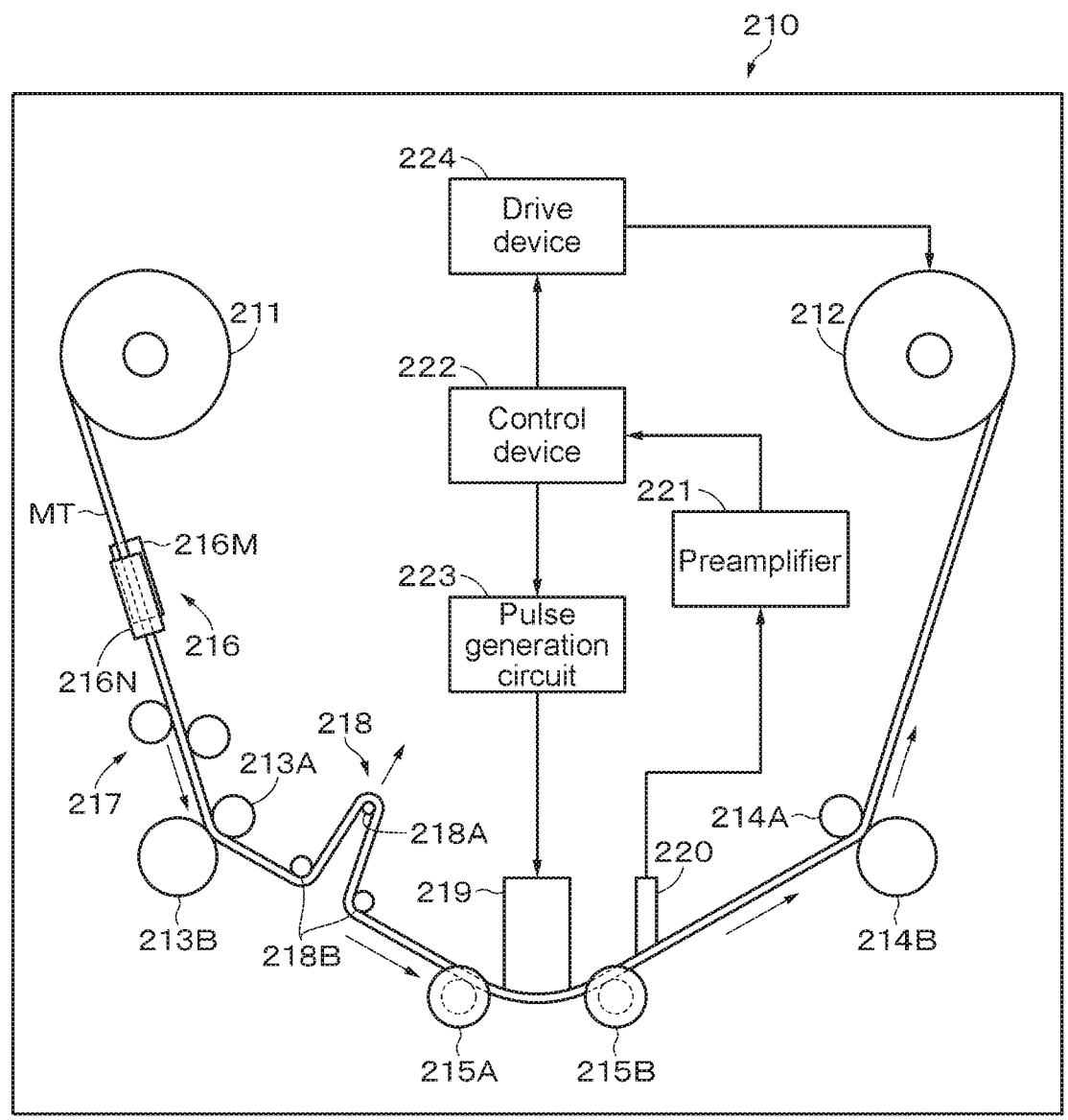
FIG. 11 is a schematic diagram showing an example of a configuration of a servo writer.

As shown in FIG. 11, a servo track writer 210 includes a delivery reel 211, a take-up reel 212, capstans 213A and 214A, pinch rollers 213B and 214B, guide rollers 215A and 215B, a polishing unit 216, a dusting unit 217, a tension adjustment unit 218, the servo signal writing head 219, a servo signal reading head 220, a preamplifier 221, a control device 222, a pulse generation circuit 223, and a drive device 224. This servo track writer 210 is an apparatus for writing a servo signal to servo bands of the elongated magnetic tape MT. The tension adjustment unit 218 includes a tension arm 218A and a pair of support units 218B.

Figure 12:
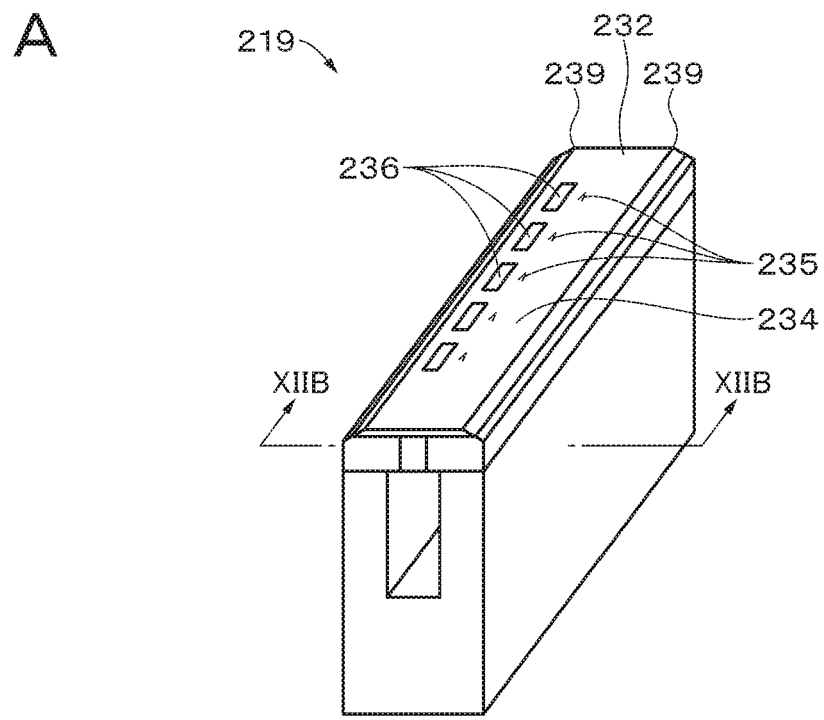
FIG. 12 Part A of FIG. 12 is a perspective view showing an example of a configuration of a servo signal writing head. Part B of FIG. 12 is a cross-sectional view taken along the line XIIB-XIIB in Part A of FIG. 12.
Figure 12:
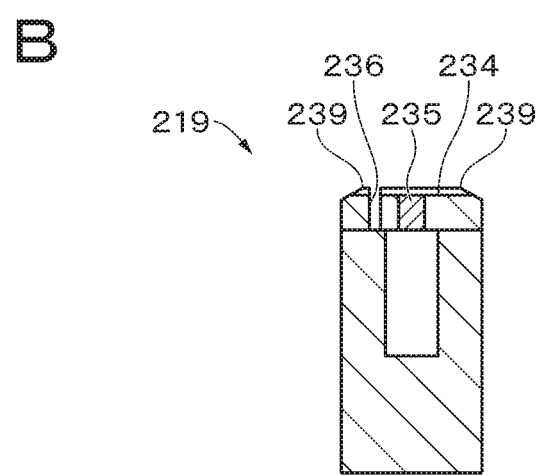

As shown in Part A of FIG. 12, the servo signal writing head 219 includes a head chip 232, and has, on the top surface of the head chip 232, a sliding surface 234 for a linear-type magnetic tape (not shown). In the sliding surface 234, at least a magnetic head unit 235 including recording elements, some of which is used for servo signal recording, and a bottomed cavity 236 having a closed periphery are formed.

As shown in Part B of FIG. 12, at least a part of the sliding surface 234 of the servo signal writing head 219 is a flat surface. A linear-type magnetic tape (not shown) disposed to face the sliding surface 234 has a smaller spacing with the sliding surface 234 during travelling, because the nearby air is taken by the edge portion of the magnetic head sliding surface 234 and the pressure is reduced by the bottomed cavity 236.

By adjusting the distance between the servo signal writing head 219, which is mounted on the servo track writer 210 and has a cavity, and the guide rollers 215A and 215B adjacent to the servo signal writing head 219, and adjusting the angle of the tape entering the servo signal writing head 219, it is possible to adjust the friction between the servo signal writing head 219 and the magnetic tape MT when recording servo patterns. By adjusting the friction in this way, it is possible to adjust $\sigma_{SW}$ of the magnetic tape MT. As the friction between the servo signal writing head 219 and the magnetic tape MT when recording servo patterns is reduced, $\sigma_{SW}$ tends to decrease.

[Method of Producing Magnetic Tape]

Next, an example of the method of producing the magnetic tape MT having the above-mentioned configuration will be described.

(Process of Preparing Coating Material)

First, a non-magnetic powder, a binder, and the like are kneaded and dispersed in a solvent to prepare a coating material for forming an underlayer. Next, a magnetic powder, a binder, and the like are kneaded and dispersed in a solvent to prepare a coating material for forming a magnetic layer. For the preparation of the coating material for forming a magnetic layer and the coating material for forming an underlayer, for example, the following solvents, dispersing devices, and kneading devices can be used.

Examples of the solvent used for preparing the above-mentioned coating material include ketone solvents such as acetone, methyl ethyl ketone, methyl isobutyl ketone, and cyclohexanone, alcohol solvents such as methanol, ethanol, and propanol, ester solvents such as methyl acetate, ethyl acetate, butyl acetate, propyl acetate, ethyl lactate, and ethylene glycol acetate, ether solvents such as diethylene glycol dimethyl ether, 2-ethoxyethanol, tetrahydrofuran, and dioxane, aromatic hydrocarbon solvents such as benzene, toluene, and xylene, and halogenated hydrocarbon solvents such as methylene chloride, ethylene chloride, carbon tetrachloride, chloroform, and chlorobenzene. These may be used alone or mixed appropriately for use.

As the kneading device used for preparing the above-mentioned coating material, for example, kneading devices such as a continuous twin-screw kneader, a continuous twin-screw kneader capable of performing dilution in multi-stages, a kneader, a pressure kneader, and a roll kneader can be used. However, the present disclosure is not particularly limited to these devices. Further, as the dispersing device used for preparing the above-mentioned coating material, for example, dispersing devices such as a roll mill, a ball mill, a horizontal sand mill, a vertical sand mill, a spike mill, a pin mill, a tower mill, a pearl mill (e.g., "DCP mill" manufactured by Nippon Eirich Co., Ltd.) a homogenizer, and an ultrasonic dispersion machine can be used. However, the present disclosure is not particularly limited to these devices.

(Coating Process)

Next, the coating material for forming an underlayer is coated on one main surface of the substrate 41 and dried to form the underlayer 42. Subsequently, the coating material for forming a magnetic layer is coated on the underlayer 42 and dried to form the recording layer 43 on the underlayer 42. Note that during drying, the magnetic field of the magnetic powder may be oriented in the thickness direction of the substrate 41 by, for example, a solenoid coil. Further, during drying, after the magnetic field of the magnetic powder may be oriented in the travelling direction (longitudinal direction) of the substrate 41 by, for example, a solenoid coil, the magnetic field of the magnetic powder may be oriented in the thickness direction of the substrate 41. By performing processing of causing the magnetic field of the magnetic powder to be oriented in the longitudinal direction as described above, it is possible to further improve the degree of vertical orientation (i.e., the squareness ratio S1) of the magnetic powder. After forming the magnetic layer 43, the back layer 44 is formed on the other main surface of the substrate 41. As a result, the magnetic tape MT is obtained.

The squareness ratios S1 and S2 are each set to a desired value by adjusting, for example, the strength of the magnetic field to be applied to the coating film of the coating material for forming a magnetic layer, the concentration of solid content in the coating material for forming a magnetic layer, and the drying conditions (drying temperature and drying time) of the coating film of the coating material for forming a magnetic layer. The strength of the magnetic field to be applied to the coating film is favorably two or more times and three or less times the coercive force of the magnetic powder. In order to further increase the squareness ratio S1 (i.e., in order to further decrease the squareness ratio S2), it is favorable to improve the dispersion state of the magnetic powder in the coating material for forming a magnetic layer. Further, in order to further increase the squareness ratio S1, it is also effective to magnetize the magnetic powder at the stage before the coating material for forming a magnetic layer enters the orientation device for causing the magnetic field of the magnetic powder to be oriented. Note that the above-mentioned method of adjusting the squareness ratios S1 and S2 may be used alone or two or more methods may be used in combination.

(Calendar Process and Transfer Process)

After that, calendar process is performed on the obtained magnetic tape MT to smooth the surface of the magnetic layer 43. Next, after winding, into a roll, the magnetic tape MT on which calendar process has been performed, heat treatment is performed on the magnetic tape MT in this state, and thus, the protrusions 44A on the surface of the back layer 44 are transferred to the surface of the magnetic layer 43. As a result, the holes 43A are formed on the surface of the magnetic layer 43.

The temperature of the heat treatment is favorably 55° C. or more and 75° C. or less. In the case where the temperature of the heat treatment is 55° C. or more, favorable transferability can be achieved. Meanwhile, if the temperature of the heat treatment exceeds 75° C., there is a possibility that the amount of pores is too much and the lubricant on the surface of the magnetic layer 43 is excessive. Here, the temperature of the heat treatment is a temperature of an atmosphere for holding the magnetic tape MT.

The time for the heat treatment is favorably 15 hours or more and 40 hours or less. In the case where the time for the heat treatment is 15 or more, favorable transferability can be achieved. Meanwhile, in the case where the time for the heat treatment is 40 hours or less, it is possible to suppress the decrease in productivity.

(Cut Process)

Finally, the magnetic tape MT is cut into a predetermined width (e.g., ½ inch width). The magnetic tape MT is obtained in this way.

(Process of Writing Servo Pattern)

The above-mentioned servo writer 210 writes servo patterns to the magnetic tape MT. At this time, by adjusting the friction between the servo signal writing head 119 and the magnetic tape MT when writing servo patterns as described above, the statistical value $\sigma_{SW}$ of the magnetic tape MT can be adjusted to 24 nm or less.

[Configuration of Recording/Reproduction Apparatus]

The recording/reproduction apparatus 50 performs recording and reproduction of the magnetic tape MT having the above-mentioned configuration. The recording/reproduction apparatus 50 has a configuration in which tension to be applied to the longitudinal direction of the magnetic tape MT can be adjusted. Further, the recording/reproduction apparatus 50 has a configuration in which the cartridge 10 can be loaded. Here, in order to facilitate the description, a case where the recording/reproduction apparatus 50 has a configuration in which one cartridge 10 can be loaded will be described. However, the recording/reproduction apparatus 50 may have a configuration in which a plurality of cartridges 10 can be loaded.

The recording/reproduction apparatus 50 is connected to information processing apparatuses such as a server 61 and a personal computer (hereinafter, referred to as "PC") 62 via a network 60, and configured to be capable of recording, in the cartridge 10, data supplied from these information processing apparatuses. Further, the recording/reproduction apparatus 50 is configured to be capable of reproducing the data from the cartridge 10 and supplying the data to the information processing apparatuses, in response to a request from the information processing apparatuses. The shortest recording wavelength of the recording/reproduction apparatus 50 is favorably 96 nm or less, more favorably 88 nm or less, and still more favorably 80 nm or less.

As shown in FIG. 1, the recording/reproduction apparatus 50 includes a spindle 51, a reel 52 on the side of the recording/reproduction apparatus 50, a spindle drive device 53, a reel drive device 54, a plurality of guide rollers 55, a magnetic head (head unit) 56, the reader/writer 57 as a communication unit, a communication interface (hereinafter, I/F) 58, and the control device 59.

The spindle 51 is configured to be capable of mounting the cartridge 10. In the magnetic tape MT, a servo pattern having an inverted V shape is recorded as a servo signal in advance. The reel 52 is configured to be capable of fixing the tip (leader pin 20) of the magnetic tape MT pulled out of the cartridge 10 via a tape loading mechanism (not shown).

The spindle drive device 53 rotates the spindle 51 in response to a command from a control device 59. The reel drive device 54 rotates the reel 52 in response to a command from the control device 59. The plurality of guide rollers 55 guides the travelling of the magnetic tape MT so that the tape path formed between the cartridge 10 and the reel 52 has a predetermined relative positional relationship with the magnetic head 56.

When recording data on the magnetic tape MT or reproducing data from the magnetic tape MT, the spindle drive device 53 and the reel drive device 54 respectively drive the spindle 51 and the reel 52 to rotate, and the magnetic tape MT travels. The magnetic tape MT can be reciprocated in the travelling direction of the forward direction (direction flowing from the cartridge 10 side to the reel 52 side) and the reverse direction (direction flowing from the reel 52 side to the cartridge 10 side).

In this embodiment, the tension of the magnetic tape MT in the longitudinal direction during data recording or data reproduction can be adjusted by control of rotation of the spindle 51 by the spindle drive device 53 and control of rotation of the reel 52 by the reel drive device 54. Note that the tension adjustment of the magnetic tape MT may be performed by control of movement of the guide rollers 55 instead of or in addition to the control of rotation of the spindle 51 and the reel 52.

The reader/writer 57 is configured to be capable of writing the first information and the second information to the cartridge memory 11 in response to a command from the control device 59. Further, the reader/writer 57 is configured to be capable of reading the first information and the second information from the cartridge memory 11 in response to a command from the control device 59. As the communication method between the reader/writer 57 and the cartridge memory 11, for example, the ISO14443 is adopted. The second information includes tension adjustment information. The tension adjustment information is an example of information during data recording.

The control device 59 includes, for example, a control unit, a storage unit, a communication unit, and the like. The control unit includes, for example, a CPU (Central Processing Unit), and controls the respective units of the recording/reproduction apparatus 50 in accordance with the program stored in the storage unit. For example, in response to a request from the information processing apparatus such as the server 61 and the PC 62, the control device 59 records, in the magnetic tape MT by the magnetic head 56, the data signal supplied from the information processing apparatus. Further, in response to a request from the information processing apparatus such as the server 61 and the PC 62, the control device 59 reproduces the data signal recorded in the magnetic tape MT and supplies the data signal to the information processing apparatus, by the magnetic head 56.

The storage unit includes a non-volatile memory in which various types of data and various programs are recorded, and a volatile memory to be used as a work area of the control unit. The above-mentioned various programs may be read from a portable recording medium such as an optical disk or a portable storage device such as a semiconductor memory, or downloaded from a server apparatus on a network.

The control device 59 reads the servo signal recorded on two adjacent servo bands SB by the magnetic head 56 during data recording on the magnetic tape MT or data reproduction from the magnetic tape MT. The control device 59 uses the servo signal read from the two servo bands SB to control the position of the magnetic head 56 so that the magnetic head 56 follows the servo pattern.

The control device 59 obtains a distance (distance in the width direction of the magnetic tape MT) d1 between two adjacent servo bands SB from the reproduction waveform of the servo signal read from the two adjacent servo bands SB during data recording on the magnetic tape MT. Then, the control device 59 writes the obtained distance to the memory 36 by the reader/writer 57.

The control device 59 obtains a distance (distance in the width direction of the magnetic tape MT) d2 between two adjacent servo bands SB from the reproduction waveform of the servo signal read from the two adjacent servo bands SB during data reproduction from the magnetic tape MT. In addition thereto, the control device 59 reads, from the memory 36 by the reader/writer 57, the distance d1 between the two adjacent servo bands SB obtained during data recording on the magnetic tape MT. The control device 59 controls the rotation of the spindle drive device 53 and the reel drive device 54 so that a difference Δd between the distance d1 between the servo bands SB obtained during the data recording on the magnetic tape MT and the distance d2 between the servo bands SB obtained during data reproduction from the magnetic tape MT is within a specified range, thereby adjusting the tension to be applied in the longitudinal direction of the magnetic tape MT. The control of this tension adjustment is performed by, for example, feedback control.

The magnetic head 56 is configured to be capable of recording data on the magnetic tape MT in response to a command from the control device 59. Further, the magnetic head 56 is configured to be capable of reproducing, in response to a command from the control device 59, data recorded in the magnetic tape MT. The magnetic head 56 includes, for example, the two servo lead heads 56A and 56B, a plurality of data write/read heads, and the like.

The servo lead heads 56A and 56B are each configured to be capable of reading the magnetic field generated from the servo signal recorded in the magnetic tape MT by an MR (Magneto Resistive) device or the like to reproduce the servo signal. The interval between the two servo lead heads 56A and 56B in the width direction is substantially the same as the distance between the two adjacent servo bands SB.

The data write/read heads are arranged at positions sandwiched between the two servo lead heads 56A and 56B along the direction from one of the servo lead heads 56A and 56B toward the other at equal intervals. The data write/read heads are each configured to be capable of recording data on the magnetic tape MT by the magnetic field generated from the magnetic gap. Further, the data write/read heads are each configured to be capable of reading, by the MR device or the like, the magnetic field generated from the data recorded in the magnetic tape MT to reproduce the data.

The communication I/F 58 is for communicating with the information processing apparatus such as the server 61 and the PC 62, and is connected to the network 60.

[Operation of Recording/Reproduction Apparatus During Data Recording]

Figure 13:
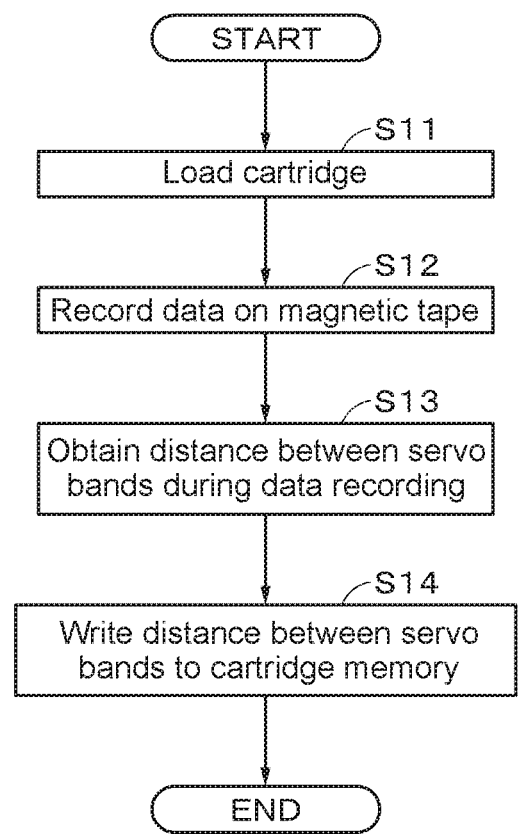
FIG. 13 is a flowchart describing an example of an operation of a recording/reproduction apparatus during data recording.

Hereinafter, an example of the operation of the recording/reproduction apparatus 50 during data recording will be described with reference to FIG. 13.

First, the control device 59 loads the cartridge 10 into the recording/reproduction apparatus 50 (Step S11). Next, the control device 59 controls rotation of the spindle 51 and the reel 52, and causes the magnetic tape MT to travel while applying specified tension in the longitudinal direction of the magnetic tape MT. Then, the control device 59 reads the servo signal by the servo lead heads 56A and 56B of the magnetic head 56, and records data on the magnetic tape MT by the data write/read head of the magnetic head 56 (Step S12).

At this time, the magnetic head 56 records data on the data band DB by the data write/read head of the magnetic head 56 while tracing two adjacent servo bands SB by the two servo lead heads 56A and 56B of the magnetic head 56.

Next, the control device 59 obtains the distance d1 between the two adjacent servo bands SB during data recording from the reproduction waveform of the servo signal read by the servo lead heads 56A and 56B of the magnetic head 56 (Step S13). Next, the control device 59 writes the distance d1 between the servo bands SB during data recording to the cartridge memory 11 by the reader/writer 57 (Step S14). The control device 59 may continuously measure the distance d1 between the servo bands SB and write the distance D1 to the cartridge memory 11. Alternatively, the control device 59 may measure the distance d1 between the servo bands at regular intervals, and write the distance d1 to the cartridge memory 11. In the case of measuring the distance d1 between the servo bands SB at regular intervals and writing the distance d1 to the cartridge memory 11, it is possible to reduce the amount of information to be written to the memory 36.

[Operation of Recording/Reproduction Apparatus During Data Reproduction]

Figure 14:
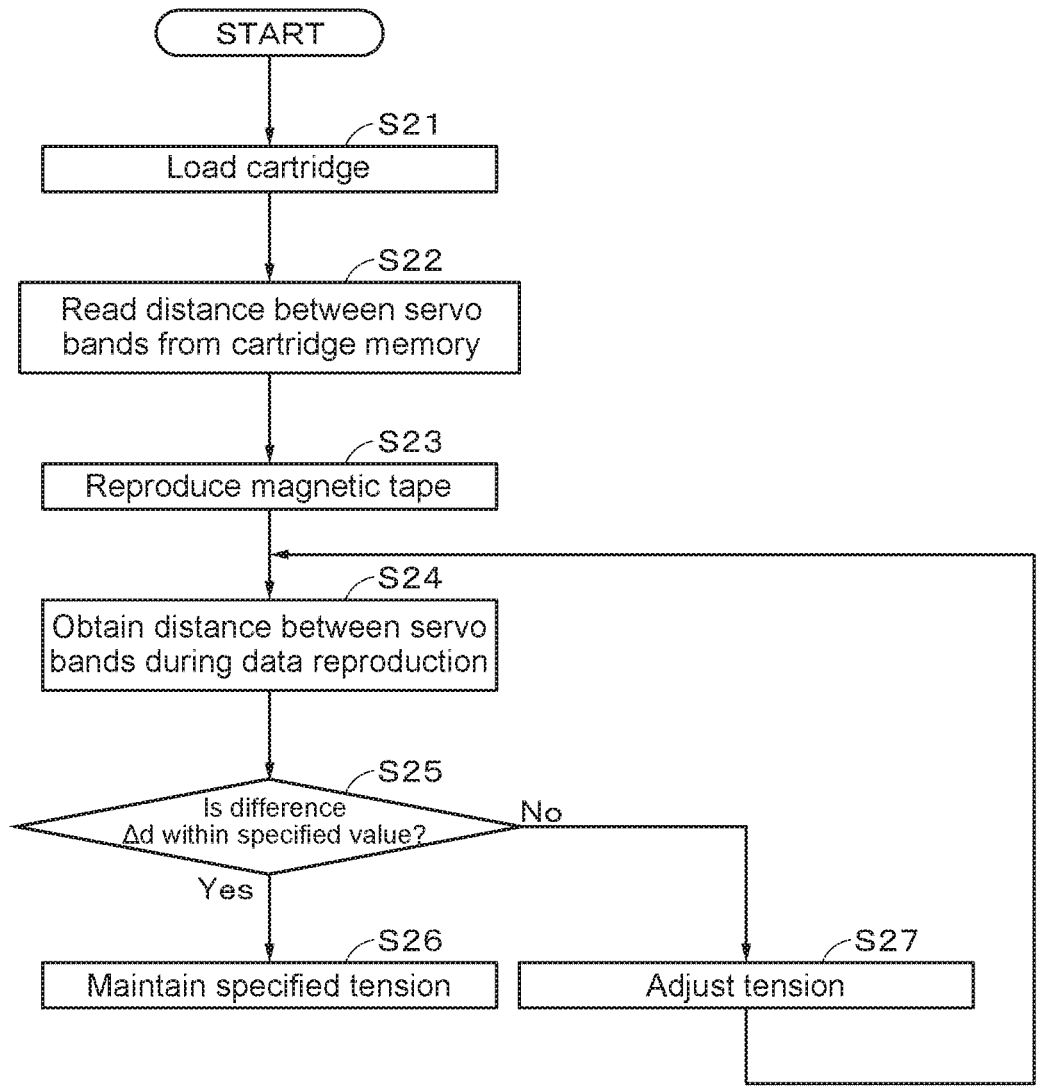
FIG. 14 is a flowchart describing an example of the operation of the recording/reproduction apparatus during data reproduction.

Hereinafter, an example of the operation of the recording/reproduction apparatus 50 during data reproduction will be described with reference to FIG. 14.

First, the control device 59 loads the cartridge 10 into the recording/reproduction apparatus 50 (Step S21). Next, the control device 59 reads the distance d1 between the servo bands during recording from the cartridge memory 11 by the reader/writer 57 (Step S22).

Next, the control device 59 controls rotation of the spindle 51 and the reel 52, and causes the magnetic tape MT to travel while applying specified tension in the longitudinal direction of the magnetic tape MT. Then, the control device 59 reads the servo signal by the servo lead heads 56A and 56B of the magnetic head 56, and reproduces the data from the magnetic tape MT by the data write/read head of the magnetic head 56 (Step S23).

Next, the control device 59 calculates the distance d2 between the two adjacent servo bands SB during data reproduction from the reproduction waveform of the servo signal read by the servo lead heads 56A and 56B of the magnetic head 56 (Step S24).

Next, the control device 59 determines whether or not the difference Δd between the distance d1 between the servo bands read in Step S22 and the distance d2 between the servo bands SB calculated in Step S24 is within a specified value (Step S25).

In the case where it is determined in Step S25 that the difference Δd is within the specified value, the control device 59 controls rotation of the spindle 51 and the reel 52 so that specified tension is maintained (Step S26).

Meanwhile, in the case where it is determined in Step S25 that the difference Δd is not within the specified value, the control device 59 controls rotation of the spindle 51 and the reel 52 so that the difference Δd is decreased to adjust tension to be applied to the travelling magnetic tape MT, and the processing returns to Step S24 (Step S27).

[Effect]

As described above, in the magnetic tape MT according to the first embodiment, since the BET specific surface area of the entire magnetic tape MT measured in the state where the magnetic tape MT has been washed and dried is 3.5 m²/g or more and 7.0 m²/g or less and the statistical value $\sigma_{SW}$ indicating the non-linearity of the servo pattern is 24 nm, excellent travelling stability can be achieved even in the case where the total thickness of the magnetic tape MT is small. Further, since the arithmetic average roughness Ra of the surface of the magnetic layer 43 is 2.5 nm or less, the squareness ratio of the magnetic layer 43 in the vertical direction is 65%, and the average thickness of the magnetic layer 43 is 80 nm, excellent electromagnetic conversion characteristics can be achieved. Therefore, it is possible to achieve both excellent travelling stability and the electromagnetic conversion characteristics.

Further, in the magnetic tape MT according to the first embodiment, the substrate 41 includes polyester. As a result, in the case where the width of the magnetic tape MT changes due to changes in the ambient temperature or humidity around the magnetic tape MT (cartridge 10) in which data is recorded with the above-mentioned data track width, it is possible to keep the width of the magnetic tape MT constant or substantially constant by adjusting, by the recording/reproduction apparatus 50, the tension of the magnetic tape MT in the longitudinal direction during travelling. Therefore, it is possible to suppress off-track caused by changes in the ambient temperature or humidity.

2 Second Embodiment

[Configuration of Recording/Reproduction Apparatus]

Figure 15:
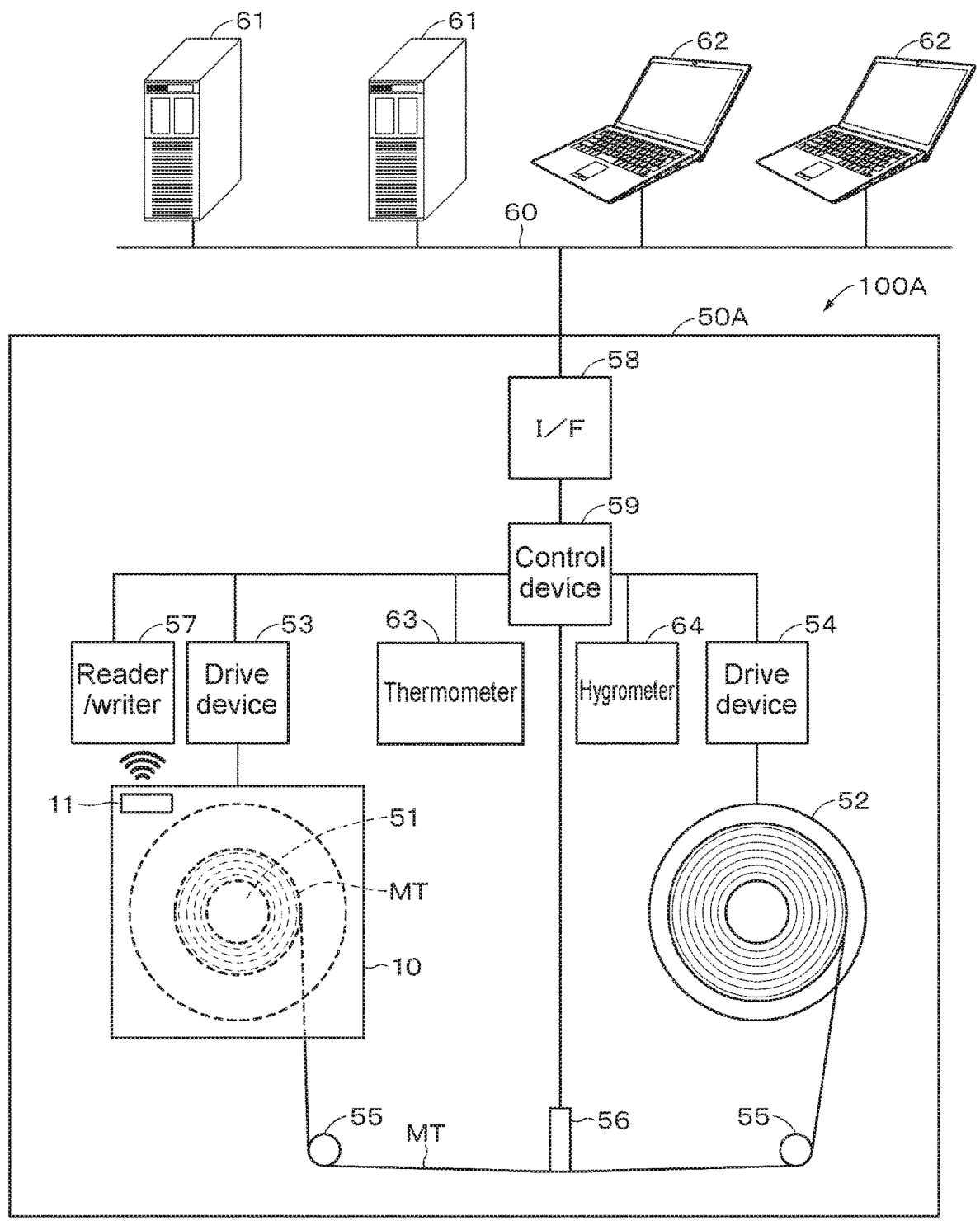
FIG. 15 is a schematic diagram showing an example of a configuration of a recording/reproduction system according to a second embodiment of the present disclosure.

FIG. 15 is a schematic diagram showing an example of a configuration of a recording/reproduction system 100A according to a second embodiment of the present disclosure. The recording/reproduction system 100A includes the cartridge 10 and the recording/reproduction apparatus 50A.

The recording/reproduction apparatus 50A further includes a thermometer 63 and a hygrometer 64. The thermometer 63 measures the temperature around the magnetic tape MT (cartridge 10) and outputs the temperature to the control device 59. Further, the hygrometer 64 measures the humidity around the magnetic tape MT (cartridge 10) and outputs the humidity to the control device 59.

The control device 59 measures, by the thermometer 63 and the hygrometer 64 a temperature Tm1 and a humidity H1 around the magnetic tape MT (cartridge 10) during data recording on the magnetic tape MT, and writes them to the cartridge memory 11 via the reader/writer 57. Each of the temperature Tm1 and the humidity H1 is an example of information regarding the environment around the magnetic tape MT.

The control device 59 obtains, on the basis of drive data of the spindle 51 and the reel 52, a tension Tn1 that has been applied in the longitudinal direction of the magnetic tape MT during data recording on the magnetic tape MT, and writes the tension Tn1 to the cartridge memory 11 via the reader/writer 57.

The control device 59 obtains, on the basis of the reproduction waveform of the servo signal read from two adjacent servo bands SB, the distance d1 between the two adjacent servo bands SB during data recording on the magnetic tape MT. Then, the control device 59 calculates, on the basis of the distance d1, a width W1 of the magnetic tape MT during data recording, and writes the width W1 to the memory 36 by the reader/writer 57.

The control device 59 measures, by the thermometer 63 and the hygrometer 64, a temperature Tm2 and a humidity H2 around the magnetic tape MT (cartridge 10) during data reproduction from the magnetic tape MT.

The control device 59 obtains, on the basis of drive data of the spindle 51 and the reel 52, a tension Tn2 that has been applied in the longitudinal direction of the magnetic tape MT during data reproduction from the magnetic tape MT.

The control device 59 obtains, on the basis of the reproduction waveform of the servo signal read from two adjacent servo bands SB, the distance d2 between the two adjacent servo bands SB during data reproduction from the magnetic tape MT. Then, the control device 59 calculates, on the basis of the distance d2, a width W2 of the magnetic tape MT during data reproduction.

The control device 59 reads, during data reproduction from the magnetic tape MT, the temperature Tm1, the humidity H1, the tension Tn1, and the width W1 that have been written during data recording from the cartridge memory 11 via the reader/writer 57. Then, the control device 59 uses the temperature Tm1, the humidity H1, the tension Tn1, and the width W1 during data recording and the temperature Tm2, the humidity H2, the tension Tn2, and the width W2 during data reproduction to control tension to be applied to the magnetic tape MT so that the width W2 of the magnetic tape MT during data reproduction is equal to or substantially equal to the width W1 of the magnetic tape during data recording.

The controller 35 of the cartridge memory 11 stores, in the second storage region 36B of the memory 36, the temperature Tm1, the humidity H1, the tension Tn1, and the width W1 received from the recording/reproduction apparatus 50A via the antenna coil 31. In response to a request from the recording/reproduction apparatus 50A, the controller 35 of the cartridge memory 11 reads the temperature Tm1, the humidity H1, the tension Tn1, and the width W1 from the memory 36 and transmits them to the recording/reproduction apparatus 50A via the antenna coil 31.

[Operation of Recording/Reproduction Apparatus During Data Recording]

Figure 16:
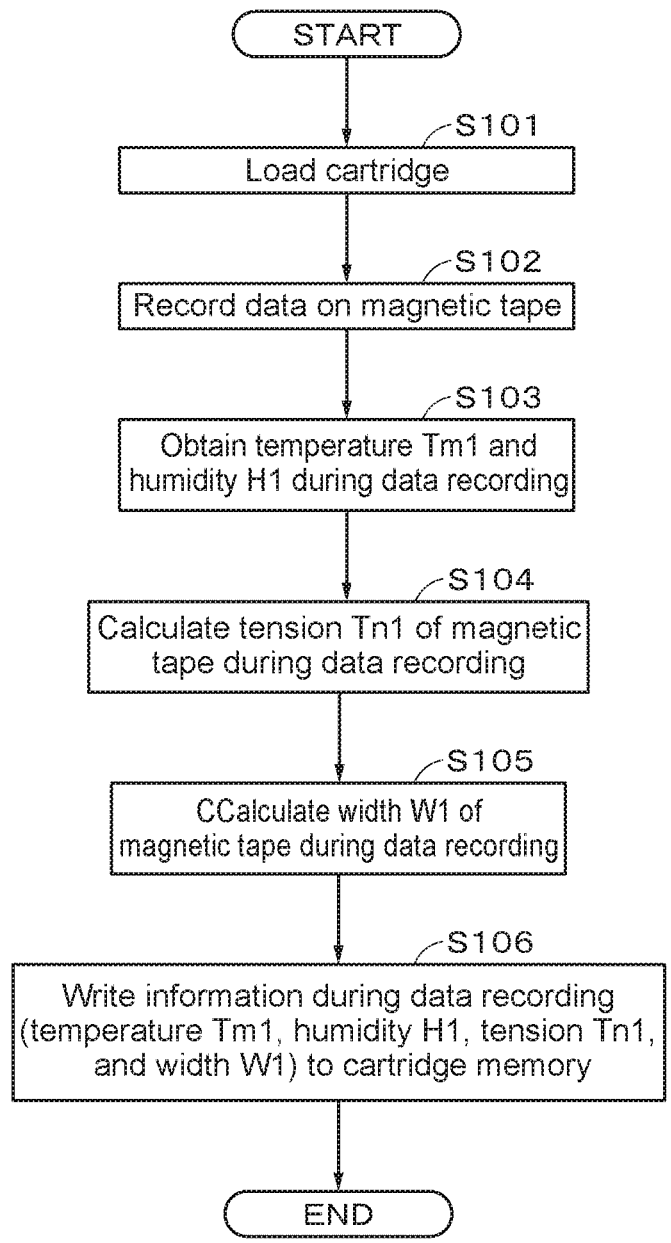
FIG. 16 is a flowchart describing an example of an operation of the recording/reproduction apparatus during data recording.

Hereinafter, an example of the operation of the recording/reproduction apparatus 50A during data recording will be described with reference to FIG. 16.

First, the control device 59 loads the cartridge 10 into the recording/reproduction apparatus 50A (Step S101). Next, the control device 59 controls rotation of the spindle 51 and the reel 52, and causes the magnetic tape MT to travel while applying specified tension in the longitudinal direction of the magnetic tape MT. Then, the control device 59 records data on the magnetic tape MT by the magnetic head 56 (Step S102).

Next, the control device 59 acquires, from the thermometer 63 and the hygrometer 64, the temperature Tm1 and the humidity H1 (environmental information) around the magnetic tape MT during data recording (Step S103).

Next, the control device 59 calculates, on the basis of drive data of the spindle 51 and the reel 52 during data recording, the tension Tn1 that has been applied in the longitudinal direction of the magnetic tape MT during data recording (Step S104).

Next, the control device 59 obtains, on the basis of the reproduction waveform of the servo signal read by the servo lead heads 56A and 56B of the magnetic head 56, the distance d1 between the two adjacent servo bands SB. Next, the control device 59 calculates, on the basis of the distance d1, the width W1 of the magnetic tape MT during data recording (Step S105).

Next, the control device 59 writes, by the reader/writer 57, the temperature Tm1, the humidity H1, the tension Tn1, and the width W1 of the magnetic tape MT to the cartridge memory 11 as the information during data recording (Step S106).

[Operation of Recording/Reproduction Apparatus During Data Reproduction]

Figure 17:
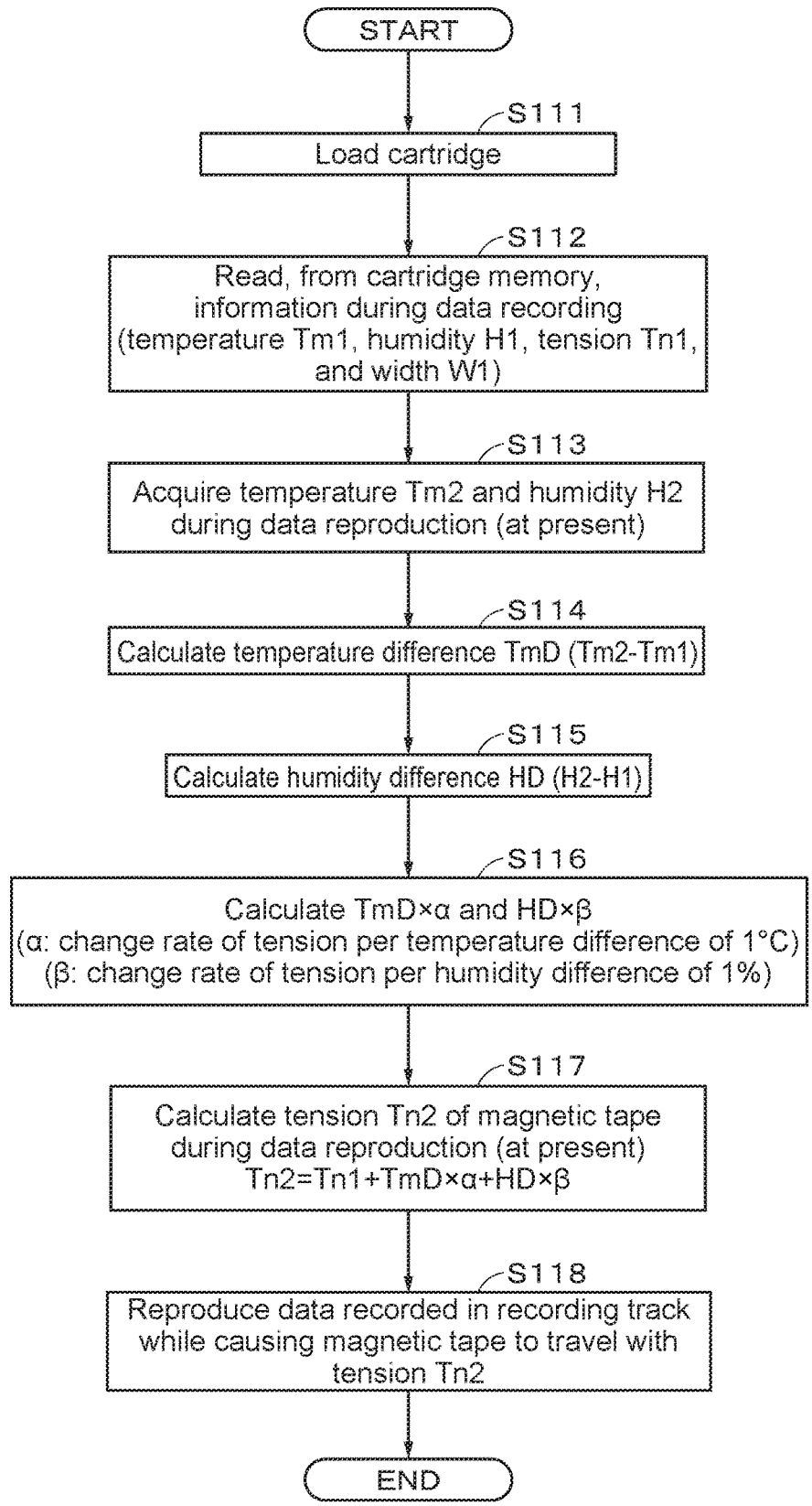
FIG. 17 is flowchart describing an example of the operation of the recording/reproduction apparatus during data reproduction.

Hereinafter, an example of the operation of the recording/reproduction apparatus 50A during data reproduction will be described with reference to FIG. 17.

First, the control device 59 loads the cartridge 10 into the recording/reproduction apparatus 50A (Step S111). Next, the control device 59 reads, from the cartridge memory 11 by the reader/writer 57, the information during data recording (the temperature Tm1, the humidity H1, the tension Tn1, and the width W1 of the magnetic tape MT) written to the cartridge memory 11 to acquire the information (Step S112). Next, the control device 59 acquires, by the thermometer 63 and the hygrometer 64, information regarding the temperature Tm2 and information regarding the humidity H2 around the present magnetic tape MT during data reproduction (Step S113).

Next, the control device 59 calculates a temperature difference TmD (TmD=Tm2−Tm1) between the temperature Tm1 during data recording and the temperature Tm2 during data reproduction (Step S114). Further, the control device 59 calculates the humidity difference HD (HD=H2−H1) between the humidity H1 during data recording and the humidity H2 during data reproduction (Step S115).

Next, the control device 59 multiplies the temperature difference TmD by a coefficient $\alpha$ (TmD×$\alpha$), and multiplies the humidity difference HD by a coefficient $\beta$ (HD×$\beta$) (Step S116). The coefficient $\alpha$ is a value indicating how much the tension of the magnetic tape MT should be changed per temperature difference of 1° C. compared to the tension Tn1 during data recording. The coefficient $\beta$ is a value indicating how much the tension of the magnetic tape MT should be changed per humidity difference of 1% compared to the tension Tn1 during data recording.

Next, the control device 59 calculates the tension Tn2 to be applied in the longitudinal direction of the magnetic tape MT during data reproduction (at present) by adding the value of TmD×$\alpha$ and the value of HD×$\beta$ to the tension Tn1 during data recording (Step S117).

$$Tn2=Tn1+TmD\times\alpha+HD\times\beta$$

After determining the tension Tn2 of the magnetic tape MT during data reproduction, the control device 59 controls rotation of the spindle 51 and the reel 52 to control travelling of the magnetic tape MT so that the magnetic tape MT travels with the tension Tn2. Then, the control device 59 reproduces, by the data write/read head of the magnetic head 56, the data recorded in the data track Tk while reading the servo signal of the servo band SB by the servo lead heads 56A and 56B of the magnetic head 56 (Step S118).

At this time, since the width of the magnetic tape MT has been adjusted to the width during data recording by adjusting the tension of the magnetic tape MT, the data write/read heads of the magnetic head 56 can be accurately aligned to the data tracks Tk. As a result, even if the width of the magnetic tape MT fluctuates for some reason (e.g., temperature and humidity fluctuations), it is possible to accurately reproduce data recorded on the magnetic tape MT.

Note that the value of the tension Tn2 to be applied to the magnetic tape MT during data reproduction (at present) is higher if the temperature during data reproduction is higher than the temperature during data recording. For this reason, in the case where the temperature increase and the width of the magnetic tape MT is larger than that during data recording, the width of the magnetic tape MT can be narrowed to reproduce the same width as that during data reproduction.

On the contrary, the value of the tension Tn2 to be applied to the magnetic tape MT during data reproduction (at present) is lower if the temperature during data reproduction is lower than the temperature during data recording. For this reason, in the case where the temperature decrease and the width of the magnetic tape MT is smaller than that during data recording, the width of the magnetic tape MT can be widened to reproduce the same width as that during data reproduction.

Further, the value of the tension Tn2 to be applied to the magnetic tape MT during data reproduction (at present) is higher if the humidity during data reproduction is higher than the humidity during data recording. For this reason, in the case where the humidity increase and the width of the magnetic tape MT is larger than that during data recording, the width of the magnetic tape MT can be narrowed to reproduce the same width as that during data reproduction.

On the contrary, the value of the tension Tn2 to be applied to the magnetic tape MT during data reproduction (at present) is lower if the humidity during data reproduction is lower than the humidity during data recording. For this reason, in the case where the humidity decrease and the width of the magnetic tape MT is smaller than that during data recording, the width of the magnetic tape MT can be widened to reproduce the same width as that during data reproduction.

Here, during data reproduction, in order to obtain the tension Tn2 to be applied to the magnetic tape MT, information regarding the width W1 of the magnetic tape MT during data recording may further be used in addition to the temperature Tm1, the humidity H1, and the tension Tn1 of the magnetic tape MT during data recording (or instead of the tension Tn1).

Also in this case, similarly, the control device 59 calculates the temperature difference TmD (TmD=Tm2−Tm1) and the humidity difference HD (HD=H2−H1). Then, the control device 59 multiplies the temperature difference TmD by a coefficient γ (TmD×γ), and multiplies the humidity difference HD by a coefficient δ (HD×δ) (Step S116).

Here, the coefficient γ is a value indicating how much the width of the magnetic tape MT fluctuates per temperature difference of 1° C. (value indicating an expansion rate per unit length (in the width direction) based on the temperature). Further, the coefficient δ is a value indicating how much the width of the magnetic tape MT fluctuates per humidity difference of 1% (value indicating an expansion rate per unit length (in the width direction) based on the humidity).

Next, the control device 59 predicts, on the basis of the width W1 of the magnetic tape MT in the past during data recording, the width W2 of the present magnetic tape MT during data reproduction by the following formula.

$$W2=W1(1+TmD\times\gamma+HD2\times\delta)$$

Next, the control device 59 calculates a difference WD (WD=W2−W1=W1(TmD×γ+HD2×δ)) between the width W2 of the present magnetic tape MT during data reproduction and the width W1 of the magnetic tape MT in the past during data recording.

Then, the control device 59 adds the value obtained by multiplying the width difference WD by a coefficient E to the tension Tn1 of the magnetic tape MT during data recording to calculate the tension Tn2 of the magnetic tape MT during data reproduction.

$$Tn2=Tn1+WD\times\varepsilon$$

Here, the coefficient E is a value representing the tension in in the longitudinal direction of the magnetic tape MT necessary for changing the width of the magnetic tape MT by a unit distance.

After determining the tension Tn2 of the magnetic tape MT during data reproduction, the control device 59 controls rotation of the spindle 51 and the reel 52, and controls travelling of the magnetic tape MT so that the magnetic tape MT travels with the tension Tn2. Then, the control device 59 reproduces, by the data write/read head of the magnetic head 56, data recorded in the data track Tk while reading, by the servo lead heads 56A and 56B of the magnetic head 56, the servo signal of the servo band SB.

Also in the case where the tension Tn2 has been determined by such a method, it is possible to accurately reproduce data recorded on the magnetic tape MT even when the width of the magnetic tape MT fluctuates for some reason (e.g., temperature and humidity fluctuations).

[Effect]

In the second embodiment, since the information during data recording of the magnetic tape MT is stored in the cartridge memory 11 as described above, it is possible to appropriately adjust the width of the magnetic tape MT by using this information during data reproduction. Therefore, even if the width of the magnetic tape MT fluctuates for some reason, it is possible to accurately reproduce the data recorded on the magnetic tape MT.

Further, in this embodiment, as the information during data recording, the temperature Tm1 and the humidity H1 (environmental information) around the magnetic tape MT during data recording is written. Therefore, it is possible to appropriately cope with fluctuations in the width of the magnetic tape MT and the width of the data track Tk due to temperature and humidity fluctuations.

3 Modified Example

Modified Example 1

Although the case where the tension adjustment information is stored in the cartridge memory 11 has been described in the above-mentioned first and second embodiments, the tension adjustment information may be stored in the control device 59 of the recording/reproduction apparatus 50/50A. In this case, the control device 59 controls rotation of the spindle drive device 53 and the reel drive device 54 using the tension adjustment information stored in the control device 59 to adjust the tension to be applied in the longitudinal direction of the magnetic tape MT.

Modified Example 2

The magnetic tape MT may be used in a library apparatus. In this case, the library apparatus may have a configuration capable of adjusting the tension to be applied in the longitudinal direction of the magnetic tape MT, and include a plurality of recording/reproduction apparatuses 50 according to the first embodiment or a plurality of recording/reproduction apparatuses 50A according to the second embodiment.

Modified Example 3

The servo writer may adjust the tension in the longitudinal direction of the magnetic tape MT during recording of the servo signal or the like to keep the width of the magnetic tape MT constant or substantially constant. In this case, the servo writer may include a detection device that detects the width of the magnetic tape MT, and adjust the tension in the longitudinal direction of the magnetic tape MT on the basis of the detection result of the detection device.

Modified Example 4

The magnetic tape MT is not limited to a perpendicular recording type magnetic tape, and may be a horizontal recording type magnetic tape. In this case, as the magnetic powder, a magnetic powder having a needle shape such as a metal magnetic powder may be used.

Modified Example 5

Although the case where the distance between servo bands SB is used as the width-related information relating to the magnetic tape during data recording has been described in the above-mentioned first embodiment, the width of the magnetic tape MT may be used.

In this case, the control device 59 calculates, during data recording, the width W1 of the magnetic tape MT from the distance d1 between the servo bands SB, and writes the width W1 to the cartridge memory 11 by the reader/writer 57.

During data reproduction, the control device 59 reads, from the cartridge memory 11, the width W1 of the magnetic tape MT during data recording, and calculates, on the basis of the distance d2 between the servo bands SB during data reproduction, the width W2 of the magnetic tape MT during data reproduction. Then, the control device 59 calculates the difference ΔW between the width W1 of the magnetic tape MT during data recording and the width W2 of the magnetic tape MT during data reproduction, and determines whether or not the difference ΔW is within a specified value.

In the case where the difference Δd is within the specified value, the control device 59 controls rotation driving of the spindle 51 and the reel 52 so that the specified tension is maintained. Meanwhile, in the case where the difference Δd is not within the specified value, the control device 59 controls rotation driving of the spindle 51 and the reel 52 so that the difference Δd is within the specified value to adjust the tension to be applied to the travelling magnetic tape MT.

Modified Example 6

Although the case where all of the temperatures Tm1 and Tm2, the humidities H1 and H2, the tensions Tn1 and Tn2, and the widths W1 and W2 are used as information during data recording has been described in the above-mentioned second embodiment, the information during data recording may be any of the temperatures Tm1 and Tm2, the humidities H1 and H2, the tensions Tn1 and Tn2, and the widths W1 and W2 or any combination of two or three of them.

Not only information during data recording (the temperature Tm1, the humidity H1, the tension Tn1, and the width W1) but also information during data reproduction (the temperature Tm2, the humidity H2, the tension Tn2, and the width W2) may be stored in the cartridge memory 11. For example, the information during data reproduction is used when data in the magnetic tape MT is reproduced and then the data is reproduced on another occasion.

Modified Example 7

Although the case where the holes 43A are formed on the surface of the magnetic layer 43 by transferring the protrusions 44A provided on the surface of the back layer 44 to the surface of the magnetic layer 43 has been described in the above-mentioned first and second embodiments, the method of forming the holes 43A is not limited thereto. For example, the holes 43A may be formed on the surface of the magnetic layer 43 by adjusting the type of the solvent contained in the coating material for forming a magnetic layer, the dry conditions of the coating material for forming a magnetic layer, and the like.

Example

Hereinafter, the present disclosure will be specifically described by way of Examples. However, the present disclosure is not limited to only these Examples.

In the following Examples and Comparative Examples, the average thickness of a magnetic tape, the arithmetic average roughness Ra on the surface of a magnetic layer, the squareness ratio in the vertical direction, the average thickness of the magnetic layer, the BET specific surface area, the pore distribution (pore diameter of the maximum pore volume at the time of attachment/detachment)), and the statistical value $\sigma_{SW}$ indicating the non-linearity of a servo pattern indicate values obtained by the measurement methods described in the above-mentioned first embodiment.

Example 1

(Process of Preparing Coating Material for Forming Magnetic Layer)

A coating material for forming a magnetic layer was prepared as follows. First, a first composition having the following formulation was kneaded by an extruder. Next, the kneaded first composition and a second composition having the following formulation were added to a stirring tank including a dispersing device, and, premixed. Subsequently, further sand mill mixing was performed, and filter treatment was performed to prepare a coating material for forming a magnetic layer.

(First Composition)

Powder (hexagon plate shape, the average aspect ratio of 2.8, and the average particle volume of 1600 nm$^3$) of barium ferrite ($BaFe_{12}O_{19}$) particles: 100 parts by mass Vinyl chloride resin (resin solution: resin content of 30 mass % and cyclohexanone of 70 mass %): 42 parts by mass (containing a solvent)

(Degree of polymerization 300, Mn=10000, containing $OSO_3K$=0.07 mmol/g and secondary OH=0.3 mmol/g as polar groups)

Aluminum oxide powder: 5 parts by mass ($\alpha$-$Al_2O_3$, average particle size of 0.1 μm)

Carbon black: 2 parts by mass (Manufactured by TOKAI CARBON CO., LTD., trade name: SEAST TA)

(Second Composition)

Vinyl chloride resin: 3 parts by mass (containing a solvent)

(Resin solution: resin content of 30 mass % and cyclohexanone of 70 mass %)

n-butyl stearate: 2 parts by mass

Methyl ethyl ketone: 121.3 parts by mass

Toluene: 121.3 parts by mass

Cyclohexanone: 60.7 parts by mass

Finally, polyisocyanate (trade name: Coronate L manufactured by TOSOH CORPORATION): 4 parts by mass and myristic acid: 2 parts by mass were respectively added as a curing agent and a lubricant to the coating material for forming a magnetic layer prepared as described above.

(Process of Preparing Coating Material for Forming Underlayer)

The coating material for forming an underlayer was prepared as follows. First, a third composition having the following formulation was kneaded by an extruder. Next, the kneaded third composition and a fourth composition having the following formulation were added to a stirring tank including a dispersing device, and premixed. Subsequently, further sand mill mixing was performed, and filter treatment was performed to prepare a coating material for forming an underlayer.

(Third Composition)

Iron oxide powder having a needle shape: 100 parts by mass ($\alpha$-$Fe_2O_3$, the average major axis length of 0.15 μm)

Vinyl chloride resin: 60.6 parts by mass (containing a solvent)

(Resin solution: resin content of 30 mass % and cyclohexanone of 70 mass %)

Carbon black: 10 parts by mass (Average particle size of 20 nm)

(Fourth Composition)
Polyurethane resin UR8200 (manufactured by TOYOBO CO., LTD.): 18.5 parts by mass
n-butyl stearate: 2 parts by mass
Methyl ethyl ketone: 108.2 parts by mass
Toluene: 108.2 parts by mass
Cyclohexanone: 18.5 parts by mass Finally, polyisocyanate (trade name: Coronate L manufactured by TOSOH CORPORATION): 4 parts by mass and myristic acid: 2 parts by mass were respectively added as a curing agent and a lubricant to the coating material for forming an underlayer prepared as described above.

(Process of Preparing Coating Material for Forming Back Layer)

A coating material for forming a back layer was prepared as follows. The following raw materials were mixed in a stirring tank including a dispersing device, and filter treatment was performed to prepare a coating material for forming a back layer.

Powder of carbon black having a small particle size (average particle size (D50) of 20 nm): 90 parts by mass
Powder of carbon black having a large particle size (average particle size (D50) of 270 nm): 10 parts by mass
Polyester polyurethane: 100 parts by mass
(Manufactured by TOSOH CORPORATION, trade name: N-2304)
Methyl ethyl ketone: 500 parts by mass
Toluene: 400 parts by mass
Cyclohexanone: 100 parts by mass (Coating Process)

The coating material for forming a magnetic layer and the coating material for forming an underlayer prepared as described above were used to form an underlayer and a magnetic layer on one main surface of an elongated polyethylene naphthalate film (hereinafter, referred to as "PEN film") having the average thickness of 4.2 µm, which was a non-magnetic support. First, the coating material for forming an underlayer was coated on one main surface of the PEN film and dried to form an underlayer so that the average thickness after calendaring was 0.9 µm. Next, the coating material for forming a magnetic layer was coated on the underlayer and dried to form a magnetic layer so that the average thickness after calendaring was 80 nm. Note that during drying of the coating material for forming a magnetic layer, the magnetic field of the magnetic powder was oriented in the thickness direction of the film by a solenoid coil. Further, the drying conditions (drying temperature and drying time) of the coating material for forming a magnetic layer were adjusted, and the squareness ratio S1 in the thickness direction (vertical direction) of the magnetic tape was set to 65%. Subsequently, the coating material for forming a back layer was coated on the other main surface of the PEN film and dried to form a back layer so that the average thickness after calendaring was 0.4 µm. In this way, a magnetic tape was obtained.

(Calendar Process and Transfer Process)

First, calendar processing was performed to smooth the surface of the magnetic layer. At this time, the conditions of the calendar processing were adjusted and the arithmetic average roughness Ra on the surface of the magnetic layer was set to 2.5 nm. Next, after winding, into a roll, the obtained magnetic tape, first heat treatment of 60° C. was performed for 10 hours on the magnetic tape in this state. Then, after re-winding the magnetic tape into a roll so that the end portion located on the inner circumference side was located on the outer circumference side, second heat treatment of 60° C. was performed for 10 hours on the magnetic tape in this state. As a result, a large number of protrusions on the surface of the back layer were transferred to the surface of the magnetic layer, and a large number of holes were formed on the surface of the magnetic layer. The BET specific surface area of the entire magnetic tape was 4.5 m²/g. Further, the average pore diameter of the entire magnetic tape MT was 8.0 nm.

(Cut Process)

The magnetic tape obtained as described above was cut into a width of ½ inch (12.65 mm). As a result, an elongated magnetic tape having the average thickness of 5.6 µm was obtained.

(Process of Writing Servo Pattern)

A servo writer was used to write servo patterns to the magnetic tape obtained as described above, and thus, five servo bands were formed. The servo patterns conformed to the LTO-8 standard. As the servo writer, one having the configuration described in the first embodiment was used (see FIG. 11, Part A of FIG. 12, and Part B of FIG. 12).

By adjusting the distance between a servo signal writing head and a guide roller and the angle of the tape entering the servo signal writing head, the friction coefficient between the servo signal writing head and the magnetic tape when recording the servo patterns was adjusted. As a result, $\sigma_{SW}$ of the magnetic tape was adjusted to 23 nm. In this way, the magnetic tape to which the servo patterns were written was obtained.

Example 2

A magnetic tape having the average thickness of 5.6 µm to which servo patterns were written was obtained in a similar way to Example 1 except that the average thickness of the PEN film was 4.0 µm and the average thickness of the underlayer was 0.6 µm in the coating process.

Example 3

A magnetic tape to which servo patterns were written was obtained in a similar way to Example 1 except that the conditions of calendar processing were adjusted and the arithmetic average roughness Ra on the surface of the magnetic layer was set to 2.2 nm in the calendar process.

Example 4

A magnetic tape to which servo patterns were written was obtained in a similar way to Example 1 except that the drying conditions (drying temperature and drying time) of the coating material for forming a magnetic layer were adjusted and the squareness ratio of the magnetic tape in the thickness direction (vertical direction) was set to 70%.

Example 5

A magnetic tape having the average thickness of 5.6 µm to which servo patterns were written was obtained in a similar way to Example 1 except that the average thickness of the PEN film was 4.2 µm, the average thickness of the underlayer after calendaring was 0.9 µm, and the average thickness of the magnetic layer after calendaring was 70 nm in the coating process.

Example 6

A magnetic tape having the average thickness of 5.6 µm to which servo patterns were written was obtained in a similar way to Example 1 except that the average thickness of the PEN film was 4.2 µm, the average thickness of the underlayer after calendaring was 0.9 µm, and the average thickness of the magnetic layer after calendaring was 50 nm in the coating process.

Example 7

A magnetic tape to which servo patterns were written was obtained in a similar way to Example 1 except that the BET specific surface area was set to 3.5 m²/g by setting the temperature of the first heat treatment and the second heat treatment to 55° C. and the time of the first heat treatment and the second heat treatment to 10 hours in the transfer process.

Example 8

A magnetic tape to which servo patterns were written was obtained in a similar way to Example 1 except that the BET specific surface area was set to 7.0 m²/g and the average pore diameter was set to 6.0 nm by setting the temperature of the first heat treatment and the second heat treatment to 70° C. and the time of the first heat treatment and the second heat treatment to 10 hours in the transfer process.

Example 9

A magnetic tape to which servo patterns were written was obtained in a similar way to Example 1 except that the statistical value $\sigma_{SW}$ indicating the non-linearity of the servo pattern was set to 20 nm by reducing the friction coefficient between the servo signal writing head and the magnetic tape as compared with that in Example 1 in the process of writing the servo pattern.

Example 10

A magnetic tape to which servo patterns were written was obtained in a similar way to Example 1 except that the statistical value $\sigma_{SW}$ indicating the non-linearity of the servo pattern was set to 15 nm by reducing the friction coefficient between the servo signal writing head and the magnetic tape as compared with that in Example 9 in the process of writing the servo pattern.

Example 11

A magnetic tape to which servo patterns were written was obtained in a similar way to Example 1 except that a powder of strontium ferrite particles (having a hexagon plate shape, the aspect ratio of 2.9, and the particle volume of 1600 nm³) was used as a magnetic powder in the process of forming a coating material for forming a magnetic layer.

Example 12

A magnetic tape to which servo patterns were written was obtained in a similar way to Example 1 except that a powder of ε-iron oxide particles (having a spherical shape, the aspect ratio of 1.1, and the particle volume of 1800 nm³) was used as a magnetic powder in the process of forming a coating material for forming a magnetic layer.

Example 13

A magnetic tape to which servo patterns were written was obtained in a similar way to Example 1 except that a powder of cobalt ferrite (having a cubic shape, the aspect ratio of 1.7, and the particle volume of 2000 nm³) was used as a magnetic powder in the process of forming a coating material for forming a magnetic layer.

Example 14

A magnetic tape to which servo patterns were written was obtained in a way similar to Example 3 except that the squareness ratio of the magnetic tape in the thickness direction (vertical direction) was set to 70% by adjusting the drying conditions (drying temperature and drying time) of the coating material for forming a magnetic layer, and the BET specific surface area was set to 3.5 m²/g and the average pore diameter was set to 8.0 nm by setting the temperature of the first heat treatment and the second heat treatment to 55° C. and the time of the first heat treatment and the second heat treatment to 10 hours in the transfer process.

Example 15

A magnetic tape to which servo patterns were written was obtained in a way similar to Example 14 except that the BET specific surface area was set to 7.0 m²/g and the average pore diameter was set to 6.0 nm by setting the temperature of the first heat treatment and the second heat treatment to 70° C. and the time of the first heat treatment and the second heat treatment to 10 hours in the transfer process.

Comparative Example 1

A magnetic tape to which servo patterns were written was obtained in a similar way to Example 1 except that the statistical value $\sigma_{SW}$ indicating the non-linearity of the servo pattern was set to 25 nm by increasing the tension of the magnetic tape compared to that in Example 1 and increasing the friction coefficient between the servo signal writing head and the magnetic tape in the process of writing a servo pattern.

Comparative Example 2

A magnetic tape to which servo patterns were written was obtained in a similar way to Example 1 except that the arithmetic average roughness Ra on the surface of the magnetic lager was set to 3.0 nm by adjusting the conditions of the calendar processing in the calendar processing.

Comparative Example 3

A magnetic tape to which servo patterns were written was obtained in a similar way to Example 1 except that the squareness ratio of the magnetic tape in the thickness direction (vertical direction) was set to 60% by adjusting the drying conditions (drying temperature and drying time) of the coating material for forming a magnetic layer.

Comparative Example 4

A magnetic tape having the average thickness of 5.6 µm to which servo patterns were written was obtained in a similar way to Example 1 except that the average thickness of the PEN film was 4.2 µm, the average thickness of the underlayer after calendaring was 0.9 µm, and the average thickness of the magnetic layer after calendaring was 90 nm in the coating process.

Comparative Example 5

A magnetic tape to which servo patterns were written was obtained in a similar way to Example 1 except that the BET specific surface area was set to 3.2 m²/g and the average pore diameter was set to 9.0 nm by setting the temperature of the first heat treatment and the second heat treatment to 55° C. and the time of the first heat treatment and the second heat treatment to 10 hours in the transfer process.

Comparative Example 6

A magnetic tape to which servo patterns were written was obtained in a similar way to Example 1 except that the BET specific surface area was set to 8.0 m²/g and the average pore diameter was set to 6.0 nm by setting the temperature of the first heat treatment and the second heat treatment to 70° C. and the time of the first heat treatment and the second heat treatment to 20 hours in the transfer process.

[Evaluation]
(SNR)

The SNR of each of the magnetic tapes (magnetic tapes to which servo patterns had been written) according to Examples 1 to 15 and Comparative Examples 1 to 6 was evaluated as follows. The SNR (electromagnetic conversion characteristics) of the magnetic tape in the 25° C. environment was measured using a ½ inch tape travelling device (manufactured by Mountain Engineering II, INC., MTS Transport) to which a recording/reproduction head and a recording/reproduction amplifier was attached. A ring head having a gap length of 0.2 µm was used as the recording head, and a GMR head having a shield-to-shield distance of 0.1 µm was used as the reproduction head. The relative speed was 6 m/s, the recording clock frequency was 160 MHz, and the recording track width was 2.0 µm. Further, the SNR was calculated on the basis of the method described in the following literature. The results were shown in Table 2 with the SNR in Example 1 as 0 dB.

Y. Okazaki: "An Error Rate Emulation System.", IEEE Trans. Man., 31, pp. 3093-3095(1995)

(Friction Coefficient Ratio)

The friction coefficient ratio ($\mu_B/\mu_A$) and the friction coefficient ratio ($\mu_C(1000)/\mu_C(5)$) of each of the magnetic tapes according to Examples 1 to 15 and Comparative Examples 1 to 6 were evaluated by the evaluation method described in the above-mentioned first embodiment.

(Travelling Stability (1))

The travelling stability of each of the magnetic tapes (magnetic tapes to which servo patterns had been written) according to Examples 1 to 15 and Comparative Examples 1 to 6 was evaluated as follows. The magnetic tape was incorporated into an LTO cartridge. A so-called full volume test in which data was recorded on the entire surface of the magnetic tape and reproduced using an LTO drive connected to a server and a PC via SCSI and Fibre Channel was performed on the LTO cartridge. In the full volume test, the data recording status was sequentially monitored, and information relating to a problem was recorded when the problem occurred.

In the full volume test, so-called stop write in which a drive automatically pauses recording when the travelling status of the magnetic tape is unstable is performed. If the stop write is performed, the data transfer rate decreases. Further, in the full volume test, if the travelling state of the magnetic tape becomes more unstable, the drive automatically stops recording completely and enters a so-called fail state.

The full volume test was repeatedly performed 5 times sequentially on the magnetic tapes according to Examples 1 to 15 and Comparative Examples 1 to 6, and a "relative value of the transfer rate of the fifth full volume test" and "presence or absence of fail" were recorded. The relative value of the transfer rate of the full volume test is a ratio of the average transfer rate per full volume test to the transfer rate of the drive used for evaluation in the case where the highest performance of the drive has been delivered. The case where the highest performance of the drive was delivered is taken as 100%. For example, in the case where an LTO8 drive is used to be connected to a server via Fibre Channel and recording is performed in the LTO8 format, the transfer rate of the LTO8 drive when the drive delivered the highest performance is 350 MB/sec. The "presence or absence of fail" indicates whether or not the drive has become the fail state as described above.

Each of the magnetic tapes was evaluated in accordance with the four-level evaluation criteria shown in the following Table 2. As shown in Table 2, the level 4 means having the best travelling stability, and the level 1 means having the worst travelling stability. For example, in the case where all the relative values of the transfer rate of the magnetic tape in the five full volume tests was 95% or more and 100% or less and there is no fail, the magnetic tape is rated as level 4. A rating of the level 4 or 3 (i.e., the transfer rate of the magnetic tape in the fifth full volume test is 80% or more) is desirable from the viewpoint of favorable travelling stability of the magnetic tape.

The evaluation result of each of the magnetic tapes is shown in the column of "Travelling stability (1)".

Table 2 shows details of the above-mentioned four-level determination criteria for travelling stability.

TABLE 2

| | Relative value of transfer rate of fifth full volume test | Presence or absence of fail |
| --- | --- | --- |
| Level 4 | 95% or more and 100% or less | Absence |
| Level 3 | 80% or more and less than 95% | Absence |
| Level 2 | Less than 80% | Absence |
| Level 1 | Less than 80% | Presence |

(Travelling Stability (2))

The travelling stability of each of the magnetic tapes (magnetic tapes to which servo patterns had been written) according to Examples 1 to 15 and Comparative Examples 1 to 6 was evaluated as follows. First, as a cartridge, one including a cartridge memory that includes, in a memory, a storage region to which tension adjustment information is written, and is capable of writing the tension adjustment information to the above-mentioned region and reading the tension adjustment information from the above-mentioned region by a controller was prepared. The size of this cartridge was similar to the size (102 mm×105 mm×22 mm) of the cartridge used for evaluation of the above-mentioned travelling stability (1).

Next, a full volume test was performed in a way similar to the above-mentioned "travelling stability (1)" except that the tension in the longitudinal direction of the magnetic tape was adjusted when recording and reproducing data on the entire surface of the magnetic tape. Next, the travelling stability was evaluated in four levels, i.e., levels 1 to 4, in a way similar to the above-mentioned "travelling stability (1)".

The evaluation result of the travelling stability of each of the magnetic tapes is shown in the column of the "Travelling stability (2)" in Table 3.

The tension adjustment in the longitudinal direction of the magnetic tape was performed as follows. That is, servo bands (servo tracks) in two or more columns were reproduced at the same time while causing the magnetic tape to reciprocate by a recording/reproduction apparatus, and the space between the servo pattern columns during travelling were continuously measured (for each point (specifically, for each approximately 6 mm) where there is information regarding the servo position) on the basis of the shape of the reproduction waveform of each of the servo pattern columns (servo signal) having an inverted V shape of the servo bands. Then, the rotation driving of a spindle drive apparatus and a reel drive apparatus was controlled on the basis of information regarding the measured space between the servo pattern columns, and the tension in the longitudinal direction of the magnetic tape was automatically adjusted so that the space between the servo pattern columns approached a specified width. Here, the "specified width" means a distance between two servo read heads of the recording/reproduction apparatus. Note that the two servo read heads are located at positions of two servo bands located above and below the data band during travelling of the magnetic tape.

(Young's Modulus)

The Young's modulus of each of the magnetic tapes according to Examples 1 to 15 and Comparative Examples 1 to 6 was measured by the method of measuring the Young's modulus described in the above-mentioned first embodiment.

Table 3 shows the configuration of each of the magnetic tapes according to Examples 1 to 15 and Comparative Examples 1 to 6, and the evaluation results.

TABLE 3

| | Magnetic material | Substrate | Tape average thickness [μm] | Arithmetic average roughness Ra [nm] | Squareness ratio in vertical direction [%] | Magnetic layer average thickness [nm] | BET specific surface area [m²/g] | Pore diameter of maximum pore volume at time of attachment/detachment | Statistical value $\sigma_{SW}$ [nm] | SNR (Relative value) [dB] | Friction coefficient ratio $\mu_0/\mu_A$ | Friction coefficient ratio $\mu_C(1000)/\mu_C(5)$ | Travelling stability (1) (Absence of TC) | Travelling stability (2) (Presence of TC) | Young's modulus [GPa] |
|---|---|---|---|---|---|---|---|---|---|---|---|---|---|---|---|
| Example 1 | BaFe₁₂O₁₉ | PEN | 5.6 | 2.5 | 65 | 80 | 4.5 | 8.0 | 23 | 0.0 | 1.2 | 1.2 | 3 | 3 | 7.8 |
| Example 2 | BaFe₁₂O₁₉ | PEN | 5.1 | 2.5 | 65 | 80 | 4.5 | 9.0 | 23 | 0.0 | 1.2 | 1.2 | 3 | 3 | 7.5 |
| Example 3 | BaFe₁₂O₁₉ | PEN | 5.6 | 2.2 | 65 | 80 | 4.5 | 8.0 | 23 | 0.3 | 1.2 | 1.3 | 3 | 3 | 7.8 |
| Example 4 | BaFe₁₂O₁₉ | PEN | 5.6 | 2.5 | 70 | 80 | 4.5 | 8.0 | 23 | 0.3 | 1.2 | 1.3 | 3 | 3 | 7.8 |
| Example 5 | BaFe₁₂O₁₉ | PEN | 5.6 | 2.5 | 65 | 70 | 4.5 | 8.0 | 23 | 0.4 | 1.2 | 1.2 | 3 | 3 | 7.8 |
| Example 6 | BaFe₁₂O₁₉ | PEN | 5.6 | 2.5 | 65 | 50 | 4.5 | 8.0 | 23 | 0.4 | 1.2 | 1.2 | 3 | 3 | 7.8 |
| Example 7 | BaFe₁₂O₁₉ | PEN | 5.6 | 2.5 | 65 | 80 | 3.5 | 8.0 | 23 | 0.0 | 1.2 | 1.4 | 3 | 3 | 7.8 |
| Example 8 | BaFe₁₂O₁₉ | PEN | 5.6 | 2.5 | 65 | 80 | 7.0 | 6.0 | 23 | 0.0 | 1.4 | 1.2 | 3 | 3 | 7.8 |
| Example 9 | BaFe₁₂O₁₉ | PEN | 5.6 | 2.5 | 65 | 80 | 4.5 | 8.0 | 20 | 0.0 | 1.2 | 1.2 | 4 | 4 | 7.8 |
| Example 10 | BaFe₁₂O₁₉ | PEN | 5.6 | 2.5 | 65 | 80 | 4.5 | 8.0 | 15 | 0.0 | 1.2 | 1.2 | 4 | 4 | 7.8 |
| Example 11 | BaFe₁₂O₁₉ | PEN | 5.6 | 2.5 | 65 | 80 | 4.5 | 8.0 | 23 | 0.0 | 1.2 | 1.2 | 3 | 3 | 7.8 |
| Example 12 | ε-iron oxide | PEN | 5.6 | 2.5 | 65 | 80 | 4.5 | 10.0 | 23 | 0.1 | 1.2 | 1.2 | 3 | 3 | 7.8 |
| Example 13 | Co-iron oxide | PEN | 5.6 | 2.5 | 65 | 80 | 4.5 | 9.0 | 23 | 0.2 | 1.2 | 1.2 | 3 | 3 | 7.8 |
| Example 14 | BaFe₁₂O₁₉ | PEN | 5.6 | 2.2 | 70 | 80 | 3.5 | 8.0 | 23 | 0.4 | 1.5 | 1.9 | 3 | 3 | 7.8 |
| Example 15 | BaFe₁₂O₁₉ | PEN | 5.6 | 2.2 | 70 | 80 | 7.0 | 6.0 | 23 | 0.4 | 1.9 | 1.5 | 3 | 3 | 7.8 |
| Comparative Example 1 | BaFe₁₂O₁₉ | PEN | 5.6 | 2.5 | 65 | 80 | 4.5 | 8.0 | 25 | 0.0 | 1.2 | 1.2 | 2 | 2 | 7.8 |
| Comparative Example 2 | BaFe₁₂O₁₉ | PEN | 5.6 | 3.0 | 65 | 80 | 4.5 | 8.0 | 23 | −0.7 | 1.1 | 1.2 | 3 | 3 | 7.8 |
| Comparative Example 3 | BaFe₁₂O₁₉ | PEN | 5.6 | 2.5 | 60 | 80 | 4.5 | 8.0 | 23 | −0.7 | 1.2 | 1.2 | 3 | 3 | 7.8 |
| Comparative Example 4 | BaFe₁₂O₁₉ | PEN | 5.6 | 2.5 | 65 | 90 | 4.5 | 8.0 | 23 | −0.7 | 1.2 | 1.4 | 3 | 2 | 7.8 |

TABLE 3-continued

| | Magnetic material | Sub-strate | Tape average thickness [μm] | Arithmetic average roughness Ra [nm] | Squareness ratio in vertical direction [%] | Magnetic layer average thickness [nm] | BET specific surface area [m²/g] | Pore diameter of maximum pore volume at time of attachment/detachment | Statistical value $\sigma_{SW}$ [nm] | SNR (Relative value) [dB] | Friction coefficient ratio $\mu_D/\mu_A$ | Friction coefficient ratio $\mu_C(1000)/\mu_C(5)$ | Travelling stability (1) (Absence of TC) | Travelling stability (2) (Presence of TC) | Young's modulus [GPa] |
|---|---|---|---|---|---|---|---|---|---|---|---|---|---|---|---|
| Comparative Example 5 | BaFe₁₂O₁₉ | PEN | 5.6 | 2.5 | 65 | 80 | 3.2 | 9.0 | 23 | 0.0 | 2.2 | 2.1 | 2 | 1 | 7.8 |
| Comparative Example 6 | BaFe₁₂O₁₉ | PEN | 5.6 | 2.5 | 65 | 80 | 8.0 | 6.0 | 23 | 0.0 | 2.2 | 2.3 | 2 | 1 | 7.8 |

PEN: polyethylene
TC: Tension control

The above-mentioned evaluation results show the following.

The travelling stability is reduced in the case where the BET specific surface area of the entire magnetic tape measured in the state where the magnetic tape has been washed and dried is outside the range of 3.5 m²/g or more and 7.0 m²/g or less (Examples 1, 7, and 8, and Comparative Examples 5 and 6).

The travelling stability is reduced in the case where the statistical value $\sigma_{SW}$ indicating the non-linearity of the servo pattern columns (servo bands) exceeds 24 nm (Examples 1, 9, and 10, and Comparative Example 1).

The electromagnetic conversion characteristics (SNR) deteriorate in the case where the arithmetic average roughness Ra on the surface of the magnetic layer exceeds 2.5 nm (Examples 1 and 3, and Comparative Example 2).

The electromagnetic conversion characteristics (SNR) deteriorate in the case where the squareness ratio of the magnetic layer in the vertical direction is less than 65% (Examples 1 and 4, and Comparative Example 3).

The electromagnetic conversion characteristics (SNR) deteriorate in the case where the average thickness of the magnetic layer exceeds 80 nm (Examples 1, 5, and 6, and Comparative Example 4).

Therefore, in order to achieve both excellent travelling stability and excellent electromagnetic conversion characteristics in the magnetic tape having the average thickness of 5.6 μm or less, the BET specific surface area of the entire magnetic tape is 3.5 m²/g or more and 7.0 m²/g or less, the statistical value $\sigma_{SW}$ indicating the non-linearity of the servo pattern is 24 nm or less, the arithmetic average roughness Ra of the surface of the magnetic layer is 2.5 nm or less, the squareness ratio of the magnetic layer in the vertical direction is 65% or more, and the average thickness of the magnetic layer is 80 nm or less.

Even in the case where a powder of strontium ferrite particles is used instead of a powder of barium ferrite particles as a magnetic powder, it is possible to achieve both excellent travelling stability and excellent electromagnetic conversion characteristics in the magnetic tape having the average thickness of 5.6 μm or less by causing the BET specific surface area, the statistical value $\sigma_{SW}$, the arithmetic average roughness Ra, the squareness ratio, and the average thickness of the magnetic layer to satisfy the above-mentioned numerical value range (Examples 1 and 11).

Even in the case where a powder of ε-iron oxide particles or a powder of cobalt ferrite particles is used instead of hexagonal ferrite particles (a powder of barium ferrite particles, a powder of strontium ferrite particles) as a magnetic powder, it is possible to achieve both excellent travelling stability and excellent electromagnetic conversion characteristics in the magnetic tape having the average thickness of 5.6 μm or less by causing the BET specific surface area, the statistical value $\sigma_{SW}$, the arithmetic average roughness Ra, the squareness ratio, and the average thickness of the magnetic layer to satisfy the above-mentioned numerical value range (Examples 1, 12, and 13).

Even in the case where the tension of the magnetic tape is adjusted, it is possible to achieve both excellent travelling stability and excellent electromagnetic conversion characteristics in the magnetic tape having the average thickness of 5.6 μm or less by causing the BET specific surface area, the statistical value $\sigma_{SW}$, the arithmetic average roughness Ra, the squareness ratio, and the average thickness of the magnetic layer to satisfy the above-mentioned numerical value range (Example 1).

In order to achieve more excellent travelling stability in the magnetic tape having the average thickness of 5.6 μm or less, it is favorable that the statistical value $\sigma_{SW}$ indicating the non-linearity of the servo pattern columns (servo bands) is 20 nm or less (Examples 1, 9, and 10).

In order to achieve more excellent electromagnetic conversion characteristics, it is favorable that the arithmetic average roughness Ra on the surface of the magnetic layer is 2.2 nm or less (Examples 1 and 3).

In order to achieve more excellent electromagnetic conversion characteristics, it is favorable that the squareness ratio of the magnetic layer in the vertical direction is 70% or more (Examples 1 and 4).

In the case where the friction coefficient ratio ($\mu_B/\mu_A$) is within the range of 1.0 or more and 2.0 or less, excellent travelling stability can be achieved even if the tension of the magnetic tape having the average thickness of 5.6 μm or less is controlled (Examples 1, 8, 14, and 15, and Comparative Examples 5 and 6).

In the case where the friction coefficient ratio is ($\mu_C$(1000)/$\mu_C$(5) is within the range of 1.0 or more and 2.0 or less, excellent travelling stability can be achieved even after performing the five full volume tests on the magnetic tape having the average thickness of 5.6 μm or less (i.e., even after causing the magnetic tape having the average thickness of 5.6 μm or less to travel more than 1000 times) (Examples 1, 3, 7, 14, and 15, and Comparative Examples 5 and 6).

Although embodiments of the present disclosure and modified examples thereof have been specifically described above, the present disclosure is not limited to the above-mentioned embodiments and modified examples thereof and various modifications can be made on the basis of the technical idea of the present disclosure. For example, the configurations, the methods, the processes, the shapes, the materials, and the numerical values cited in the above-mentioned embodiments and modified examples thereof are only illustrative, and different configurations, methods, processes, shapes, materials, and numerical values may be used as necessary. The configurations, the methods, the processes, the shapes, the materials, and the numerical values of the above-mentioned embodiments and modified examples thereof can be combined with each other without departing from the essence of the present disclosure.

The chemical formulae of the compounds illustrated in the above-mentioned embodiments and modified examples thereof are representative, and are not limited to the listed valances or the like as long as they have the general name of the same compound. Within the numerical range described in a stepwise manner in the above-mentioned embodiments and modified examples thereof, the upper limit value or the lower limit value of the numerical range in a certain step may be replaced with the upper limit value or the lower limit value of the numerical range in another step. The materials illustrated in the above-mentioned embodiments and modified examples thereof can be used alone or in combination unless otherwise specified.

Further, the present disclosure may also take the following configurations.

(1)
A tape-shaped magnetic recording medium, including:
a substrate;
an underlayer provided on the substrate; and
a magnetic layer provided on the underlayer, wherein
the substrate contains polyester,
each of the underlayer and the magnetic layer contains a lubricant,
the magnetic layer has a surface on which a large number of holes is provided,
the arithmetic average roughness Ra of the surface is 2.5 nm or less,
a BET specific surface area of the entire magnetic recording medium measured in a state where the magnetic recording medium has been washed and dried is 3.5 m²/g or more and 7.0 m²/g or less,
a squareness ratio of the magnetic layer in a vertical direction is 65% or more,
an average thickness of the magnetic layer is 80 nm or less,
an average thickness of the magnetic recording medium is 5.6 μm or less, and
a servo pattern is recorded on the magnetic layer and a statistical value $\sigma_{SW}$ indicating a non-linearity of the servo pattern is 24 nm or less.

(2)
The magnetic recording medium according to (1), in which
the statistical value $\sigma_{SW}$ is 23 nm or less.

(3)
The magnetic recording medium according to (1), in which
the statistical value $\sigma_{SW}$ is 20 nm or less.

(4)
The magnetic recording medium according to any one of (1) to (3), in which
the squareness ratio is 70% or more.

(5)
The magnetic recording medium according to any one of (1) to (4), in which
the arithmetic average roughness Ra is 2.2 nm or less.

(6)
The magnetic recording medium according to any one of (1) to (5), in which
a friction coefficient ratio ($\mu_B/\mu_A$) between a dynamic friction coefficient $\mu_A$ between the surface the magnetic layer and a magnetic head when tension applied to the magnetic recording medium is 1.2 N, and a dynamic friction coefficient $\mu_B$ between the surface of the magnetic layer and the magnetic head when tension applied to the magnetic recording medium is 0.4 N is 1.0 or more and 2.0 or less.

(7)
The magnetic recording medium according to any one of (1) to (6), in which
regarding the dynamic friction coefficient $\mu_C$ between the surface of the magnetic layer and a magnetic head when tension applied to the magnetic recording medium is 0.6 N, a friction coefficient ratio ($\mu_C(1000)/\mu_C(5)$) of a dynamic friction coefficient $\mu_C(1000)$ of the 1000th travelling to a dynamic friction coefficient $\mu_C(5)$ of the fifth travelling is 1.0 or more and 2.0 or less.

(8)
The magnetic recording medium according to any one of (1) to (7), in which
an average pore diameter of the entire magnetic recording medium measured in the state where the magnetic recording medium has been washed and dried is 6 nm or more and 11 nm or less.

(9)
The magnetic recording medium according to any one of (1) to (8), in which
a coercive force Hc of the magnetic layer in a longitudinal direction is 2000 Oe or less.

(10)
The magnetic recording medium according to any one of (1) to (9), in which
the magnetic layer includes 5 or more servo bands.

(11)
The magnetic recording medium according to (10), in which
a ratio of the total area of the servo bands to the area of the surface is 4.0% or less.

(12)
The magnetic recording medium according to (10) or (11), in which
a width of each of the servo bands is 95 μm or less.

(13)
The magnetic recording medium according to any one of (1) to (12), in which
the magnetic layer is configured to be capable of forming a plurality of data tracks, and
a width of each of the data tracks is 2000 nm or less.

(14)
The magnetic recording medium according to any one of (1) to (13), in which
the magnetic layer is configured to be capable of recording data so that the minimum value of a magnetization reversal pitch L is 48 nm or less.

(15)

The magnetic recording medium according to any one of (1) to (14), in which the average thickness of the substrate is 4.2 µm or less.

(16)

The magnetic recording medium according to any one of (1) to (15), in which the lubricant contains at least one type selected from a fatty acid and a fatty acid ester, and the fatty acid contains a compound represented by the following general formula (1) or (2), and the fatty acid ester contains a compound represented by the following general formula (3) or (4).

$$CH_3(CH_2)_k COOH \qquad (1)$$

(wherein k is an integer selected from a range of 14 or more and 22 or less in the general formula (1).)

$$CH_3(CH_2)_n CH\!=\!CH(CH_2)_m COOH \qquad (2)$$

(wherein a sum of n and m is an integer selected from a range of 12 or more and 20 or less in the general formula (2).)

$$CH_3(CH_2)_p COO(CH_2)_q CH_3 \qquad (3)$$

(wherein p is an integer selected from a range of 14 or more and 22 or less and q is in integer selected from a range of 2 or more and 5 or less in the general formula (3).)

$$CH_3(CH_2)_r COO\!-\!(CH_2)_s CH(CH_3)_2 \qquad (4)$$

(wherein r is an integer selected from a range of 14 or more and 22 or less and s is an integer selected from a range of 1 or more and 3 or less in the general formula (4).)

(17)

The magnetic recording medium according to any one of (1) to (16), in which the magnetic layer contains a magnetic powder, and the magnetic powder includes hexagonal ferrite, ε-iron oxide, or Co-containing spinel ferrite.

(18)

The magnetic recording medium according to (17), in which the hexagonal ferrite contains at least one type of Ba or Sr, and the ε-iron oxide contains at least one type of Al or Ga.

(19)

A cartridge, including:

the magnetic recording medium according to any one of (1) to (18); and a storage unit that has a region to which adjustment information for adjusting tension to be applied in a longitudinal direction of the magnetic recording medium is written.

(20)

The cartridge according to (19), in which a communication unit that communicates with a recording/reproduction apparatus; and a control unit that stores, in the region, the adjustment information received from the recording/reproduction apparatus via the communication unit, and reads the adjustment information from the region and transmits the adjustment information to the recording/reproduction apparatus via the communication unit in response to a request from the recording/reproduction apparatus.

REFERENCE SIGNS LIST 10 cartridge
11 cartridge memory
31 antenna coil
32 rectification/power circuit
33 clock circuit
34 detection/modulation circuit
35 controller
36 memory
36A first storage region
36B second storage region
41 substrate
42 underlayer
43 magnetic layer
44 back layer
50, 50A recording/reproduction apparatus
51 spindle 51
52 reel 52
53 spindle drive apparatus
54 reel drive apparatus
55 guide roller
56 magnetic head
57 reader/writer
58 communication interface
59 control apparatus
60 network
61 hygrometer 61
62 PC
63 thermometer
64 hygrometer
100, 100A recording/reproduction system
110 servo frame
111 servo subframe 1
111A A burst
111B B burst
112 servo subframe 2
112C C burst
112C C burst
113 servo stripe
MT magnetic tape
SB servo band
DB data band

The invention claimed is:

1. A magnetic recording medium, comprising:

a substrate;

an underlayer provided on the substrate; and a magnetic layer provided on the underlayer, wherein the substrate contains polyester, each of the underlayer and the magnetic layer contains a lubricant, the magnetic layer has a surface on which a large number of holes is provided, the arithmetic average roughness Ra of the surface is 2.5 nm or less, a BET specific surface area of the entire magnetic recording medium measured in a state where the magnetic recording medium has been washed and dried is 3.5 m²/g or more and 7.0 m²/g or less, a squareness ratio of the magnetic layer in a vertical direction is 65% or more, an average thickness of the magnetic layer is 80 nm or less, an average thickness of the magnetic recording medium is 5.6 µm or less, and a servo pattern is recorded on the magnetic layer and a statistical value $\sigma_{sw}$ indicating a non-linearity of the servo pattern is 24 nm or less, wherein the statistical value $\sigma_{sw}$ is defined by:

$$\sigma_{sw} = \sqrt{\Sigma WIP(f) \times df} \qquad (1)$$

wherein WIP(f) is a displacement difference during actual drive and df is a wave number interval, wherein regarding a dynamic friction coefficient μc between the surface of the magnetic layer and a magnetic head when tension applied to the magnetic recording medium is 0.6 N, a friction coefficient ratio (μc(1000)/μc(5)) of a dynamic friction coefficient μc(1000) of a 1000th travelling to a dynamic friction coefficient μc(5) of a fifth travelling is 1.0 or more and 2.0 or less, and wherein the magnetic recording medium is tape-shaped.

2. The magnetic recording medium according to claim 1, wherein the statistical value $\sigma_{sw}$ is 23 nm or less.

3. The magnetic recording medium according to claim 1, wherein the statistical value $\sigma_{sw}$ is 20 nm or less.

4. The magnetic recording medium according to claim 1, wherein the squareness ratio is 70% or more.

5. The magnetic recording medium according to claim 1, wherein the arithmetic average roughness Ra is 2.2 nm or less.

6. The magnetic recording medium according to claim 1, wherein a friction coefficient ratio ($\mu_B/\mu_A$) between a dynamic friction coefficient $\mu_A$ between the surface the magnetic layer and a magnetic head when tension applied to the magnetic recording medium is 1.2 N, and a dynamic friction coefficient $\mu_B$ between the surface of the magnetic layer and the magnetic head when tension applied to the magnetic recording medium is 0.4 N is 1.0 or more and 2.0 or less.

7. The magnetic recording medium according to claim 1, wherein an average pore diameter of the entire magnetic recording medium measured in the state where the magnetic recording medium has been washed and dried is 6 nm or more and 11 nm or less.

8. The magnetic recording medium according to claim 1, wherein a coercive force Hc of the magnetic layer in a longitudinal direction is 2000 Oe or less.

9. The magnetic recording medium according to claim 1, wherein the magnetic layer includes 5 or more servo bands.

10. The magnetic recording medium according to claim 9, wherein a ratio of the total area of the servo bands to the area of the surface is 4.0% or less.

11. The magnetic recording medium according to claim 9, wherein a width of each of the servo bands is 95 μm or less.

12. The magnetic recording medium according to claim 1, wherein the magnetic layer is configured to be capable of forming a plurality of data tracks, and a width of each of the data tracks is 2000 nm or less.

13. The magnetic recording medium according to claim 1, wherein the magnetic layer is configured to be capable of recording data so that the minimum value of a magnetization reversal pitch L is 48 nm or less.

14. The magnetic recording medium according to claim 1, wherein the average thickness of the substrate is 4.2 μm or less.

15. The magnetic recording medium according to claim 1, wherein the lubricant contains at least one type selected from a fatty acid and a fatty acid ester, and the fatty acid contains a compound represented by the following general formula (1) or (2), and the fatty acid ester contains a compound represented by the following general formula (3) or (4),

wherein k is an integer selected from a range of 14 or more and 22 or less in the general formula (1),

wherein a sum of n and m is an integer selected from a range of 12 or more and 20 or less in the general formula (2),

wherein p is an integer selected from a range of 14 or more and 22 or less and q is in integer selected from a range of 2 or more and 5 or less in the general formula (3),

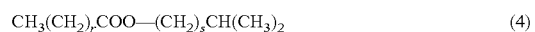

wherein r is an integer selected from a range of 14 or more and 22 or less and s is an integer selected from a range of 1 or more and 3 or less in the general formula (4).

16. The magnetic recording medium according to claim 1, wherein the magnetic layer contains a magnetic powder, and the magnetic powder includes hexagonal ferrite, ε-iron oxide, or Co-containing spinel ferrite.

17. The magnetic recording medium according to claim 16, wherein the hexagonal ferrite contains at least one type of Ba or Sr, and the ε-iron oxide contains at least one type of Al or Ga.

18. A cartridge, comprising:

the magnetic recording medium according to claim 1; and a storage unit that has a region to which adjustment information for adjusting tension to be applied in a longitudinal direction of the magnetic recording medium is written.

19. The cartridge according to claim 18, further comprising a communication unit that communicates with a recording/reproduction apparatus; and a control unit that stores the adjustment information received from the recording/reproduction apparatus via the communication unit, and reads the adjustment information from the region and transmits the adjustment information to the recording/reproduction apparatus via the communication unit in response to a request from the recording/reproduction apparatus.

* * * * *